United States Patent
Tanihara et al.

(10) Patent No.: US 9,563,075 B2
(45) Date of Patent: Feb. 7, 2017

(54) METHOD FOR MANUFACTURING LIQUID CRYSTAL DISPLAY DEVICE PROVIDED WITH FRONT PLATE, AND LIQUID CRYSTAL DISPLAY DEVICE PROVIDED WITH FRONT PLATE

(75) Inventors: Norie Tanihara, Kobe (JP); Takashi Murakami, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 2 days.

(21) Appl. No.: 13/882,903

(22) PCT Filed: Oct. 31, 2011

(86) PCT No.: PCT/JP2011/075066
§ 371 (c)(1),
(2), (4) Date: May 1, 2013

(87) PCT Pub. No.: WO2012/060324
PCT Pub. Date: May 10, 2012

(65) Prior Publication Data
US 2013/0222720 A1    Aug. 29, 2013

(30) Foreign Application Priority Data
Nov. 5, 2010   (JP) ................................. 2010-248192

(51) Int. Cl.
*G02F 1/1333*    (2006.01)

(52) U.S. Cl.
CPC ....... *G02F 1/1333* (2013.01); *G02F 1/133308* (2013.01); *G02F 2001/133331* (2013.01);
(Continued)

(58) Field of Classification Search
CPC .............. G02F 1/1333; G02F 1/133308; G02F 2001/13333; G02F 2202/023; G02F 2202/28; G02F 2202/40; Y10T 428/105; Y10T 428/1036; Y10T 428/1059; B29C 65/14
(Continued)

(56) References Cited

U.S. PATENT DOCUMENTS 6,037,394 A *  3/2000  Sato et al. ........................ 524/91
6,620,509 B1 *  9/2003  Yamamoto .............. B32B 27/30
                                                         359/273
(Continued)

FOREIGN PATENT DOCUMENTS

JP    2003-107433 A    4/2003
JP    2003-255105 A    9/2003
(Continued)

OTHER PUBLICATIONS

JPO Website Machine English Translation of JP 2007-108553, Sakurai Shinji, Apr. 26, 2007.*
(Continued)

*Primary Examiner* — Sophie Hon
(74) *Attorney, Agent, or Firm* — Lucas & Mercanti, LLP

(57) ABSTRACT

The present invention provides a method for manufacturing a liquid crystal device having no wrinkles and distortion between a hard coat layer and a base material film, and no peeling of the hard coat layer. This method stacks a sealing layer having an ultraviolet curable adhesive; a front plate composed of a glass or an acrylic resin; an adhesive layer; and a base material film, which has a resin layer containing an adhesion improving agent, and a hard coat layer on the film surface. The resin layer contains 0.005-0.5 parts of the per 100 parts of a binder resin. The adhesive improving agent has an absorption maximum peak at a wavelength of 260-400 nm at the time of curing the sealing layer by applying ultraviolet rays from the hard coat layer side.

8 Claims, 1 Drawing Sheet

(52) U.S. Cl.
CPC .... *G02F 2202/023* (2013.01); *G02F 2202/28* (2013.01); *G02F 2202/40* (2013.01); *Y10T 428/105* (2015.01); *Y10T 428/1036* (2015.01); *Y10T 428/1059* (2015.01)

(58) Field of Classification Search
USPC .......... 428/1.5–1.61; 349/122; 359/464–465; 345/15; 156/272.2, 275.5, 275.7, 331.1
See application file for complete search history.

(56) References Cited

U.S. PATENT DOCUMENTS

| | | | |
|---|---|---|---|
| 2003/0011315 A1* | 1/2003 | Ito et al. | 315/169.3 |
| 2003/0096119 A1* | 5/2003 | Kimura | C08J 7/04 428/412 |
| 2006/0079605 A1* | 4/2006 | Sato et al. | 523/176 |
| 2007/0035830 A1* | 2/2007 | Matveev et al. | 359/464 |
| 2009/0244705 A1* | 10/2009 | Takeda et al. | 359/507 |

FOREIGN PATENT DOCUMENTS

| | | |
|---|---|---|
| JP | 2007-108553 A | 4/2007 |
| JP | 2009-271489 A | 11/2009 |

OTHER PUBLICATIONS

Benzotriazole Compounds, Product List, Johoku Chemical, 2015.*
International Search Report of Application No. PCT/JP2011/075066 dated Dec. 27, 2011.

* cited by examiner

METHOD FOR MANUFACTURING LIQUID CRYSTAL DISPLAY DEVICE PROVIDED WITH FRONT PLATE, AND LIQUID CRYSTAL DISPLAY DEVICE PROVIDED WITH FRONT PLATE

CROSS REFERENCE TO RELATED APPLICATION

This Application is a 371 of PCT/JP2011/075066 filed on Oct. 31, 2011, which claimed the priority of Japanese Patent Application No. 2010-248192 filed on Nov. 5, 2010; the contents of each are incorporated herein by reference in their entirety.

TECHNICAL FIELD

The present invention relates to a method for manufacturing a liquid crystal display device with front plate and to a liquid crystal display device with front plate.

BACKGROUND ART

In recent years, in order to further improve the contrast of liquid crystal display devices, it has been considered introducing a front plate made of glass or acrylic resin on the viewing side of a conventional liquid crystal panel. Providing the front plate can reduce diffused reflection due to irregularities on a surface of a conventional polarizing plate protective film, and this ensures high-contrast and sharp expression of color. Further, it is also advantageous that the color does not change when the surface of a liquid crystal display device is pressed by a finger.

When such a front plate is pasted on a liquid crystal panel with a void therebetween, the void lowers the contrast because external light is multiply reflected on its interface. It is thus preferable to provide a sealing layer which fills the void for bringing the front plate and the liquid crystal panel into close contact. Among various methods of curing such a sealing layer such as thermal curing and sticking, the most suitable method is ultraviolet curing using ultraviolet curable resin as the sealing layer.

For example, for bringing a liquid crystal panel and a front plate into close contact via a photocurable resin, patent literature 1 discloses a technique of avoiding deterioration of display quality without damaging a liquid crystal panel by irradiating the photocurable resin only with light at a wavelength of 340 nm or more and blocking light at a wavelength less than 340 nm, which has a negative influence on liquid crystal molecules, adhesives and the like.

On the other hand, glass or acrylic front plates are not used alone, but are generally provided with a resin film or the like having a hard coat layer for preventing scratch or reflection. Thus, taking productivity into consideration, a preferable method is providing a sealing layer containing an ultraviolet curing sticking agent, a front plate composed of glass or an acrylic resin, an adhesive layer, and a resin film having a hard coat layer in this order on the surface on the viewing side of a liquid crystal panel which has polarizing plates on both faces of the liquid crystal cell, followed by irradiation with ultraviolet ray from the hard coat layer side so as to cure the sealing layer.

There are various kinds of such resin films, and polycarbonate films (PC film), polyethylene terephthalate films (PET films), cellulose acylate films and the like are in practical use. However, polycarbonate films (PC films) and polyethylene terephthalate films (PET film) which are conventionally used for front plates have large phase differences, and thus these films may cause moire when used on the surface of the front plates resulted in unfavorable display quality.

In contrast, triacetylcellulose films (TAC films) having hard coat layer, which have conventionally been used for polarizing plates and liquid crystal display devices, are advantageous as a hard coat film to be pasted on a front plate, because TAC films do not cause moire by their low phase difference and thus have high transparency and good processability. However, when the sealing layer is cured by ultraviolet irradiation from the hard coat layer side, an ultraviolet absorber contained in the TAC film absorbs the ultraviolet ray for curing the sealing layer. The amount of the ultraviolet ray is thus decreased before reaching the sealing layer, and the sealing layer cannot be cured sufficiently. Therefore, decrease in contrast is caused by delamination or distortion between the liquid crystal panel and front plate.

If the amount of the ultraviolet ray is increased so that the sealing layer can receive a sufficient amount of light for curing, the TAC film with a hard coat layer is subjected to heat and the ultraviolet ray itself. It causes wrinkles or distortion between the hard coat layer and the base film and delamination of the hard coat layer, which have been another problem.

PRIOR ART DOCUMENTS

Patent Literature

Patent literature 1: Japanese Patent Application Laid-Open Publication No. 2003-107433

SUMMARY OF THE INVENTION

Problem to be Solved by the Invention

Thus, an object of the present invention is to provide a method for manufacturing a liquid crystal display device with a front plate having high contrast and high visibility, including bringing a front plate into close contact with a liquid crystal panel via a sealing layer including an ultraviolet curing sticking agent, the front plate being applied with a base film where an adhesion improver containing resin layer and a hard coat layer are provided on the surface of the base film in this order, wherein the sealing layer can be sufficiently cured by ultraviolet ray while the cellulose acylate film does not develop wrinkles or distortion between the hard coat layer and the base film or delamination of the hard coat by the ultraviolet ray.

Means for Solving the Problem

The above object of the present invention is accomplished by the following ways.

1. A method for manufacturing a liquid crystal display device with a front plate, including:
   providing, on a viewing side surface of a liquid crystal panel having polarizing plates on both sides thereof, a sealing layer including at least an ultraviolet curing sticking agent, a front plate composed of glass or an acrylic resin, an adhesive layer, and a base film where an adhesion improver containing resin layer and a hard coat layer are provided on a film surface of the base film in this order, in a manner that the hard coat layer is on a topmost surface; and
   curing the sealing layer by irradiating with ultraviolet ray from a side of the hard coat layer, wherein the adhesion improver containing resin layer includes a compound having an absorption maximum peak (λmax) in a wavelength range of 260 to 400 nm as an adhesion improver in an amount of 0.005 to 0.5 parts by mass with respect to 100 parts by mass of a binder resin of the adhesion improver containing resin layer.

2. The method for manufacturing the liquid crystal display device with a front plate of the above 1, wherein the base film on which the adhesion improver containing resin layer is provided has a light transmittance at 380 nm wavelength of 51% or more.

3. The method for manufacturing the liquid crystal display device with a front plate of the above 1 or 2, wherein the compound having an absorption maximum peak (λmax) at the wavelength range of 260 to 400 nm is a benzotriazol-based compound or a benzophenone-based compound.

4. The method for manufacturing the liquid crystal display device with a front plate of any one of the above 1 to 3, wherein the base film has an in-plane retardation Ro and thickness retardation Rth represented by the following equations of Ro: 0 to 5 nm and Rth: −10 to 10 nm, $$Ro = (nx - ny) \times d \quad \text{equation (i)}$$

$$Rth = \{(nx + ny)/2 - nz\} \times d \quad \text{equation (ii)}$$

(wherein nx, ny and nz are refractive indexes in a condition of 23° C., 55% RH and 590 nm wavelength; nx represents a maximum refractive index in a film plane or called refractive index in a slow axis direction; ny represents a refractive index in a direction perpendicular to the slow axis in the film plane; nz represents a refractive index of the film in a thickness direction; and d represents a film thickness (nm)).

5. A liquid crystal display device with a front plate, manufactured by the method for manufacturing a liquid crystal display device with a front plate of any one of the above 1 to 4.

6. The liquid crystal display device with a front plate according to the above 5, wherein the liquid crystal display device with a front plate is a liquid crystal display device for a stereoscopic image.

Advantageous Effect of the Invention

According to the present invention, it can be achieved to provide a method for manufacturing a liquid crystal display device with a front plate having high contrast and high visibility, including bringing a front plate into close contact with a liquid crystal panel via a sealing layer including an ultraviolet curing sticking agent, the front plate including a base film which is pasted on a surface and on which an adhesion improver containing resin layer and a hard coat layer are provided in this order, wherein the sealing layer can be sufficiently cured by ultraviolet ray while the base film does not develop wrinkles or distortion between the hard coat layer and the base film or delamination of the hard coat layer by the ultraviolet ray.

It can also be achieved to provide a liquid crystal display device with a front plate having good visibility as a liquid crystal display device for stereoscopic images.

MODE FOR CARRYING OUT THE INVENTION

Hereinafter, embodiments of the present invention will be described in detail; however, the present invention is not limited thereto.

A method for manufacturing a liquid crystal display device with a front plate includes:

providing, on a viewing side surface of a liquid crystal panel having polarizing plates on both sides thereof, a sealing layer including at least an ultraviolet curing sticking agent, a front plate composed of glass or an acrylic resin, an adhesive layer, and a base film where an adhesion improver containing resin layer and a hard coat layer are provided on a film surface of the base film in this order, in a manner that the hard coat layer is on a topmost surface; and curing the sealing layer by irradiating with ultraviolet ray from a side of the hard coat layer, wherein the adhesion improver containing resin layer includes a compound having an absorption maximum peak (λmax) in a wavelength range of 260 to 400 nm as an adhesion improver in an amount of 0.005 to 0.5 parts by mass with respect to 100 parts by mass of a binder resin of the adhesion improver containing resin layer.

Figure 1:
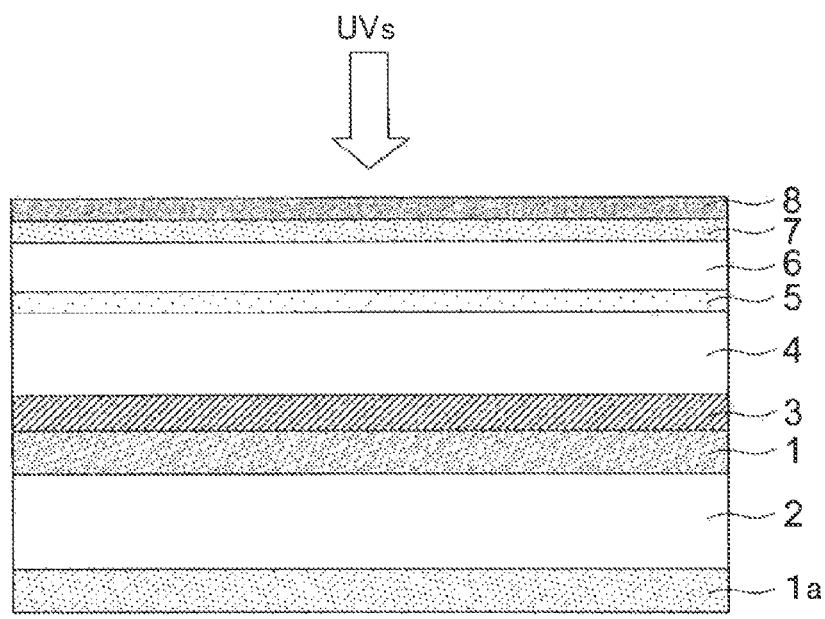
FIG. 1 This is a schematic diagram of a method for manufacturing a liquid crystal display device with a front plate according to the present invention.

FIG. 1 is a schematic diagram of the method for manufacturing the liquid crystal display device with a front plate of the present invention. FIG. 1 shows a minimum configuration of the method for manufacturing the liquid crystal display device with a front plate of the present invention, and the present invention is not limited thereto.

Onto the viewing side surface of a liquid crystal panel where polarizing plates 1 and 1a sandwich a liquid crystal cell 2, a sealing layer 3 including an ultraviolet curing sticking agent, a glass or acrylic front plate 4, an adhesive layer 5 and a base film 6 including an adhesion improver containing resin layer 7 and a hard coat layer 8 are laid in this order where the hard coat layer is the topmost surface. They are irradiated with ultraviolet ray from the hard coat layer side so that the sealing layer 3 is cured to bring the liquid crystal panel into close contact with the front plate.

The present inventors experimentally made a hard coat film in which an ultraviolet absorber was simply removed from a conventional base film with a hard coat layer so that it did not prevent the sealing layer including the ultraviolet curing sticking agent from photo-curing by the ultraviolet ray. Ultraviolet irradiation was applied to cure the sealing layer, and a liquid crystal display device with a front plate was thus prepared. The present inventor then found that if the amount of ultraviolet irradiation was regulated to be within the range sufficient to cure the sealing layer, it caused the hard coat film wrinkles or distortion between the hard coat layer and the base film or delamination of the hard coat layer as well as uneven contrast of the liquid crystal imaging, which were problematic in practical use.

As a result of the inventor's keen study on these problems, they found an astonishing fact that if the adhesion improver containing resin layer 7 contains a compound having an absorption maximum peak (λmax) at a wavelength of 260 to 400 nm as an adhesion improver in an amount of 0.005 to 0.5 parts by mass with respect to 100 parts by mass of a binder resin of the adhesion improver containing resin layer, it greatly improves the wrinkles and distortion between the hard coat layer and the base film and delamination of the hard coat layer. The present invention has been thus made.

It is preferable that the base film which is provided with the adhesion improver containing resin layer of the present invention has a light transmittance at 380 nm wavelength of 51% or more. With this configuration, curing the sealing layer can be compatible with providing the hard coat film having no wrinkle and distortion between the hard coat layer and the base film and no delamination of the hard coat layer.

It is preferable that the compound of the present invention having an absorption peak (λmax) at a wavelength of 260 to 400 nm is a benzotriazole-based compound or benzophenone-based compound.

Although it still remains presumptive, if the adhesion improver containing resin layer is provided in which the amount of the compound of the adhesion improver is adjusted within a specific range, it absorbs a moderate amount of the ultraviolet ray which the sealing layer is supposed to be irradiated with and produces heat. The heat then diffuses and thus makes the adhesion between the base film surface and the resin of the hard coat layer in the hard coat film stronger.

If the amount of the compound is less than 0.005 parts by mass, the ultraviolet irradiation causes wrinkles or distortion between the hard coat layer and the base film or delamination of the hard coat layer as in the case where the ultraviolet absorber is simply removed from the base film. If the amount of the compound is over 0.5 parts by mass, excessive heat is produced to cause larger distortion between the hard coat layer and the base film or bleed out to deteriorate the adhesiveness.

Because the compound is contained in the adhesion improver containing resin layer, the influence of the heat which the adhesion improver produces when irradiated with the ultraviolet ray can be limited compared to the case where the compound is contained in the film or hard coat layer. In addition, it can be prevented that interaction with other additive components causes deterioration or bleed out.

Hereinafter, configuration of the present invention will be described in the order of 1 to 8 in FIG. 1.

<Liquid Crystal Panel>

The liquid crystal panel of the present invention includes the polarizing plates 1 and 1a on both faces of the liquid crystal cell 2. The polarizing plates may be the same or different.

(Liquid Crystal Cell)

The liquid crystal cell 2 may be any of reflective, transflective and transmissive LCDs, and LCDs of various types such as TN, STN, OCB, HAN, VA (PVA, MVA) and IPS are preferably used.

(Polarizing Plate)

The polarizing plates 1 and 1a of the present invention is a stretched polyvinyl alcohol doped with iodine or dichromatic dye as a polarizer, in which a polarizing plate protective film supports at least one face of the polarizer. The polarizer has a film thickness of 5 to 40 μm, preferably 5 to 30 μm, particularly 5 to 20 μm.

The above polarizing plate protective film is not particularly limited, but is preferably a polymer film. It is preferable that the protective film is easily produced, optically uniform and optically transparent. As long as having these properties, the protective film may be any film such as cellulose acylate-based film, polyester-based film, polycarbonate-based film, polyarylate-based film, polysulfone (including polyethersulfone)-based film, polyester film such as polyethylene terephthalate and polyethylene naphthalate, polyethylene film, polypropylene film, cellophane, cellulose diacetate film, cellulose acetate butyrate film, polyvinylidene chloride film, polyvinyl alcohol film, ethylenevinyl alcohol film, syndiotactic polystyrene-based film, polycarbonate film, norbornene resin-based film, polymethylpentene film, polyether ketone film, polyether ketone imide film, polyamide film, fluorine-containing resin film, nylon film, cycloolefin polymer film, polyvinyl acetal-based resin film, polymethyl methacrylate film or acrylic film, but not limited thereto. These films are preferably manufactured by solution film casting or melt casting. Among these films, cellulose acylate film, polycarbonate film, polysulfone (including polyethersulfone), cycloolefin polymer film are preferable. For the present invention, cellulose acylate film and cycloolefin polymer film are particularly preferable in terms of production, cost, transparency, uniformity, adhesiveness and the like. For example, KONICA MINOLTA TAC KC5UX, KC4UX, KC5UX, KC8UCR3, KC8UCR4, KC8UCR5, KC8UY, KC4UY, KC12UR, KC16UR, KC4UE, KC8UE, KC4FR-1 and KC4FR-2 (Konica Minolta Optics, Inc.) are commercially available cellulose acylate films which are preferably used. ZEONOR (Zeon Corp.) is a commercially available cycloolefin polymer film which is preferably used, The polarizing plates may be manufactured by a general method. It is preferable that alkali-saponified protective films are pasted onto both faces of the polarizing plate with an aqueous solution of completely saponified polyvinylalcohol.

(Stereoscopic Image Display Panel)

The liquid crystal panel of the present invention may be used for a stereoscopic image display device.

For example, the stereoscopic image display device is composed of the liquid crystal panel and liquid crystal shutter glasses. The liquid crystal shutter glasses may be composed of (1) a protective film, liquid crystal cell and polarizer in this order, or (2) a protective film, polarizer, liquid crystal cell and polarizer in this order.

The liquid crystal panel alternately displays right-eye images and left-eye images, which are stereoscopic disparity images of an object, and the liquid crystal shutter glasses distributes the images to right and left eyes respectively to visualize stereoscopic images.

Because precise disparity is required in the stereoscopic image display panel, it is preferable that the base film with the hard coat layer, which is pasted on the front plate, does not have phase difference. It is preferable that the retardation Ro in the in-plane direction represented by the following equation is 0 to 5 nm and the retardation Rth in the thickness direction represented by the following equation is −10 to 10 nm.

$$Ro = (nx - ny) \times d \quad \text{Equation (i)}$$

$$Rth = \{(nx + ny)/2 - nz\} \times d \quad \text{Equation (ii)}$$

(In the equations, nx, ny and nz are refractive indexes in the condition of 23° C., 55% RH and 590 nm, where nx represents the maximum refractive index in the film plane (also called refractive index in the slow axis direction); ny represents the refractive index in the direction perpendicular to the slow axis in the film plane; nz represents the refractive index of the film in the thickness direction; and d is the film thickness (nm).

The above retardations can be determined by the measurement with an automatic birefringence meter KOBRA-21ADH (Oji Scientific Instruments Co.) in the environment of 23° C. and 55% RH at a wavelength of 590 nm.

The base film having little phase difference as described above can be obtained by adding the polymer described below.

<Sealing Layer>

The sealing layer 3 of the present invention is a sealing layer containing the ultraviolet curing sticking agent and is cured by ultraviolet irradiation to bring the liquid crystal panel into close contact with the front plate.

The ultraviolet curing sticking agent includes an ultraviolet curing component and a photopolymerization initiator, and if necessary, further includes a commonly used additive such as a cross-linker, tackifier, filler, anti-aging agent or coloring agent.

The ultraviolet curing component may be any monomer, dimer, oligomer or polymer which has a carbon-to-carbon double bond in the molecule and is curable by radical polymerization. Examples thereof include, for example, esters of (meth)acrylic acid and polyol such as trimethylolpropane tri(meth)acrylate, pentaerythritol tri(meth)acrylate, tetraethyleneglycol di(meth)acrylate, 1,6-hexanediol (meth)acrylate, neopentylglycol di(meth)acrylate and dipentaerythritol hexa(meth)acrylate; ester acrylate oligomers, and isocyanurates or isocyanurate compounds such as 2-propenyl-di-3-butenylcyanurate, 2-hydroxyethyl-bis(2-acryloxyethyl)isocyanurate, tris(2-methacrylaoxyethyl)isocyanurate and tris(2-methacryloxyethyl)isocyanurate. If an ultraviolet curing polymer having a carbon-to-carbon double bond in the polymer side chain is used as an acrylic polymer, it is not particularly required to add the above ultraviolet curing component.

In addition, for example, a photoelastic resin "SVR" produced by Sony Chemical & Information Device Corp, which is mainly composed of acrylic-based ultraviolet curing resin, and the like is a suitable commercially available ultraviolet curing component.

However, the present invention is not limited by a specific ultraviolet curing component, and various curing components may be used as long as they are not apart from the technical idea of the present invention and they are curable by ultraviolet ray in terms of simplicity of manufacturing.

The photopolymerization initiator may be any substance which is cleaved by ultraviolet ray of the wavelength triggering the polymerization reaction so as to produce a radical. Examples include, for example, benzoinalkylethers such as benzoinmethylether, benzoinisopropylether and benzoinisobutylether; aromatic ketones such as benzyl-, benzoyl-, benzophene- and α-hydroxycyclohexyl phenylketone, aromatic ketals such as benzyldimethylketal; polyvinylbenzophenone; thioxanthones such as chlorothioxanthone, dodecylthioxanthone, dimethylthioxanthone and diethylthioxanthone. Further, examples of the cross-linker include, for example, polyisocyatate compounds, melamine resin, urea resin, polyamine, carboxyl group containing polymer and the like.

Forms of the above sticking agents may be solvent, emulsion, hot-melt or the like, and forms of solvent or emulsion are generally used. As necessary, the sticking agents may be prepared in the form of coating liquid by adding other auxiliary agents. Examples of the other auxiliary agents may include viscosity depressants, thickeners, pH adjusters, defoamers, preservatives and antifungal agents, pigments, inorganic fillers, stabilizers, wetting agents, moisturizers and the like.

The sealing layer may be formed by applying a coating composition of the sealing layer using a known method such as gravure coating, dip coating, reverse coating, wire bar coating, die coating and inkjet, followed by subsequent heating and drying, and curing by ultraviolet ray.

The sealing layer has an average dry film thickness of 0.1 to 50 μm, preferably 1 to 40 μm, particularly 10 to 30 μm.

The light source for the ultraviolet curing may be any ultraviolet emitting light source. For example, a low-pressure mercury lamp, middle-pressure mercury lamp, high-pressure mercury lamp, ultrahigh-pressure mercury lamp, carbon arc lamp, metal halide lamp, xenon lamp or the like may be used.

While irradiation conditions vary depending on types of lamps, ultraviolet irradiation dose is normally 1,000 to 6,000 $mJ/cm^2$ in terms of integral of light, and preferably 2,000 to 5,000 $mJ/cm^2$.

<Front Plate>

The front plate 4 is required to be transparent, flat and physically strong. The front plate 4 is formed using glass, acrylic resin or the like.

<Adhesive Layer>

The adhesive layer 5 of the present invention is a layer containing a sticking agent (including adhesive) which bonds the front plate and the base film with the hard coat layer of the present invention together.

The sticking agent may be any pressure sensitive agent such as rubber-based sticking agent, acrylic sticking agent and silicone-based sticking agent. In general, an acrylic sticking agent is used because it is clear and colorless and has good adhesiveness to a liquid crystal cell. It is preferable that the acrylic sticking agent has a weight average molecular weight of a base polymer of 300,000 to 2,500,000 or around.

The monomer of an acrylic polymer which is the base polymer of the acrylic sticking agent may be various types of alkyl (meth)acrylate, (where alkyl (meth)acrylate represents alkyl acrylate and/or alkyl methacrylate, and (meth) means the same in the following). Specific examples of alkyl (meth)acrylate include, for example, methyl (meth)acrylate, ethyl (meth acrylate, butyl (meth)acrylate and 2-ethylhexyl (meth)acrylate. These alkyl (meth)acrylates may be used alone or in combination. In order to impart polarity to the acrylic polymer to be obtained, (meth)acrylic acid, glycidyl (meth)acrylate, 2-hydroxyethyl (meth)acrylate, N-methylol (meth)acylamide or the like may also be used in place of a part of alkyl (meth)acrylate. Further, other co-polymerizable monomers such as vinyl acetate and styrene may be used together as desired to the extent that the acrylic polymer does not lose its sticking properties.

The acrylic polymer may be manufactured by various known methods, for example, by radical polymerization such as bulk polymerization, solution polymerization and suspension polymerization as needed. The radical polymerization initiator may be of various known types such as azo-based compounds and peroxide-based compounds. Among the above manufacturing methods, solution polymerization is preferable, where polar solvent such as ethyl acetate or toluene is generally used as the solvent of the acrylic polymer.

The base polymer of the rubber-based sticking agent may be, for example, natural rubber, isoprene-based rubber, styrene-butadiene-based rubber, reclaimed rubber, polyisobutylene-based rubber, and may further bestyrene-isoprene-styrene-based rubber, and styrene-butadiene-styrene-based rubber and the like. The base polymer of the silicone sticking agent may be, for example, dimethylpolysiloxane, diphenylpolysiloxane and the like.

Further, the sticking agent preferably contains a cross-linker. Examples of the cross-linker include polyisocyanate compounds, polyamine compounds, melamine resin, urea resin, epoxy resin, metal chelates and the like. Furthermore, the sticking agent may be used with as necessary a tackifier, plasticizer, filler, antioxidant, ultraviolet absorber, silane coupling agent and the like to the extent not being apart from the object of the present invention.

In view of the retardation of the sticking agent layer itself and its dimensional stability, it is preferable that the thickness (dry thickness) of the sticking agent layer is thinner, and specifically 5 to 30 μm or around.

<Adhesion Improver Containing Resin Layer>

The adhesion improver containing resin layer of the present invention is provided between the base film and the hard coat layer.

<Compound Having an Absorption Maximum Peak (λmax) in a Wavelength Range of 260 to 400 nm>

The adhesion improver containing resin layer of the present invention characteristically contains a compound (hereinafter referred to as an adhesion improver) having an absorption maximum peak (λmax) in a wavelength range of 260 to 400 nm as the adhesion improver in an amount of 0.005 to 0.5 parts by mass with respect to 100 parts by mass of a binder resin of the adhesion improver containing resin layer.

It is preferable that the adhesion improver is contained in such an amount that it does not affect the amount of ultraviolet irradiation to the sealing layer while the hard coat film does not develop wrinkles or distortion between the hard coat layer and the base film or delamination of the hard coat layer. It is more preferable that the content is 0.005 to 0.1 part by mass with respect to 100 parts by mass of the binder resin.

The base film which is provided with the adhesion improver containing resin layer has a light transmittance at 380 nm wavelength of preferably 30% or more, more preferably 51% or more, and particularly 70% or more.

Whether the adhesion improver is a compound having an absorption maximum peak (λmax) in a wavelength range of 260 to 400 nm can be determined by an ordinary method using a spectrophotometer where the compound is dissolved to a suitable solvent (e.g., dichloromethane or toluene) or the like with, for example, a spectrophotometer UVIDFC-610 by Shimadzu Corp., self-recording spectrophotometer model 330, self-recording spectrophotometer model U-3210, self-recording spectrophotometer model U-3410 or self-recording spectrophotometer model U-4000 by Hitachi Corp. or the like.

Examples of the adhesion improver of the present invention include, for example, oxybenzophenone-based compound, benzotriazole-based compound, salicylate ester-based compound, benzophenone-based compound, cyanoacrylate-based compound, nickel complex salt-based compound and triazine-based compound. Among these compounds, benzotriazol-based compounds, benzophenone-based compounds and triazine-based compounds are preferable because these compounds cause little coloration.

It is preferable that the adhesion improver has good absorbance of ultraviolet ray at a wavelength of 370 nm or less as well as little absorbance of visible light at a wavelength of 400 nm or more in terms of liquid crystal display properties.

Further, in the present invention, ultraviolet irradiation is performed to cure the sealing layer as described below. It is thus more preferable that the adhesion improver has an absorption maximum in a wavelength range of 260 nm to 355 nm because such adhesion improver has better adhesion improving effect per ultraviolet irradiation dose.

(Benzotriazole-Based Compound)

Preferably used benzotriazol-based compounds of the present invention are compounds represented by the following general formula (A).

[Chemical formula 1]

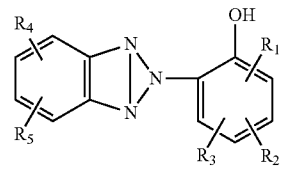

General formula (A)

In the formula, $R_1$, $R_2$, $R_3$, $R_4$ and $R_5$ may be the same or different, each of which independently represents a hydrogen atom, halogen atom, nitro group, hydroxyl group, alkyl group, alkenyl group, aryl group, alkoxy group, acyloxy group, aryloxy group, alkylthio group, arylthio group, mono- or dialkylamino group, acylamino group or heterocyclic group of 5 or 6 members, and $R_4$ and $R_5$ may cyclize to form a carbon ring of 5 or 6 members.

Further, the above-described groups may include any substituents.

Specific examples of the compound represented by the general formula (A) will be listed below, but not limited thereto.

Useful benzotriazol-1-based compounds for the present invention include 2-(2'-hydroxy-5'-methylphenyl)benzotriazol, 2-(2'-hydroxy-3',5'-di-tert-butylphenyl)benzotriazol, 2-(2'-hydroxy-3'-tert-butyl-5'-methylphenyl)benzotriazol, 2-(2'-hydroxy-3',5'-di-tert-butylphenyl)-5-chlorobenzotriazol, 2-(2'-hydroxy-3'-(3",4",5",6"-tetrahydrophthalimidemethyl)-5'-methylphenyl)benzotriazol, 2,2-methylenebis(4-(1,1,3,3-tetramethylbutyl)-6-(2H-benzotriazol-2-yl) phen) 2-(2-hydroxy-3'-tert-butyl-5-methylphenyl)-5-chlorobenzotriazol, 2-(2H-benzaotriazol-2-yl)-6-(linear- and branched dodecyl)-4-methylphenol, a mixture of octyl-3-[3-tert-butyl-4-hydroxy-5-(chloro-2H-benzotriazol-2-yl) phenyl]propionate and 2-ethylhexyl-3-[3-tert-butyl-4-hydroxy-5-(5-chloro-2H-benzotriazol-2-yl)phenyl]propionate and the like, but not limited thereto. Further, among commercially available products, TINUVIN 109, TINUVIN 171, TINUVIN 326 and TINUVIN 928 (all BASF Japan Ltd.) are preferably used.

(Benzophenone-Based Compound)

Preferably used benzophenone-based compounds of the present invention are compounds represented by the following general formula (B).

[Chemical formula 2]

General formula (B)

In the formula, Y represents a hydrogen atom, halogen atom, alkyl group, alkenyl group, alkoxy group or phenyl group, where alkyl, alkenyl and pheynyl group may have substituent(s); A represents a hydrogen atom, alkyl group, alkenyl group, phenyl group, cycloalkyl group, alkylcarbonyl group, alkylsulfonyl group or —CO(NH)n-1-D group where D represents an alkyl group alkenyl group or a phenyl group with or without substituent(s); and m and n each represent 1 or 2.

In the above description, for example, the alkyl group represents a linear or branched aliphatic group having up to 24 carbon atoms, the alcoxy group represents an alcoxy group of up to 18 carbon atoms, and the alkenyl group represents an alkenyl group of up to 16 carbon atoms such as ally, group and 2-butenyl group. Examples of the substituent of the alkyl, alkenyl and phenyl group include halogen atoms such as chlorine, bromine and fluorine atoms, hydroxyl group, phenyl group (this phenyl group may have substituent(s) such as alkyl group or halogen atom) and the like.

Specific examples of the benzophenone-based compounds represented by the general formula (B) will be listed below, but not limited thereto.

Examples include, for example, 2,4-dihydzroxybenzophenone, 2,2'-dihydroxy-4-methoxybenzophenone, 2-hydroxy-4-methoxy-5-sulfobenzophenone, bis(2-methoxy-4-hydroxy-5-benzoylphenylmethane) and the like.

Among commercially available products, CHIMASSORB 81 (BASF Japan Ltd.) is preferably used.

(Binder Resin)

The binder resin used in the adhesion improver containing resin layer of the present invention is preferably a thermoplastic resin or active ray (e.g. ultraviolet ray) curing resin, and is applied in the form of solution dissolved in a suitable solvent.

The thermoplastic resin may be, for example, cellulose acylates such as cellulose diacetate, cellulose triacetate, cellulose acetatebutylate, cellulose acetatephthalate, cellulose acetatepropionate and cellulose nitrate, polyesters such as polyvinyl acetate, polystyrene, polycarbonate, polybutylene terephthalate and copolybutylene tere/iso-phthalate, polyvinylalcohol derivatives such as polyvinylalcohol, polyvinylformal, polyvinylacetal, polyvinylbutyral and polyvinylbenzal, norbornene-based polymers having a norbornene compound; and acrylic resins such as copolymers including methyl methacrylate, e.g., polymethylmethacry late, but not particularly limited thereto.

Active ray curing resin is a resin which is curable by cross-linking reaction or the like by active ray irradiation such as ultraviolet ray or electron beam. Representative examples of the active ray curing resin include ultraviolet curing resins and electron beam curing resins, and may also include other resins which are curable by active ray irradiation besides ultraviolet ray and electron beam. Examples of the ultraviolet curing resin include, for example, ultraviolet curing acrylic urethane-based resin, ultraviolet curing polyester acrylate-based resin, ultraviolet curing epoxy acrylate-based resin, ultraviolet curing polyol acrylate-based resin, ultraviolet curing epoxy resin and the like.

In general, an ultraviolet curing acrylic urethane-based resin can be obtained easily by such a way that a polyester polyol is reacted with an isocyanate monomer or prepolymer, and the obtained product is further reacted with an acrylate-based monomer having a hydroxyl group such as 2-hydroxyethyl acrylate, 2-hydroxyethyl methacrylate (hereinafter, "acrylate" will be defined to include methacrylate, even if simply denoted as "acrylate") or 2-hydroxypropyl acrylate (see Japanese Patent Application Laid-Open Publication No. Sho59-151110, for example).

In general, an ultraviolet curing polyester acrylate-based resin can be obtained easily by such a way that a polyester polyol is reacted with an acrylate-based monomer such as 2-hydroxyethyl acrylate or 2-hydroxy acrylate (see Japanese Patent Application Laid-Open Publication No. Sho59-151112, for example).

Specific examples of ultraviolet curing epoxy acrylate-based resin include compounds obtained in such a way that an epoxy acrylate is reacted to be an oligomer, and is further reacted by adding a reactive solvent and photoreaction initiator thereto (see Japanese Patent Application Laid-Open Publication No. Hei1-105738, for example). This photoreaction initiator may be selected from one or more type of benzoin derivatives, ketoneoxime derivatives, benzophenone derivatives and thioxanthone derivatives.

Further, specific examples of ultraviolet curing polyol acrylate-based resin include trimethylolpropane triacrylate, ditrimethylolpropane tetraacrylate, pentaerythritol triacrylate, pentaerythritol tetraacrylate, dipentaerythritol hexaacrylate, alkyl-modified dipentaerythritol pentaacyrylate and the like. These resins are normally used in combination with a known photosensitizer. The above photoreaction initiator may also be used as the photosensitizer. Specific examples include acetophenone, benzophenone, hydroxybenzophenone, Michier's ketone, α-amyloxime ester, tetramethyluram monosulfide, thioxanthone and the like and the derivatives thereof. If an epoxy acrylate-based photoinitiator is used, n-butylamine, triethylamine, tri-n-butylphosphixne or the like may be used as a sensitizer. The amount of the photoreaction initiator or photosensitizer which is used in the ultraviolet curing resin composition is 0.1 to 15 parts by mass, preferably 1 to 10 parts by mass with respect to 100 parts by mass of the composition.

Further, other additives such as matte agent, surfactant and antistat may be added as necessary.

It is preferable that the application composition of the present invention which contains the adhesion improver, binder resin and other additives is applied with a suitable organic solvent. The employable organic solvents include alcohols such as methanol, ethanol, propanol, n-butanol, 2-butanol and tert-butanol, ketones such as methylethylketone, methylisobutylketone and acetone, esters such as ethyl acetate, methyl acetate, ethyl lactate, isopropyl acetate, amyl acetate and ethyl butyrate, glycolethers (propyleneglycol mono (C1-C4) alkylether (specifically, propyleneglycol monomethylethylether (PGME), propyleneglycol mono-ethylether, propyleneglycol mono-n-propylether, propyleneglycol monoisopropylether, propyleneglycol monobutylether and the like), propyleneglycol mono (C1-C4) alkyletherester (propyleneglycol monomethyletheraceatate and propyleneglycol monoethyletheracetate)) and other solvents. The solvent is not particularly limited to the above, and a suitable mixture of the above is preferably used.

The above application composition may be applied by doctor coating, extrusion coating, slide coating, roll coating, gravure coating, wire bar coating, reverse coating, curtain coating, extrusion coating or extrusion coating with a hopper described in U.S. Pat. No. 2,681,294 specification, to form a layer having a dry thickness of normally 0.1 to 10 μm. The dry thickness is more preferably 0.1 to 5 μm, and particularly 0.1 to 3 μm.

In the case of thermal curing, heating temperature is preferably 50° C. to 300° C., preferably 60° C. to 250° C., and more preferably 80° C. to 150° C. Although depending on the heating temperature, heating time is appropriately in a range of 3 to 300 minutes.

After applied and dried, the application composition containing the ultraviolet curing resin is irradiated with ultraviolet ray from a light source. For example, a low-pressure mercury lamp, middle-pressure mercury lamp, high-pressure mercury lamp, ultrahigh-pressure mercury lamp, carbon arc lamp, metalhalide lamp or xenon lamp may be used. Although irradiation conditions depend on the lamp, a sufficient irradiation dose is about 20 to 10,000 mJ/cm², and preferably 50 to 2,000 mJ/cm⁻¹. In a range of near-ultraviolet to visible light, a sensitizer having an absorption maximum within such range may be used.

[Base Film]

The base film of the present invention where the adhesion improver containing resin layer of the present invention is provided is preferably a polymer film, but not particularly limited. The base film is preferably to be easily produced, optically uniform and optically transparent. As long as having these characterstics, the base film may be any film such as cellulose acylate-based film, polyester-based film, polycarbonate-based film, polyarylate-based film, polysulfone (including polyethersulfone)-based film, polyester film such as polyethylene terephthalate and polyethylene naphthalate, polyethylene film, polypropylene film, cellophane, cellulose diacetate film, cellulose acetate butyrate film, polyvinylidene chloride film, polyvinyl alcohol film, ethylenevinyl alcohol film, syndiotactic polystyrene-based film, polycarbonate film, norbornene resin-based film, polymethylpentene film, polyether ketone film, polyether ketone imide film, polyamide film, fluorine-containing resin film, nylon film, cycloolefin resin film, polyvinyl acetal-based resin film, polymethyl methacrylate film or acrylic film, but not limited thereto. These films are preferably manufactured by solution film casting or melt casting. Among these films, cellulose acylate film, polycarbonate film, polysulfone (including polyethersulfone), cycloolefin resin film are preferable. For the present invention, cellulose acylate film and cycloolefin resin film are particularly preferable in terms of manufacturing, cost, transparency, uniformity, adhesiveness and the like.

The followings are descriptions of the cellulose acylate and cycloolefin resin of the cellulose acylate film and cycloolefin resin film which are preferable for the present invention.

<Cellulose Acylate>

It is preferable that the base film of the present invention where the adhesion improver containing resin layer of the present invention is provided contains cellulose acylate used for an optical film.

Such a cellulose acylate preferably has an aliphatic acyl group having two or more carbon atoms, and more preferably has a total acyl substitution degree of 1.0 to 2.95 and a total acyl carbon number of 2.0 to 9.5.

The total acyl carbon number of the cellulose acylate is preferably 4.0 to 9.0, and more preferably 5.0 to 8.5. The total acyl carbon number represents the sum of products of the substitution degree and the carbon number of respective acyl groups on a glucose unit of the cellulose acylate.

Further, the carbon number of the aliphatic acyl group is preferably from two or more to six or less, more preferably from two or more to four or less in terms of productivity and cost of cellulose synthesis. The portions not substituted with acyl groups normally exists in the form of hydroxyl groups.

The glucose units which constitute cellulose with β-1,4-glycoside bond have free hydroxy (hydroxyl) groups at 2-, 3- and 6-positions. The cellulose acylate of the present invention is a polymer where such hydroxy (hydroxyl) groups are partially or fully esterified by acyl groups. The acyl substitution degree represents the sum of the esterification proportions of cellulose at 2-, 3- and 6-positions of the repeating unit. Specifically, the substitution degree is one when the hydroxy (hydroxyl) groups at each of 2-, 3- and 6-positions of cellulose are esterified by 100%. Thus, if cellulose is esterified at all 2-, 3- and 6-positions by 100%, the substitution degree is the maximum value, namely three.

Examples of the acyl group include, for example, acetyl group, propionyl group, butyryl group, pentanate group, hexanate group and the like, and examples of the cellulose acylate accordingly include cellulose acetate, cellulose propionate, cellulose butyrate, cellulose pentanate and the like, the cellulose acylate may be a mixed aliphatic acid ester such as cellulose acetate, cellulose acetate-propionate, cellulose propionate, cellulose acetate-butyrate or cellulose aceate-pentanate, as long as the above side chain carbon number is satisfied. Among these cellulose acetates, triacetyl cellulose, diacetyl cellulose and the like are preferable for an optical film.

Besides cellulose triacetate, a preferable cellulose acylate has acyl substituents of 2 to 4 carbon atoms which fulfills both of the following inequalities (I) and (II) where X represents the acetyl substitution degree, and Y represents the propionyl or butyryl substitution degree.

$$1.5 \leq X+Y \leq 2.95 \quad \text{Inequality (I)}$$

$$1.5 \leq X \leq 2.95 \quad \text{Inequality (II)}$$

The portions not substituted with an acyl group normally exists in the form of a hydroxy (hydroxyl) group. The acyl substitution degree can be measured according to ASTM-D817-96.

The cellulose acylate of the present invention has a weight average molecular weight Mw of preferably 50,000 to 500,000, more preferably 100,000 to 300,000, and further more preferably 150,000 to 250,000.

The average molecular weight and molecular weight distribution of the cellulose acylate can be measured by high-performance liquid chromatography. Accordingly, the weight average molecular weight (Mw) and molecular weight distribution are calculated using the above technique.

The measurement conditions are as follows.

Solvent: Methylene chloride
Column: Shodex K806, K805, K803G (Showa Denko K.K., used by connecting these three columns)
Column temperature: 25° C.
Sample concentration: 0.1 mass %
Detector: RI Model 504 (GL Science Inc.)
Pump: L6000 (Hitachi Corp.)
Flow rate: 1.0 ml/min
Calibration curve: Standard Polystyrene STK (TOSOH Corp.)

A calibration curve based on 13 samples in a range of Mw=1,000,000 to 500 was used. It is preferable that the 13 samples are distributed at approximately regular intervals.

Cellulose, the raw material of the acylate cellulose of the present invention, may be wood pulp or cotton linter. The wood pulp may be of either softwood or hardwood, but softwood pulp is preferably used. The cellulose acylate made from these sources of cellulose may be used alone or as a suitable mixture.

For example, the ratio of cellulose acylate made from cotton linter:cellulose acylate made from wood pulp (softwood):cellulose acylate made from wood pulp (hardwood) may be 100:0:0, 90:10:0, 85:15:0, 50:50:0, 20:80:0, 10:90:0, 0:100:0, 0:0:100, 80:10:10, 85:0:15 or 40:30:30.

In the present invention, the cellulose preferably has a high polymerization degree. For example, the cellulose is preferably linter pulp. The cellulose to be used is preferably composed of at least linter pulp. The α-cellulose content as an indication of cellulose crystallinity is 90% or more (for example, about 92 to 100%, preferably 95 to 100%, and more preferably 99.5 to 100% or around).

The cellulose acylate of the present invention may be produced by a known method. In general, cellulose as the raw material is mixed with a predetermined organic acid (acetic acid, propionic acid or the like), acid anhydride (acetic anhydride, propionic anhydride or the like) and a catalyst (sulfuric acid or the like) so as to esterify the cellulose, and the reaction is continued until cellulose triester is formed. In cellulose triester, the three hydroxy (hydroxyl) groups of each glucose unit are substituted with acyl acids of organic acids. By the concurrent use of two organic acids, a mixed ester-type cellulose acylate such as cellulose acetate-propionate and cellulose acetate-butyrate can be produced. Subsequently, the cellulose triester is hydrolyzed to synthesize cellulose acylate having a desired acyl substitution degree. Thereafter, filtration, precipitation, washing with water, dehydration, drying and the like are performed, and then the cellulose acylate is obtained.

Specifically, it can be synthesized with reference to the method described in Japanese Patent Application Laid-Open Publication No. Hei10-45804.

<Cycloolefin Resin>

The cycloolefin resin which is suitable for the component of the base film of the present invention is a non-crystalline resin having alicyclic structure(s) in the main and/or side chain. The alicyclic structure of the cycloolefin resin may be saturated alicyclic hydrocarbon (cycloalkane) structure, unsaturated alicyclic hydrocarbon (cycloalkene) structure or the like. In terms of mechanical strength, heat resistance and the like, cycloalkane structure is preferable. The number of carbon atoms constituting the alicyclic structure is not particularly limited. However, it is advantageous that the characteristics of mechanical strength, heat resistance and film moldability are highly balanced when the number of carbon atoms is 4 to 30 in general, preferably 5 to 20, and more preferably 5 to 15.

The proportion of the repeating unit including the alicyclic structure and constituting the cycloolefin resin is preferably 55 mass % or more, more preferably 70 or more mass %, particularly 90 mass % or more. In terms of transparency and heat resistance, it is preferable that the proportion of the repeating unit including the alicyclic structure in the cycloolefin resin is within these ranges.

Examples of the cycloolefin resin include norbornene-based resin, monocyclic olefin-based resin, cyclic conjugated diene-based resin, vinyl alicyclic hydrocarbon-based resin, and hydrogenated products of these resins. Among these resins, norbornene-based resin is suitably used because of its good transparency and moldability.

Examples of the norbornene-based resin include, for example, ring-opening polymers of monomers having a norbornene structure, ring-opening copolymers of monomers having a norbornene structure and other monomers, and the hydrides of the polymers or copolymers; addition polymers of monomers having a norbornene structure, addition copolymers of monomers having a norbornene structure and other monomers, the hydrides of the polymers or copolymers and the like. Among them, the hydrides of the open-ring (co)polymer of monomers having a norbornene structure is particularly suitable in terms of transparency, moldability, heat resistance, low hygroscopicity, dimensional stability, light-weight and the like.

Examples of the monomers having a norbornene structure include bicylco[2.2.1]hept-2-ene (trivial name: norbornene), tricyclo[4.30.12,5]deca-3,7-diene (trivial name: dicyclopentadiene), 7,8-benzotricyclo[4.3.0.2, 5]deca-3-ene (trivial name: methanotetrahydrofluorene), tetracyclo[4.4.0.2,5.17, 10]dodeca-3-ene (trivial name: tetracyclododecene) and derivatives of these compounds (e.g., a derivative having substituent(s) at the ring). Examples of the substituent include, for example, an alkyl group, alkylene group and polar group and the like. A plurality of substituents, which may be the same or different, may be bonded to the ring. The monomers having a norbornene structure may be used alone, or two or more types of which can be combined.

Types of polar group include hetero atoms, atomic groups having hetero atoms and the like. Examples of the hetero atoms include an oxygen atom, nitrogen atom, sulfur atom, silicon atom, halogen atom and the like. Specific examples of the polar groups include carboxy group, carbonylaoxycarbonyl group, epoxy groups, hydroxy group, oxy groups, ester groups, silanol groups, silyl groups, amino group, nitrile group, sulfone groups and the like. In order to obtain a film having low saturated water absorption ratio, a lower amount of the polar groups is preferable, and absence of the polar groups is more preferable.

Examples of other monomers which are polymerizable with the monomers having a norbornene structure by ring-opening copolymerization include monocyclicolefins such as cyclohexene, cycloheptene and cyclooctene and derivatives thereof; cyclic conjugated dienes such as cyclohexadiene and cycloheptadiene and derivatives thereof; and the like.

The ring-opening polymers of the monomers having a norbornene structure and the ring-opening copolymers of the monomers having a norbornene structure and other monomers copolymerizable therewith may be obtained by (co)polymerizing the monomers under the presence of a known ring-opening polymerization catalyst.

Examples of other monomers which are polymerizable with the monomers having a norbornene structure by addition copolymerization include, for example, ethylene, propylene, α-olefins of 2 to 20 carbon atoms such as 1-butene and derivatives thereof; resins of cycloolefin such as cyclobutene, cyclopentene and cyclohexene and derivatives thereof; unconjugated dienes such as 1,4-hexadiene, 4-methyl-1,4-hexadiene and 5-methyl-1,4-hexadiene; and the like. These monomers may be used alone or in combination of two or more of them. Among the above monomers, α-olefins are preferable, and ethylene is more preferable.

The addition polymers of the monomers having a norbornene structure and the addition copoly ers of the monomers having a norbornene structure and other monomers copolymerizable therewith can be obtained by polymerizing the monomers under the presence of a known addition polymerization catalyst.

The hydrides of the ring-opening polymers of the monomers having a norbornene structure, hydrides of the ring-opening copolymers of the monomers having a norbornene structure and other monomers copolymerizable therewith, hydrides of the addition polymers of the monomers having a norbornene structure and hydrides of the addition copolymers of the monomers having a norbornene structure and other monomers copolymerizable therewith may be obtained by such a way that a known hydrogenation catalyst containing a transition metal such as palladium is added to a solution of a ring-opening (co)polymer or addition (co) polymer, and the solution is then made contact with hydrogen so that carbon-carbon unsaturated bonds are hydrogenated preferably by 90% or more.

Among the norbornene-based resins, preferable resins have repeating units of X: bicyclo[3.3.0]octane-2,4-diyl-ethylene structure and Y: tricyclo[4.3.0.12,5]decane-7,9-diyl-ethylene structure, wherein the content of these repeating units are 90% or more with respect to all repeating units of the norbornene-based resin, and the ratio of X content to Y content, X:Y, is 100:0 to 40:60 by mass. By use of such resins, the base film having no dimension change in the long term and good stability in optical characteristics can be obtained.

The molecular weight of the cycloolefin resin which is suitably used in the present invention is appropriately selected according to the purpose of use. However, the weight average molecular weight (Mw) is normally 15,000 to 50,000, preferably 18,000 to 45,000, more preferably 20,000 to 40,000 in polyisoprene equivalent (polystyrene equivalent if the solvent is toluene), which is measured by gel permeation chromatography using cyclohexane (toluene if the resin is insoluble) as a solvent. If the weight average molecular weight is within these ranges, it is advantageous that the mechanical strength and moldability of the film are highly balanced.

The molecular weight distribution (weight average molecular weight (Mw)/number average molecular weight (Mn)) of the cycloolefin resin which is suitably used in the present invention is in a range of normally 1.0 to 10.0, preferably 1.1 to 4.0, and more preferably 1.2 to 3.5, but not particularly limited.

Glass transition temperature of the cycloolefin resin which is used in the present invention may be appropriately selected according to the purpose of use, and is in a range of preferably 80° C. or more, and more preferably 100 to 250° C. Films composed of a thermoplastic resin having a glass transition temperature within these ranges is excellent in durability, without causing deformation or stress under high temperature.

<Other Additives>

It is preferable that the base film of the present invention contains a plasticizer, retardation adjuster, anti-deterioration agent (antioxidant), stripping aid, surfactant, dye, fine particles and the like.

<Plasticizer>

Various compounds known as plasticizers may be used in the base film. The plasticizer is selected from polycarboxylate-based plasticizers, glycolate-based plasticizers, phthalate-based plasticizers, aliphatic acid ester-based plasticizers, polyol ester-based plasticizers, ester-based plasticizers, acrylic plasticizers and the like.

When two or more types of plasticizers are used, it is preferable that at least one type is a polyol ester-based plasticizer.

The polyol ester-based plasticizer is a plasticizer composed of an ester of an aliphatic polyol containing two or more hydroxyl groups and a monocarboxylic acid, and preferably have an aromatic ring or cycloalkyl ring in the molecule. Aliphatic polyol-based esters containing 2 to 20 hydroxyl groups are preferable.

The polyols which are preferably used in the present invention are represented by the following general formula (a).

$$R_{11}-(OH)_n \qquad \text{General formula (a)}$$

In the formula (a), $R_{11}$ represents an n-valent organic groups, n in the formula is a positive integer of 2 or more and the OH group represents an alcoholic and/or phenolic hydroxy (hydroxyl) group.

The followings are examples of preferable polyols, but the present invention is not limited thereto.

Examples include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, and the like.

In particular, triethylene glycol, tetraethylene glycol, dipropylene glycol, tripropyleneglycol, sorbitol, trimethylolpropane and xylitol are preferable.

The monocarboxylic acids used for the polyol esters are not particularly limited, and may be a known aliphatic monocarboxylic acid, alicyclic monocarboxylic acid, aromatic monocarboxylic acid or the like. It is preferable to use an alicyclic monocarboxylic acid or aromatic monocarboxylic acid because moisture permeability and retainability are improved.

The followings are examples of preferable monocarboxylic acids, but the present invention is not limited thereto.

Preferable aliphatic monocarboxylic acids are linear or branched aliphatic acids having 1 to 32 carbon atoms. The carbon number is more preferably 1 to 20, particularly 1 to 10. It is preferable to contain acetic acid because miscibility with the cellulose acylate is increased. It is also preferable to mix acetic acid with other monocarboxylic acids.

Preferable aliphatic monocarboxylic acids include saturated aliphatic acids such as acetic acid, propionic acid, butylic acid, valeric acid, carpoic acid, enanthic acid, caprylic acid, pelargonic acid, capric acid, 2-ethyl-hexanonic acid, undecylic acid, lauric acid, tridecylic acid, myristic acid, pentadecylic acid, palmitic acid, heptadecylic acid, stearic acid, nonadecanoic acid, arachidic acid, behenic acid, lignoceric acid, cerotic acid, heptacosanoic acid, montanoic acid, melissic acid and lacceric acid, unsaturated aliphatic acids such as undecylenic acid, oleic acid, sorbic acid, linoleic acid, linolenic acid and arachidonic acid, and the like.

Preferable aliphatic monocarboxylic acids include cyclopentane carboxylic acid, cyclohexane carboxylic acid, cyclooctane carboxylic acid, and derivatives thereof.

Preferable aromatic monocarboxylic acids include benzoic acid, compounds having one to three alkoxylic group(s) such as alkyl, methoxy and ethoxy group at the benzene ring of benzoic acid, e.g., toluic acid, aromatic monocarboxylic acids having two or more benzene rings such as biphenyl carboxylic acid, naphthalene carboxylic acid and tetralin carboxylic acid, and derivatives of the above. In particular, benzoic acid is preferable.

The molecular weight of the polyol esters is not particularly limited, but preferably 300 to 1,500, and more preferably 350 to 750. Larger molecular weight is preferable in terms of low volatility, while smaller molecular weight is preferable in terms of moisture permeability and miscibility with the cellulose acylate.

As for the carboxylic acid, one type, or a mixture of two or more types thereof can be used for the polyol ester. Further, the OH groups in the polyols may be fully esterified or partially left as OH groups.

The followings are specific examples of the polyol ester compounds.

[Chemical formula 3]

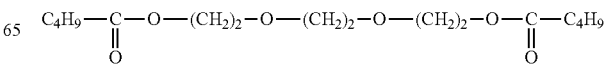

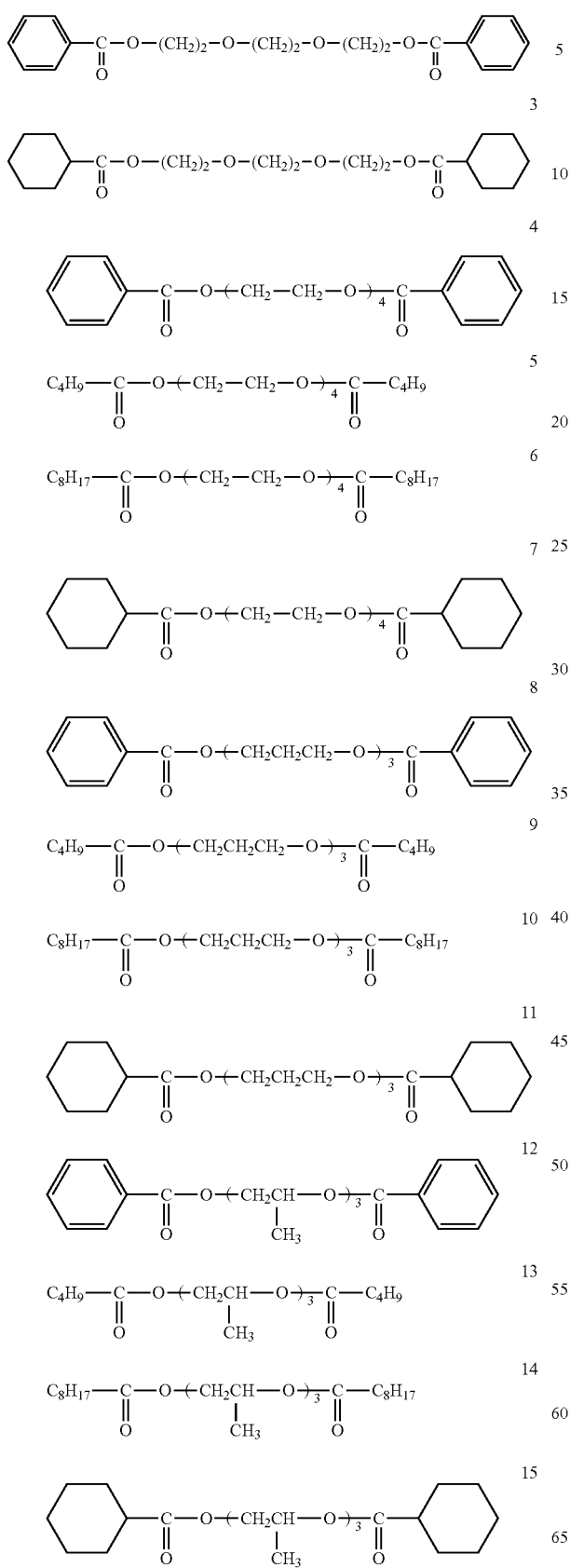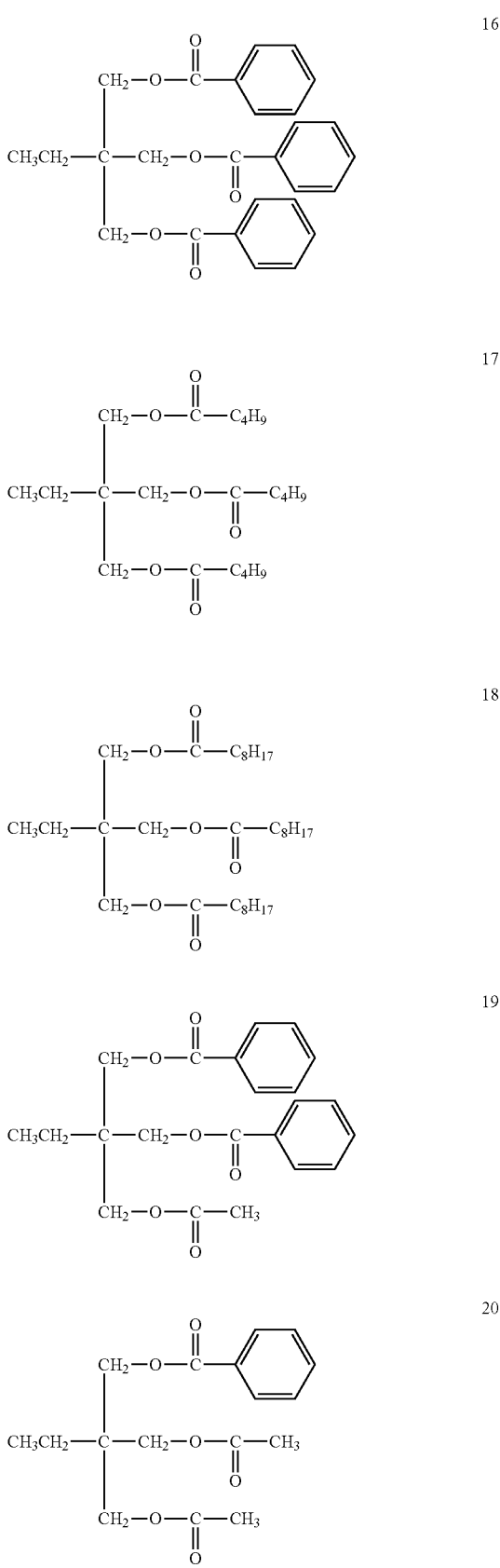

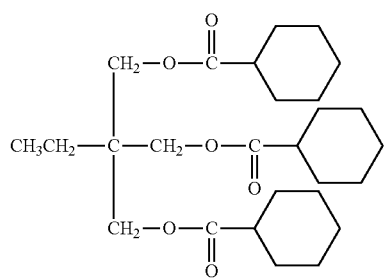
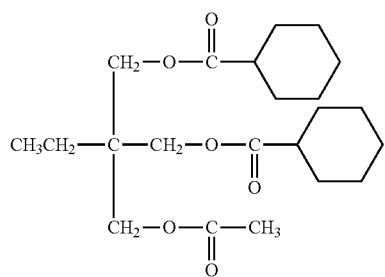
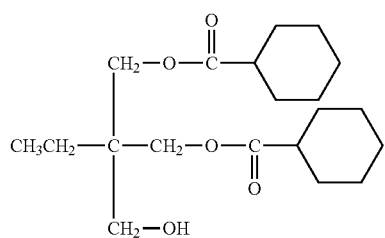
[Chemical formula 5]
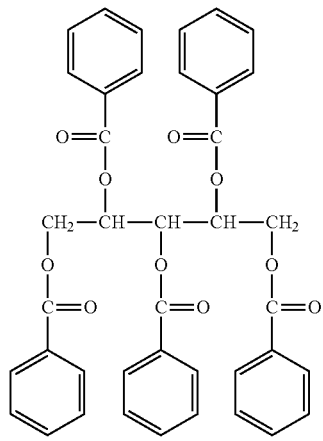
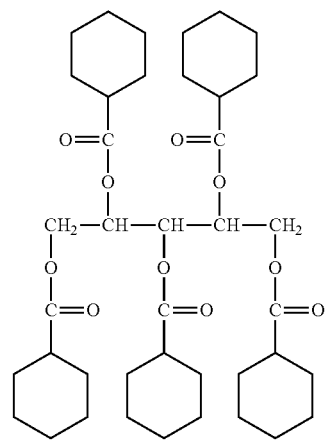
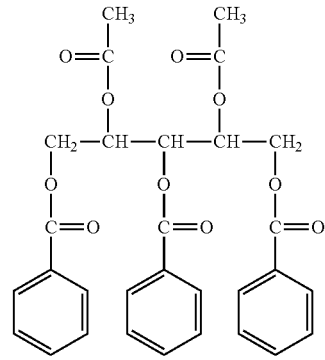
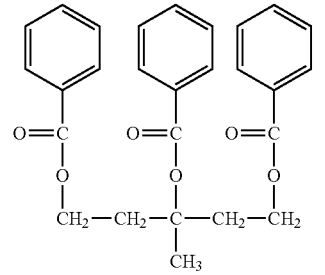
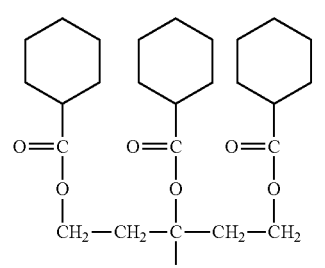
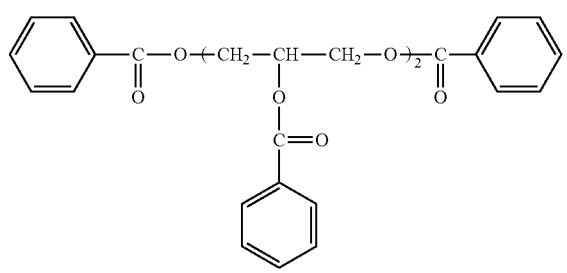

[Chemical formula 6]
-continued

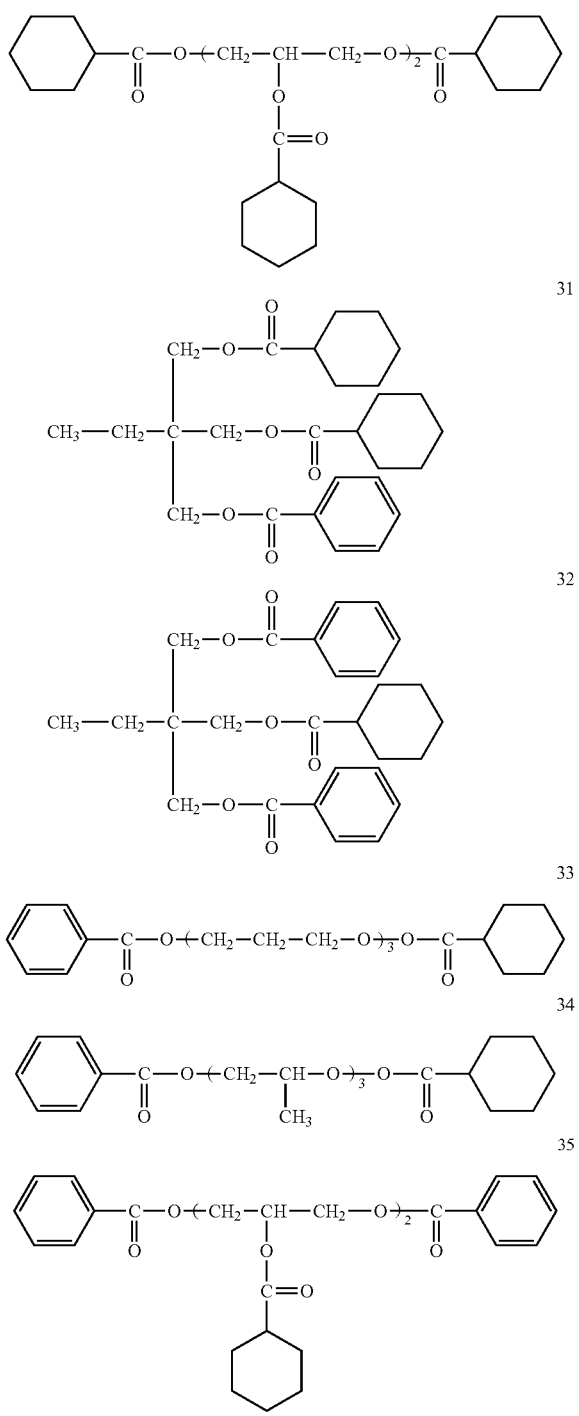

Although not particularly limited, preferably used glycolate-based plasticizers are alkylphthalyl alkyl glycolates.

Examples of the alkylphthalyl alkyl glycolates include, for example, methylphthalyl methyl glycolate, ethylphthalyl ethyl glycolate, propylphthalyl propyl glycolate, butylphthaly butyl glycolate, octylphthalyl octyl glycolate, methylphthalyl ethyl glycolate, ethylphthalyl methyl glycolate, ethylphthalyl propyl glycolate, methylphthalyl butyl glycolate, ethylphthalyl butyl glycolate, butylphthalyl methyl glycolate, butylphthalyl ethyl glycolate, propylphthalyl butyl glycolate, butylphthalyl propyl glycolate, methylphthalyl octyl glycolate, ethylphthalyl octyl glycolate, octylphthalyl methyl glycolate, octylphthalyl ethyl glycolate and the like.

Examples of the phthalate-based plasticizer include diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, dicyclohexyl terephthalate and the like.

Examples of the citrate-based plasticizers include acetyltrimethyl citrate, acetyltriethyl citrate, acetyltributyl citrate and the like.

Examples of the aliphatic acid ester-based plasticizers include butyl oleate, methylacetyl ricinolate, dibutyl sebacate and the like.

Examples of the phosphate-based plasticizers include triphenylphosphate, tricresylphosphate, cresyldiphenylphosphate, octyldiphenylphosphate, diphenylbiphenylphosphate, trioctylphosphate, tributylphosphate and the like.

The polycarboxylate compounds are composed of an ester of an alcohol and polycarboxylic acid containing 2 or more carboxylic groups, and preferably 2 to 20 carboxylic groups. It is preferable that the aliphatic polycarboxylic acid has 2 to 20 carboxylic groups, and the aromatic polycarboxylic acid and alicyclic polycarboxylic acid have 3 to 20 carboxylic groups.

The polycarboxylic acid is represented by the following general formula (b)

$$R_{12}(COOH)_{m1}(OH)_{n1} \qquad \text{General formula (b)}$$

In the formula, $R_{12}$ represents (m1+n1)-valent organic groups, m1 represents a positive integer of 2 or more, n1 is an integer of 0 or more, the COOH group represents a carboxylic group, and the OH group represents an alcoholic or phenolic hydroxy (hydroxyl) group.

The followings are examples of preferable polycarboxylic acids, but the present invention is not limited thereto.

Preferably used are aromatic polycarboxylic acids having 3 or more carboxylic groups such as trimellitic acid, trimesic acid and pyromellitic acid, and derivatives thereof, aliphatic polycarboxylic acids such as succinic acid, adipic acid, azelaic acid, sebacic acid, oxalic acid, fumaric acid, maleic acid and tetrahydrophthalic acid, oxy polycarboxylic acids such as tartaric acid, tartronic acid, malic acid and citric acid, and the like. In particular, oxypolycarboxylic acids are preferably used in terms of improvement in retainability.

The alcohol of the polycarboxylate compound which may be used in the present invention, is not particularly limited, and may be known alcohols or phenols.

For example, saturated or unsaturated linear or branched aliphatic alcohols having 1 to 32 carbon atoms are preferably used. The carbon number is more preferably 1 to 20, particularly 1 to 10.

Further, alicyclic alcohols such as cyclopentanol and cyclohexanol and derivatives thereof, aromatic alcohols such as benzylalcohol and cinnamylalcohol and derivatives thereof, and the like may be preferably used.

Particularly preferable polycarboxylate compounds include, for example, triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartarate, diacetyldibutyl tartarate, tributyl trimellitate, tetrabutyl pyromellitate and the like.

In the present invention, a phase difference reducer, anti-deteriorating agent, stripping agent, matte agent, lubricant and the like may be appropriately used as necessary.

<Phase Difference Reducer>
(High-Molecular-Weight Additive)

Because the base film of the present invention preferably has no phase difference, it is preferable to use a polymer which can reduce phase difference. The polymer has a repeating unit in the compound, and preferably has a number average molecular weight of 700 to 10,000. The number average molecular weight is more preferably 700 to 8,000, further more preferably 700 to 5,000, particularly 1,000 to 5,000.

The polymer is selected from polyester-based polymer, styrene-based polymer, acrylic polymer and copolymers thereof, and is preferably aliphatic polyester, acrylic polymer or styrene-based polymer. It is preferable that at least one polymer having negative intrinsic birefringence such as styrene-based polymer and acrylic polymer is contained.

The polyester-based polymer is a polymer which is obtained by the reaction of an aliphatic dicarboxylic acid having 2 to 20 carbon atoms with at least one diol compound selected from aliphatic diols having 2 to 12 carbon atoms and alkylether diols having 4 to 20 carbon atoms, where both ends of the reaction product may be left unchanged, or may be reacted with a monocarboxylic acid, monoalcohol or phenol, i.e., so-called end-capped. This end-capping is performed particularly in order to exclude free carboxylic acids, and thus effective in terms of storage stability and the like. It is preferable that the dicarboxylic acid which is used for the polyester-based polymer of the present invention is an aliphatic dicarboxylic acid residue having 4 to 20 carbon atoms or aromatic dicarboxylic acid residue having 8 to 20 carbon atoms.

Examples of the aliphatic dicarboxylic acid having 2 to 20 carbon atoms which is preferably used in the present invention include, for example, oxalic acid, malonic acid, succinic acid, maleic acid, fumaric acid, glutaric acid, adipic acid, pimelic acid, suberic acid, azelaic acid, sebacic acid, dodecane dicaroxylic acid and 1,4-cyclohexane dicarboxylic acid.

Among these dicarboxylic acid, preferable aliphatic dicarboxylic acids are malonic acid, succinic acid, maleic acid, fumaric acid, glutaric acid, adipic acid, azelaic acid and 1,4-cyclohexane dicarboxylic acid. Particularly preferable aliphatic dicarboxylic acids are succinic acid, glutaric acid, and adipic acid.

The diol used for the polymer is, for example, selected from aliphatic diols having 2 to 20 carbon atoms and alkyletherdiols having 4 to 20 carbon atoms.

Examples of the aliphatic diols having 2 to 20 carbon atoms include alkyldiols and alicyclic diols such as ethanediol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentylglycol), 2,2-diethyl-1,3-propanediol (3,3-dimethylolpentane), 2-n-butyl-2-ethyl-1,3propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol and the like. These glycols are used alone or, two or more are used as a mixture.

Preferable aliphatic diols are ethanediol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexanediol and 1,4-cyclohexane dimethanol. Particularly, ethanediol, 1,2-propanediol, 1,3-propanediol, 1,2-butanediol, 1,3-butanediol, 1,4-butanediol, 1,5-pentanediol, 1,6-hexanediol, 1,4-cyclohexanediol and 1,4-cyclohexane dimethanol are preferable.

Examples of the alkyletherdiols having 4 to 20 carbon atoms preferably include, for example, polytetramethylene etherglycol, polyethylene etherglycol and polypropylene etherglycol, and combinations thereof. Although not particularly limited, the average degree of polymerization is preferably 2 to 20, more preferably 2 to 10, further preferably 2 to 5, and particularly 2 to 4. Examples of the above include Carbowax resin, Pluronics resin and Niax resin as typically useful commercially available polyetherglycols.

In the present invention, it is particularly preferable that the polymer is end-capped with an alkyl group or aromatic group. Protecting the ends with hydrophobic functional groups is effective against aging degradation under hot and humid condition because the protection delays hydrolysis of the ester groups.

It is preferable that both ends of the polyester additive which is used in the present invention are protected with monoalcohol residues or monocarboxylic acid residues so that carboxylic acids or OH groups are not left at the ends.

In this case, the monoalcohol is preferably a substituted or unsubstituted monoalcohol having 1 to 30 carbon atoms, examples of which include aliphatic alcohols such as methanol, ethanol, propanol, isopropanol, butanol, isobutanol, pentanolnol, isopentanol, hexanol, isohexanol, cyclohexylalcohol, octanol, isooctanol, 2-ethylhexylalcohol, nonylalcohol, isononylalcohol, tert-nonylalcohol, decanol, doadecanol, dodecahexanol, dodecaoctanol, allylalcohol and oleylalcohol, substituted alcohols such as benzylalcohol and 3-phenylpropanol, and the like.

Preferably used end-capping alcohols are methanol, ethanol, propanol, isopropanol, butanol, isobutanol, isopentanol, hexanol, isohexanol, cyclohexylalcohol, isooctanol, 2-ethylhexylalcohol, isononylalcohol, oleylalcohol and benzylalcohol, of which methanol, ethanol, propanol, isobutanol, cyclohexylalcohol, 2-ethylhexylalcohol, isononylalcohol and benzylalcohol are particularly preferred.

In the case of capping with monocarboxylic acid residues, the monocarboxylic acid used for the monocarboxylic residues is preferably a substituted or unsubstituted monocarboxylic acid having 1 to 30 carbon atoms. The above may also be an aliphatic monocarboxylic acid or aromatic ring-containing carboxylic acid. Preferable aliphatic monocarboxylic acids include acetic acid, propionic acid, butane acid, caprylic acid, carpoic acid, decane acid, dodecane acid, stearic acid and oleic acid. Preferable aromatic monocarboxylic acids include, for example, benzoic acid, p-tert-butylbenzoic acid, p-tert-amylbenzoic acid, o-toluic acid, m-toluic acid, p-toluic acid, dimethylbenzoic acid, ethylbenzoic acid, n-propylbenzoic acid, aminobenzoic acid, acetoxybenzoic acid and the like. The above monocarboxylic acids may be each used alone, or two or more of the above monocarboxylic acids may be used in combination.

The polymer used in the present invention can be easily synthesized by an ordinary method of either thermal melt condensation by polyesterification or transesterification of the above dicarboxylic acid and diol and/or end-capping monocarboxylic acid or monoalcohol, or interfacial condensation of acid chlorides of these acids and glycols. Detailed description of these polyester-based additives can be found in "Additives—theory and application—" by Koichi Murai (Sawai Shobo, Co., issued on Mar. 1, 1973 (first edition, first print)). Further, materials described in Japanese Patent Application Laid-Open Publications Nos. Hei5-155809, Hei5-155810, Hei5-197073, 2006-259494, Hei7-330670, 2006-342227, 2007-003679 and the like may also be used.

The styrene-based polymers preferably have a structural unit represented by the general formula (1) which is derived from an aromatic vinyl monomer.

[Chemical formula 7]

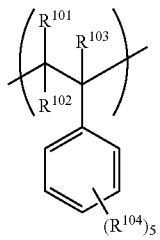

General formula (1)

In the formula, $R^{101}$ to $R^{104}$ each independently represent a polar group or substituted or unsubstituted hydrocarbon group having 1 to 30 carbon atom(s) which may have a linking group having hydrogen atom(s), halogen atom(s), oxygen atom(s), sulfur atom(s), nitrogen atom(s) or silicon atom(s); and $R^{104}$ may be the same or different atom or group, and may bond together to form a carbon ring or hetero ring (these carbon ring and hetero ring may have monocyciic structure or polycyclic structure by condensation with another ring).

Specific examples of the aromatic vinyl monomer include styrene; alkyl substituted styrenes such as α-methylstyrene, β-methylstyrene and p-methylstyrene; halogen substituted styreres such as 4-chlorostyrene and 4-bromostyrene; hydroxystyrenes such as p-hydroxystyrene, α-methyl-p-hydroxystyrene, 2-methyl-4-hydroxystyrene and 3,4-dihydroxystyrene; vinylbenzylalcohols; alkoxy substituted styreres such as p-methoxystyrene, p-tert-butoxystyrene and m-tert-butoxystyrene; vinyl benzoic acids such as 3-vinylbenzoic acid and 4-vinylbenzoic acid; vinyl benzoates such as methyl-4-vinylbenzoate and ethyl-4-vinylbenzoate; 4-vinylbenzylacetate; 4-acetoxystyrene; amidestyrenes such as 2-butylamidestyrene, 4-methylamidestyrene and p-sulfoneamidestyrene; aminostyrenes such as 3-aminostyrene, 4-aminostyrene, 2-isopropenylaniline and vinylbenzyldimethylamine; nitrostyrenes such as 3-nitrostyrene and 4-nitrostyrene; cyanostyrenes such as 3-cyanostyrene and 4-cyanostyrene; vinylphenyl acetonitrile; arylstyrenes such as phenylstyrene; indenes and the like, but the present invention is not limited to these specific examples. Two or more of these monomers may be used in combination as copolymer components. Among these monomers, styrene and α-methylstyrene are preferable because of their good industrial availability and low cost.

It is preferable that the above acrylic polymers have a structural unit derived from an acrylate-based monomer which is represented by the general formula (2)

[Chemical formula 8]

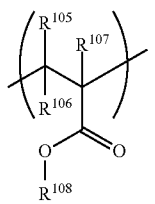

General formula (2)

In the formula, $R^{105}$ to $R^{108}$ each independently represent a polar group or substituted or unsubstituted hydrocarbon group having 1 to 30 carbon atom(s) which may have a linking group with hydrogen atom(s), halogen atom(s), oxygen atom(s), sulfur atom(s), nitrogen atom(s) or silicon atom(s).

Examples of the acrylate-based monomer include, for example, methyl acrylate, ethyl acrylate, propyl acrylate (i-, n-), butyl acrylate (n-, i-, s-, tert-), pentyl acrylate (n-, i-, s-), hexyl acrylate (n-, i-), heptyl acrylate (n-, i-), octyl acrylate (n-, i-), nonyl acrylate (n-, i-), mysrityl acrylate (n-, i-), (2-ethylhexyl)acrylate, (ε-caprolactone)acrylate, (2-hydroxyethyl)acrylate, (2-hydroxypropyl)acrylate, (3-hydroxypropyl)acrylate, (4-hydroxybutyl)acrylate, (2-hydroxybutyl)acrylate, (2-methoxyethyl)acrylate, (2-ethoxyethyl)acrylate, phenyl acrylate, phenyl methacrylate, (2- or 4-chlorophenyl)acrylate, (2- or 4-chlorophenyl) methacrylate, (2- or 3- or 4-ethoxycarbonylphenyl)acrylate, (2- or 3- or 4-ethoxycarbonylphenyl)methacrylate, (o- or n- or p-tolyl)acrylate, (o- or m- or p-tolyl)methacrylate, benzyl acrylate, benzyl methacrylate, phenethyl acrylate, phenethyl methacrylate, (2-naphthyl)acrylate, cyclohexyl acrylate, cyclohexyl methacrylate, (4-methylcyclohexyl)acrylate, (4-methylcyclohexyl)methacrylate, (4-ethylcyclohexyl) acrylate, (4-ethylcyclohexyl)methacrylate and the like; and corresponding methacrylates of the above acrylates, but the present invention is not limited to these specific examples. Two or more of these monomers may be used in combination as copolymer components. Among these monomers, methyl acrylate, ethyl acrylate, propyl acrylate (i-, n-), butyl acrylate (n-, i-, s-, tert-), pentyl acrylate (n-, i-, s-), hexyl acrylate (n-, i-) and corresponding methacrylates of these acrylates are preferred because of their good industrial availability and low cost.

It is preferable that the above copolymer includes at least one structural unit derived from the aromatic vinyl monomer represented by the general formula (1) or the acrylate-based monomer represented by the general formula (2).

[Chemical formula 9]

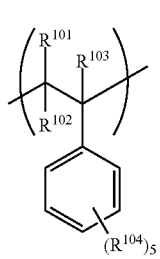

General formula (1)

In the formula, $R^{101}$ to $R^{104}$ each independently represents a polar group or substituted or unsubstituted hydrocarbon group having 1 to 30 carbon atom(s) which may have a linking group with a hydrogen atom, halogen atom, oxygen atom, sulfur atom, nitrogen atom or silicon atom; $R^{104}$ may be the same or different atom or group, and may bond together to form a carbon ring or hetero ring (these carbon ring and hetero ring may have monocyclic structure or form polycyclic structure by condensation with another ring).

[Chemical formula 10]

General formula (2)

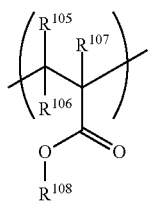

In the formula, $R^{105}$ to $R^{108}$ each independently represent a polar group or substituted or unsubstituted hydrocarbon group having 1 to 30 carbon atom(s) which may have a linking group with a hydrogen atom, halogen atom, oxygen atom, sulfur atom, nitrogen atom or silicon atom. Further, it is preferable that the structure other than the above monomers which constitutes a copolymer composition has good copolymerizability with the above monomers. Examples of such structures include acid anhydrides such as maleic anhydride, citraconic anhydride, cis-1-cyclohexene-1,2-dicarboxylic anhydride, 3-methyl-cis-1-cyclohexene-1,2-dicarboxylic anhydride and 4-methyl-cis-1-cyclohexene-1,2-dicarboxylic anhydride; nitrile group-containing radical polymerizable monomers such as acrylonitrile and methacrylonitrile; amide bond-containing radical polymerizable monomers such as acrylicamide, methacrylicamide and trifluoromethane sulfonylaminoethyl (meth)acrylate; aliphatic acid vinyls such as vinyl acetate; chlorine containing radical polymerizable monomers such as vinyl chloride and vinylidene chloride; conjugated diolefins such as 1,3-butadiene, isoprene and 1,4-dimethylbutadiene, but the present invention is not limited thereto. Among the above, styrene-acrylic acid copolymer, styrene-maleic anhydride copolymer and styrene-acrylonitrile copolymer are particularly preferable.

(Low-Molecular-Weight Additive)

The followings are examples of the low-molecular-weight additive. The low-molecular-weight additive may be solid or oily matter. That is, the low-molecular-weight additive is not particularly limited by its melting point and boiling point. For example, an ultraviolet absorbing material having a melting point of 20° C. or more and an ultraviolet absorbing material having a melting point of 20° C. or less may be mixed, and similarly, anti-deterioration agents may be mixed. Further, infrared absorbing materials are described in, for example, Japanese Patent Application Laid-Open Publication No. 2001-194522. Adding the low-molecular-weight additive may be performed at any timing in a cellulose acylate solution (dope) production, or a step of adding the additive may be performed in the last preparation step of a dope preparation process. Further, the amount of each material to be added is not particularly limited as long as it can exert the advantages.

Although not particularly limited, the low-molecular-weight additive may be any compound represented by the following formulae (3) to (7)

[Chemical formula 11]

General formula (3)

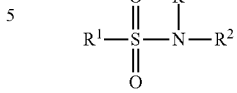

(In the formula, $R^1$ represents an alkyl group or aryl group, and $R^2$ and $R^3$ each independently represent a hydrogen atom, alkyl group or aryl group. The total carbon number of $R^1$, $R^2$ and $R^3$ is 10 or more)

[Chemical formula 12]

General formula (4)

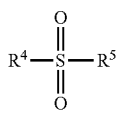

(In the formula, $R^4$ and $R^5$ each independently represent an alkyl group or aryl group. The total carbon number of $R^4$ and $R^5$ is 10 or more.)

In the general formula (3), $R^1$ represents an alkyl group or aryl group, and $R^2$ and $R^3$ each independently represent a hydrogen atom, alkyl group or aryl group. It is particularly preferable that the total carbon number of $R^1$, $R^2$ and $R^3$ are 10 or more. Further, in the general formula (4), $R^4$ and $R^5$ each independently represent an alkyl group or aryl group. The total carbon number of $R^4$ and $R^5$ is 10 or more, and each alkyl or aryl group may have a substituent. Preferable substituents include a fluorine atom, alkyl group, aryl group, alkoxy group, sulfone group and sulfoneamide group. Particularly, alkyl group, aryl group, alkoxy group, sulfone group and sulfoneamide group are preferable. The alkyl group may be a linear, branched or cyclic group having preferably 1 to 25 carbon atom(s), more preferably 6 to 25 carbon atoms, and particularly 6 to carbon atoms (e.g., methyl group, ethyl group, propyl group, isopropyl group, butyl group, isobutyl group, tert-butyl group, amyl group, isoamyl group, tert-amyl group, hexyl group, cyclohexyl group, heptyl group, octyl group, bicyclooctyl group, nonyl group, adamantyl group, decyl group, tert-octyl group, undecyl group, dodecyl group, tridecyl group, tetradecyl group, pentadecyl group, hexadecyl group, heptadecyl group, octadecyl group, nonadecyl group and didecyl group). The alkyl group preferably has 6 to 30 carbon atoms, and particularly 6 to 24 carbon atoms (e.g., phenyl group, biphenyl group, terphenyl group, naphthyl group, binaphthyl group and triphenylphenyl group). The followings are preferable examples of the compounds represented by the general formulae (3) and (4), but the present invention is not limited to these specific examples.

[Chemical formula 13]

A-1

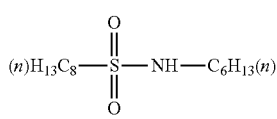

A-2

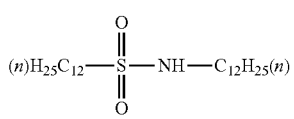

-continued

A-3, A-4, A-5, A-6, A-7, A-8, A-9, A-10, A-11, A-12, A-13, A-14, A-15, A-16, A-17, A-18, A-19, A-20

-continued
A-21
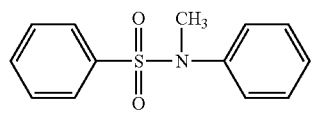
A-22
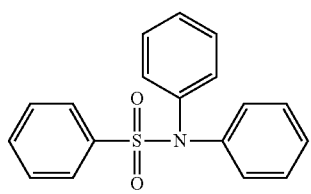
[Chemical formula 14]
A-23
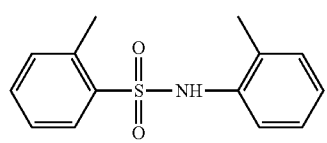
A-24
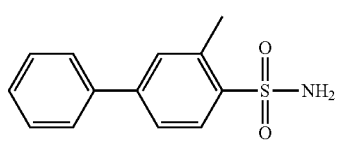
A-25
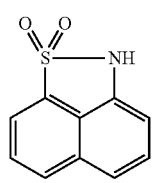
A-26
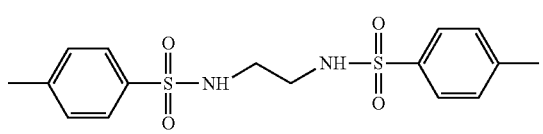
A-27
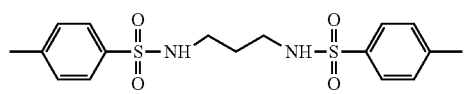
A-28
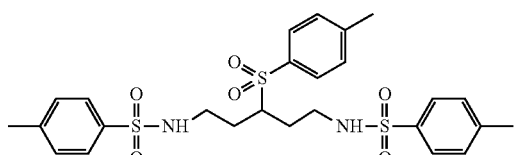
A-29
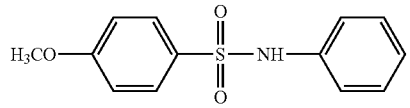
A-30
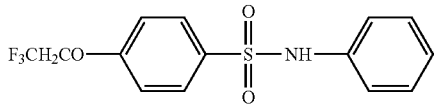
A-31
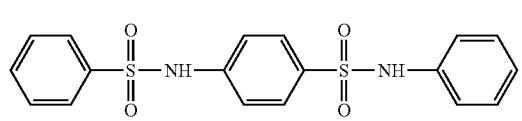
A-32
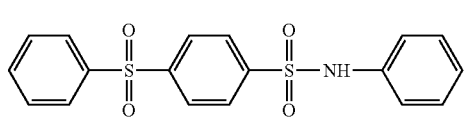
A-33
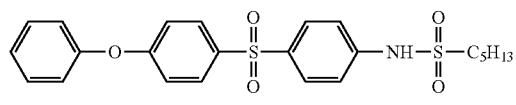
A-34
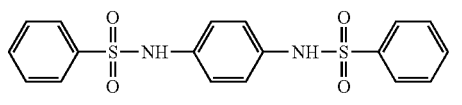
A-35
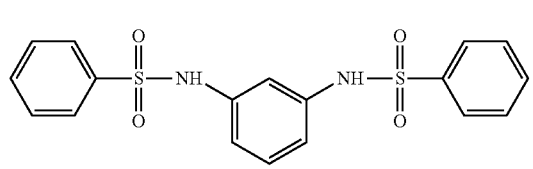
A-36
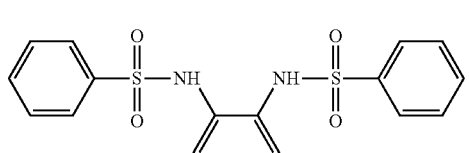
A-37
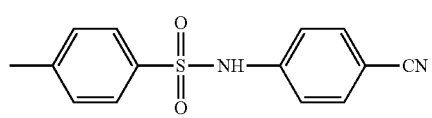
A-38
A-39
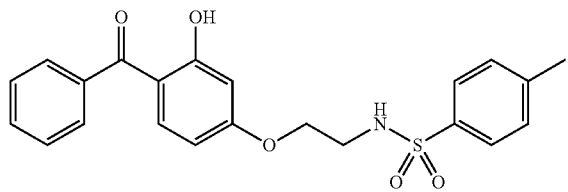

[Chemical formula 15]
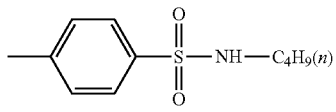 
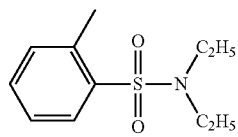 A-40
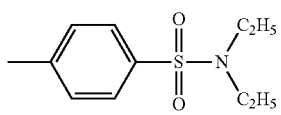
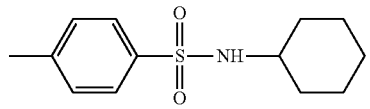 A-41
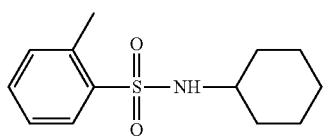
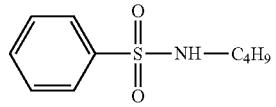 A-42
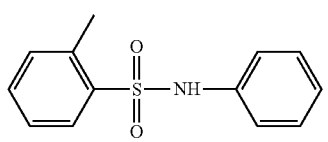
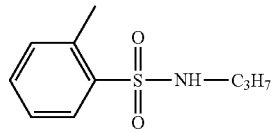 A-43
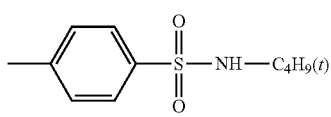
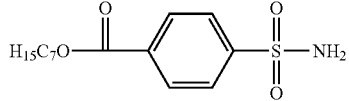 A-44
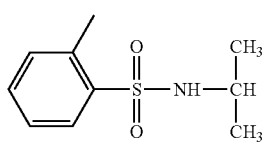
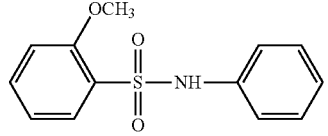 A-45
A-46
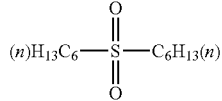
A-47
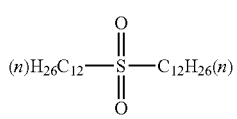
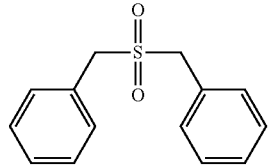 A-48
A-49
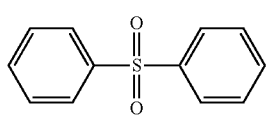
A-50
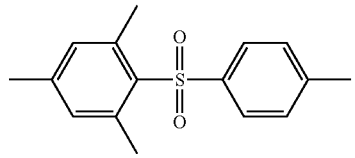 A-51
[Chemical formula 16]
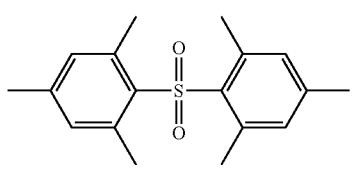
B-1
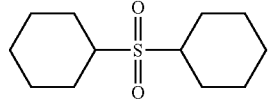 B-2
B-3
B-4
B-5
B-6
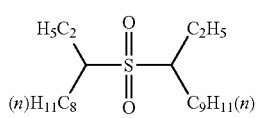 B-7
B-8

-continued
B-9 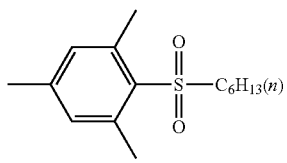 B-10 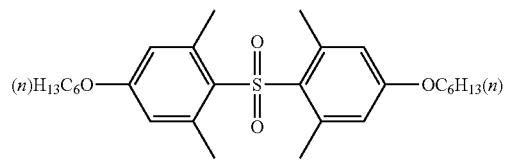
B-11 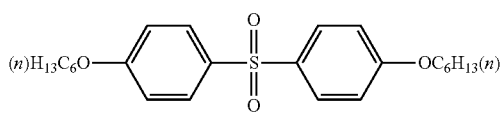 B-12 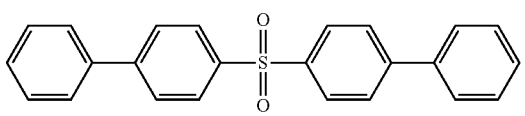
B-13 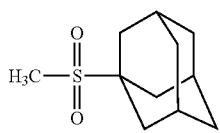 B-14 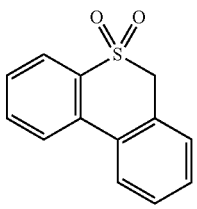
B-15 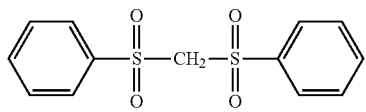 B-16 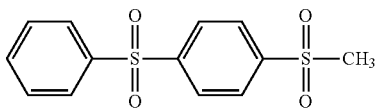
B-17 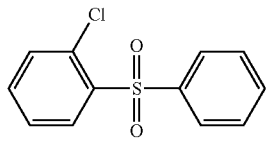 B-18 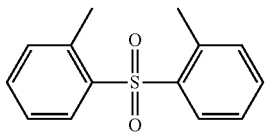
B-19 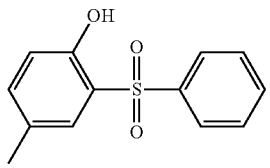 B-20 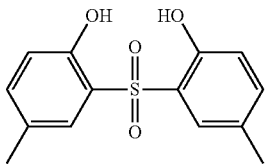
B-21 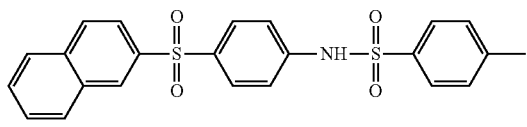 B-22 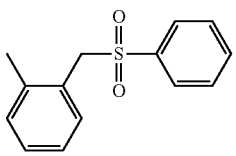
[Chemical formula 17]
B-23 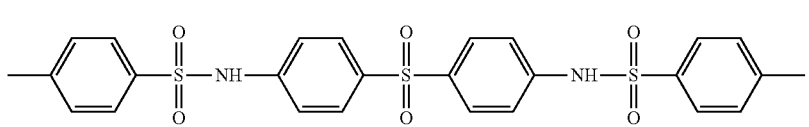
B-24 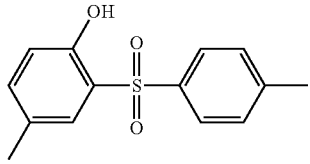 B-25 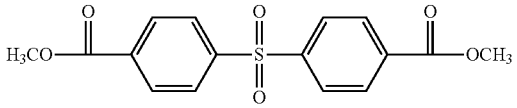

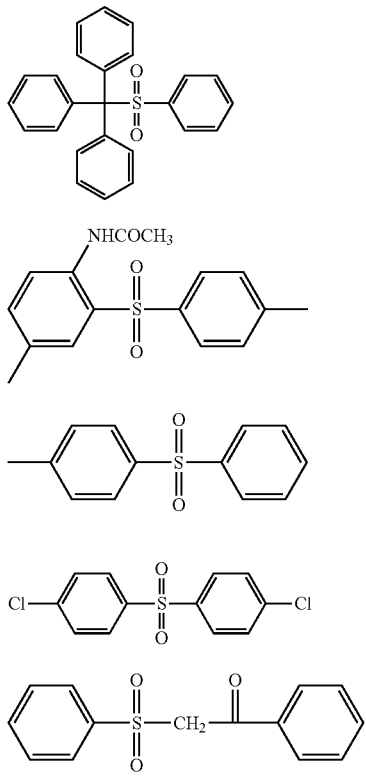

The compounds represented by the general formula (3) may be obtained by condensation reaction of a sulfonylchloride derivative with an amine derivative. The compounds represented by the general formula (4) may be compounds represented by the general formula (4) may be obtained by oxidation reaction of a sulfide or Friedel-Crafts reaction of a sulfonic acid chloride with an aromatic compound.

Next, the compounds represented by the general formula (5) will be described in detail.

[Chemical formula 18]

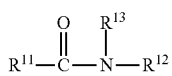

General formula (5)

In the above general formula (5), $R^{11}$ represents an aryl group. $R^{12}$ and $R^{13}$ each independently represent an alkyl or aryl group where at least one of $R^{12}$ and $R^{13}$ is an aryl group. If $R^{12}$ is an aryl group, $R^{13}$ may be an alkyl group or aryl group, but an alkyl group is more preferable. The alkyl group may be a linear, branched or cyclic group having preferably 1 to 20 carbon atom(s), more preferably 1 to 15 carbon atom(s), and most preferably 1 to 12 carbon atom(s). The aryl group preferably has 6 to 36 carbon atoms, and more preferably 6 to 24.

Next, the compounds represented by the general formula (6) will be described in detail.

[Chemical formula 19]

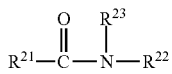

General formula (6)

In the above general formula (6), $R^{21}$, $R^{22}$ and $R^{23}$ each independently represent an alkyl group. The alkyl group may be linear, branched or cyclic. $R^{21}$ is preferably a cyclic alkyl group, and it is more preferable that at least one of $R^{22}$ and $R^{23}$ is a cyclic alkyl group. The alkyl group preferably has 1 to 20 carbon atom(s), more preferably 1 to carbon atom(s), and most preferably 1 to 12 carbon atom(s). In particular, the cyclic alkyl group is preferably a cyclohexyl group.

The alkyl and aryl groups of the above general formulae (5) and (6) may each have a substituent. Preferable substituents include a halogen atom (e.g. chlorine, bromine, fluorine and iodine), alkyl group, aryl group, alkoxy group, aryloxy group, acyl group, alkoxycarbonyl group, aryloxycarbonyl group, acyloxy group, sulfonylamino group, hydroxy group, cyano group, amino group and acylamino group, of which a halogen atom, alkyl group, aryl group, alkoxy group, aryloxy group, sulfonylamino group and acylamino group are more preferable. Particularly, an alkyl group, aryl group, sulfonylamino group and acylamino group are preferable.

Next, the followings are preferred examples of the compounds represented by the general formulae (5) and (6), but the present invention is not limited to these specific examples.

[Chemical formula 20]
C-1
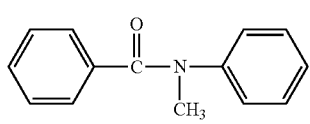
C-2
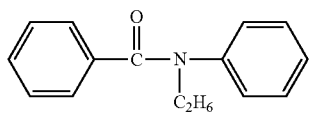
C-3
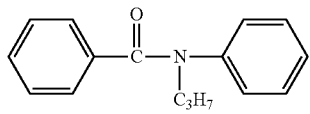
C-4
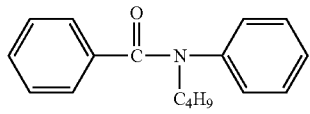
C-5
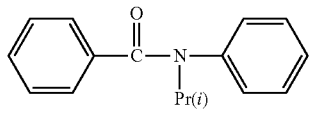
C-6
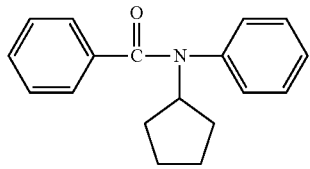
C-7
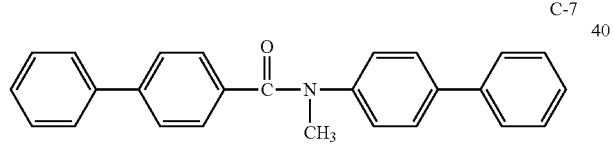
C-8
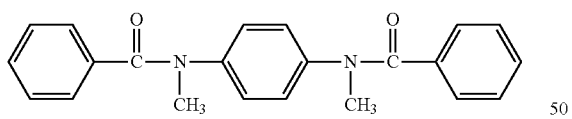
C-9
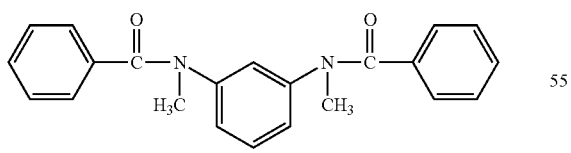
C-10
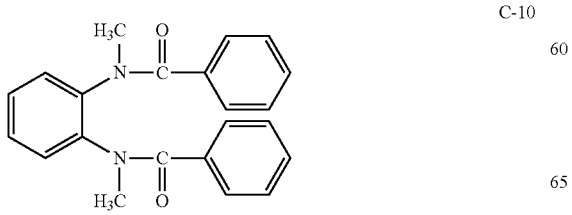
C-11
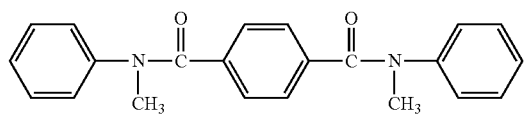
C-12
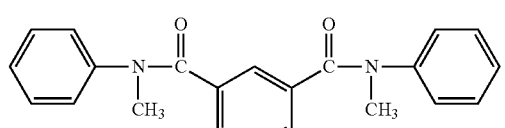
C-13
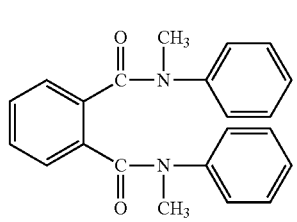
C-14
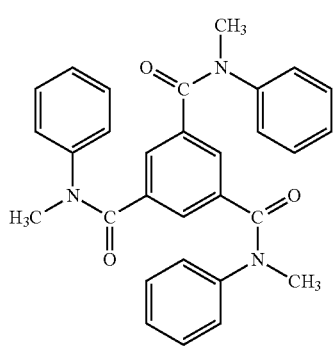
C-15
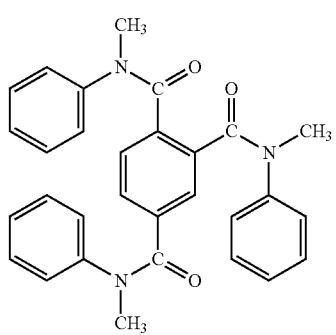
[Chemical formula 21]
C-16
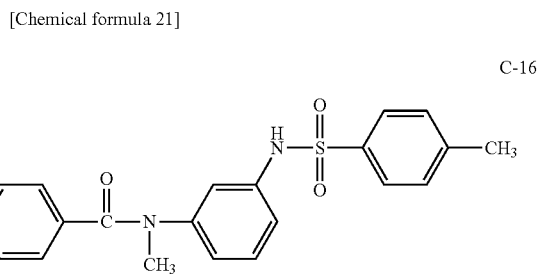
C-17
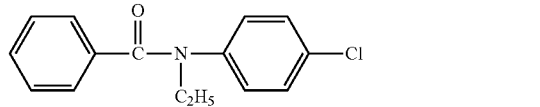

C-18
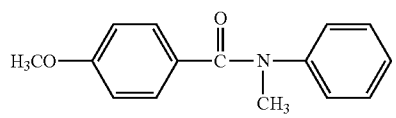
C-19
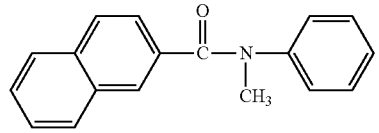
C-20
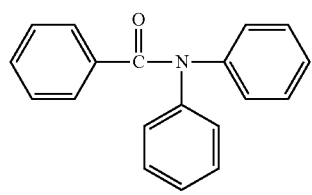
C-21
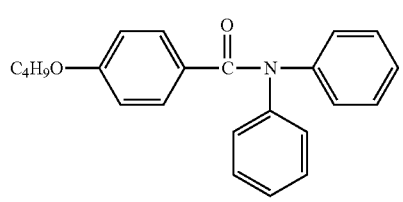
C-22
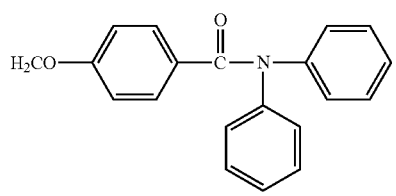
C-23
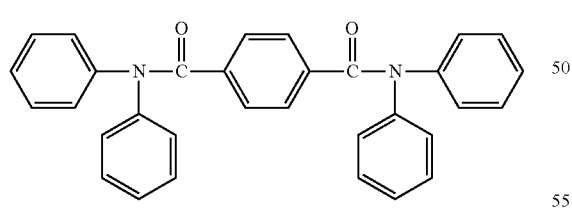
C-24
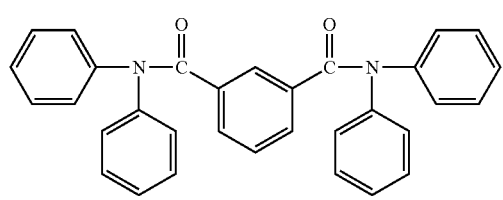
C-25
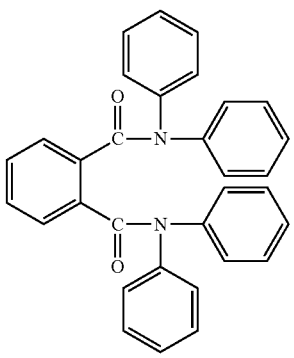
C-26
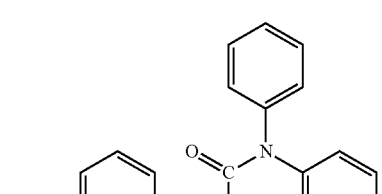
C-27
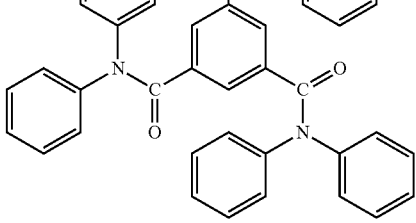
C-28
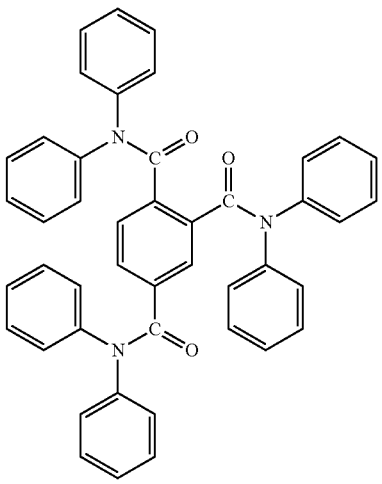
[Chemical formula 22]
D-1
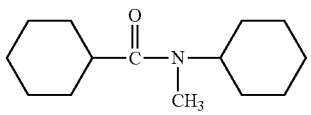

-continued
D-2
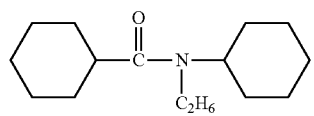
D-3
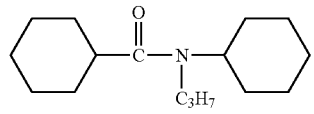
D-4
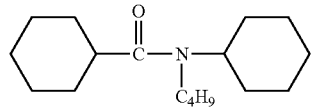
D-5
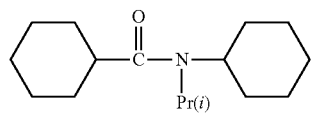
D-6
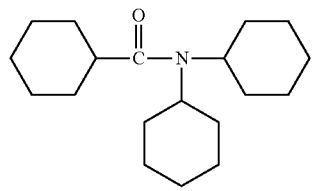
D-7
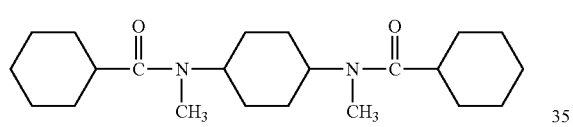
D-8
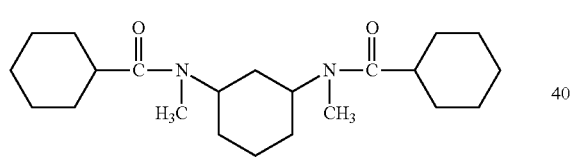
D-9
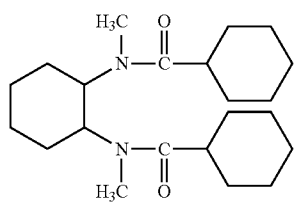
D-10
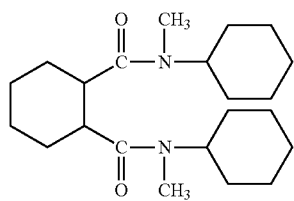
D-11
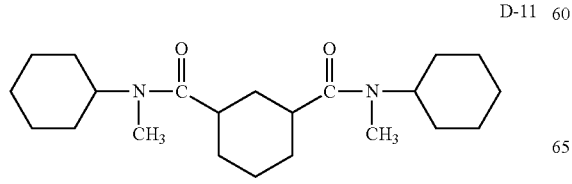
-continued
D-12
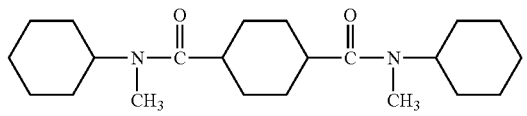
D-13
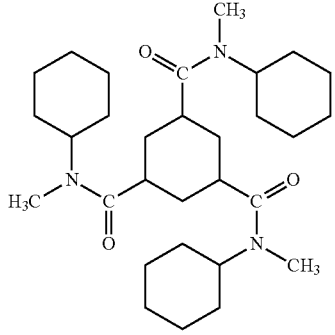
[Chemical formula 23]
D-14
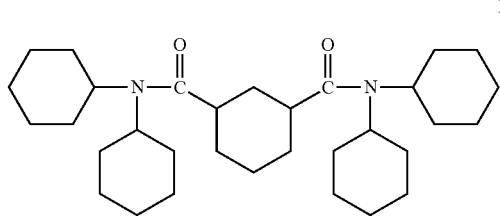
D-15
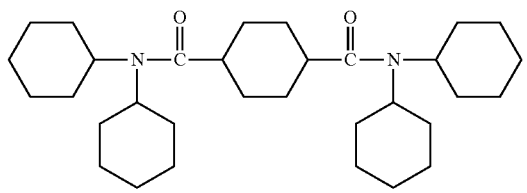
D-16
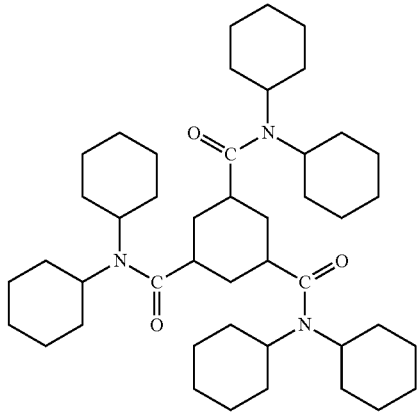
D-17
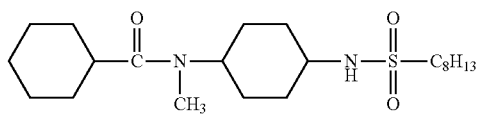

-continued

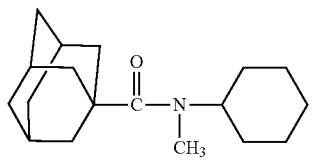
D-18

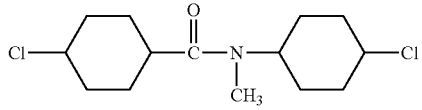
D-19

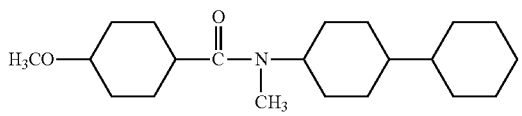
D-20

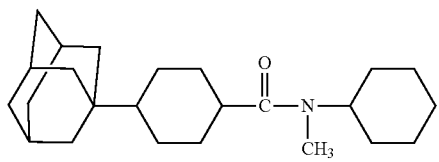
D-21

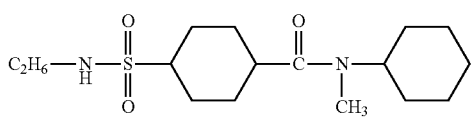
D-22

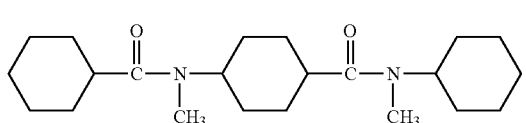
D-23

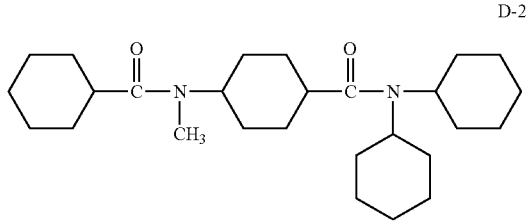
D-24

Next, the compounds represented by the general formula (7) will be described.

[Chemical formula 24]

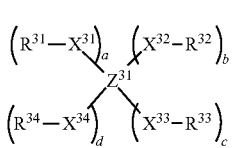

General formula (7)

In the above general formula (7), $R^{31}$, $R^{32}$, $R^{33}$ and $R^{44}$ each represent a hydrogen atom, substituted or unsubstituted aliphatic group, or substituted or unsubstituted aromatic group, of which an aliphatic group is preferable. The aliphatic group may be linear, branched or cyclic, and more preferably cyclic. Possible substituents of the aliphatic and aromatic groups include the substituent T described below, but the aliphatic and aromatic groups are preferably unsubstituted.

$X^{31}$, $X^{32}$, $X^{33}$ and $X^{34}$ each represent a divalent linking group composed of at least one group selected from a single bond, —CO—, NR$^{35}$— ($R^{35}$ represents a substituted or unsubstituted aliphatic group, or substituted or unsubstituted aromatic group, of which substituted groups and/or an aliphatic group are more preferable). Although not particularly limited, combinations of $X^{31}$, $X^{32}$, $X^{33}$ and $X^{34}$ are preferably selected from —CO— and —NR$^{35}$—. The notes a, b, c and d are each an integer of 0 or more, preferably 0 or 1 where a+b+c+d is 2 or more, preferably 2 to 8, more preferably 2 to 6, and further more preferably 2 to 4. $Z^{31}$ represents an organic group (excluding cyclic groups) having a valence of (a+b+c+d). The valence number of $Z^{31}$ is preferably 2 to 8, more preferably 2 to 6, further preferably 2 to 4, and most preferably 2 or 3. The organic group represents a group composed of an organic compound.

Further, preferable examples of the above general formula (7) are compounds represented by the following formula (7-1).

$$R^{311}-X^{311}-Z^{311}-X^{312}-R^{312}$$
General formula (7-1)

In the above general formula (7-1), $R^{311}$ and $R^{312}$ each represent a substituted or unsubstituted aliphatic group or a substituted or unsubstituted aromatic group, of which an aliphatic group is preferable. The aliphatic group may be linear, branched or cyclic, and preferably cyclic. Possible substituents of the aliphatic and aromatic groups include the substituent T described below, but the aliphatic and aromatic groups are preferably unsubstituted. $X^{311}$ and $X^{312}$ each independently represent —CONR$^{313}$— or NR$^{314}$CO—, where $R^{313}$ and $R^{314}$ represent a substituted or unsubstituted aliphatic group or a substituted or unsubstituted aromatic group, of which unsubstituted groups and/or an aliphatic group are more preferable. $Z^{311}$ represents a divalent organic group (excluding cyclic groups) composed of at least one group selected from —O—, —S—, —SO—, —SO$_2$—, —CO—, —NR$^{315}$— ($R^{315}$ represents a substituted or unsubstituted aliphatic group or a substituted or unsubstituted aromatic group, of which unsubstituted groups and/or an aliphatic group are more preferable), alkylene group and arylene group. Although not particularly limited, a combination of $Z^{311}$ is preferably selected from —O—, —S—, —NR$^{315}$— and alkylene group, more preferably selected from —O—, —S— and alkylene group, and most preferably selected from —O—, —S— and alkylene group.

Preferable examples of the above general formula (7-1) are compounds represented by the following general formulae (7-2) to (7-4)

[Chemical formula 25]

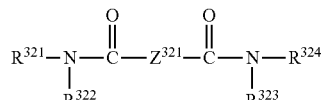

General formula (7-2)

[Chemical formula 26]

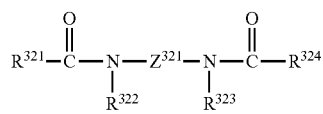

General formula (7-3)

[Chemical formula 27]

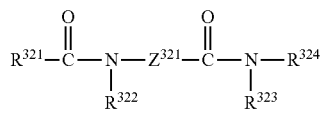

General formula (7-4)

In the above general formulae (7-0.2) to (7-4), $R^{321}$, $R_{322}$, $R^{323}$ and $R^{324}$ each represent a substituted or unsubstituted aliphatic group or a substituted or unsubstituted aromatic group, of which an aliphatic group is preferable. The aliphatic group may be linear, branched or cyclic, and preferably cyclic. Possible substituents of the aliphatic and aromatic groups include the substituent T described below, but the aliphatic and aromatic groups are preferably unsubstituted. $Z^{321}$ represents a divalent organic group (excluding cyclic groups) composed of at least one group selected from —O—, —S—, —SO—, —SO$_2$—, —CO—, —NR$^{325}$— ($R^{325}$ represents a substituted or unsubstituted aliphatic group or a substituted or unsubstituted aromatic group, of which unsubstituted groups and/or an aliphatic group are preferable), alkylene group and arylene group. Although not particularly limited, a combination of $Z^{321}$ is preferably selected from —O—, —S—, —NR$^{325}$— and alkylene group, more preferably selected from —O—, —S— and alkylene group, and most preferably selected from —O—, —S— and alkylene group.

The above substituted or unsubstituted aliphatic groups will be described below. The aliphatic groups may be linear, branched or cyclic group having preferably 1 to carbon atom(s), more preferably 6 to 25 carbon atoms, and particularly 6 to 20 carbon atoms. Specific examples of the aliphatic groups include, for example, a methyl group, ethyl group, n-propyl group, isopropyl group, cyclopropyl group, n-butyl group, isobutyl group, tert-butyl group, amyl group, isoamyl group, tert-amyl group, n-hexyl group, cyclohexyl group, n-heptyl group, n-octyl group, bicyclooctyl group, adamantyl group, n-decyl group, tert-octyl group, dodecyl group, hexadecyl group, octadecyl group, didecyl group and the like.

The above aromatic groups will be described below.

The aromatic groups may be an aromatic hydrocarbon group or aromatic heterocyclic group, of which an aromatic hydrocarbon group is more preferable. The aromatic hydrocarbon group preferably has 6 to 24 carbon atoms, and more preferably 6 to 12 carbon atoms. Specific examples of the ring of the aromatic hydrocarbon group include, for example, benzene, naphthalene, anthracene, biphenyl or terphenyl rings. Particularly preferable aromatic hydrocarbon groups are a benzene, naphthalene and biphenyl groups. The aromatic heterocyclic group preferably has at least one of oxygen, nitrogen and sulfur atoms. Specific examples of the heterocycle include, for example, furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthlazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. Particularly preferable aromatic heterocyclic groups are pyridine, triazine and quinoline.

The above-described substituent T will be described in detail below.

Examples of the substituent T include, for example, alkyl groups (alkyl groups having preferably 1 to 20 carbon atom(s), more preferably 1 to 12 carbon atom(s), particularly 1 to 8 carbon atom(s), e.g., a methyl group, ethyl group, isopropyl group, tert-butyl group, n-octyl group, n-decyl group, n-hexadecyl group, cyclopropyl group, cyclopentyl group, cyclohexyl group and the like), alkenyl groups (alkenyl groups having preferably 2 to 20 carbon atoms, more preferably 2 to 12 carbon atoms, particularly 2 to 8 carbon atoms, e.g., a vinyl group, aryl group, 2-butenyl group, 3-pentenyl group and the like), alkynyl groups (alkynyl groups having preferably 2 to 20 carbon atoms, more preferably 2 to 12 carbon atoms, particular 2 to 8 carbon atoms, e.g., a propargyl group, 3-pentynyl group and the like), aryl groups (aryl groups having preferably 6 to 30 carbon atoms, more preferably 6 to 20 carbon atoms, particularly 6 to 12 carbon atoms, e.g., a phenyl group, biphenyl group, naphthyl group and the like), amino groups (amino groups having preferably 0 to 20 carbon atom(s), more preferably 0 to 10 carbon atom(s), particularly 0 to 6 carbon atom(s), e.g., an amino group, methylamino group, dimethylamino group, diethylamino group, dibenzylamino group and the like), alkoxy groups (alkoxy groups having preferably 1 to 20 carbon atom(s), more preferably 1 to 12 carbon atom(s), particularly 1 to 8 carbon atom(s), e.g., a methoxy group, ethoxy group, butoxy group and the like), aryloxy groups (aryloxy groups having preferably 6 to 20 carbon atoms, more preferably 6 to 16 carbon atoms, particularly 6 to 12 carbon atoms, e.g., a phenyloxy group, 2-naphthyloxy group and the like), acyl groups (acyl groups having preferably 1 to 20 carbon atom(s), more preferably 1 to 16 carbon atom(s), particularly 1 to 12 carbon atom(s), e.g., an acetyl group, benzoyl group, formyl group, pivaloyl group and the like), alkoxycarbonyl groups (alkoxycarbonyl groups having preferably 2 to 20 carbon atoms, more preferably 2 to 16 carbon atoms, particularly 2 to 12 carbon atoms, e.g., a methoxycarbonyl group, ethoxycarbonyl group and the like), aryloxycarbonyl groups (aryloxycarbonyl groups having preferably 7 to 20 carbon atoms, more preferably 7 to 16 carbon atoms, particularly 7 to 10 carbon atoms, e.g., a phenyloxycarbonyl group and the like), acyloxy groups (acyloxy groups having preferably 2 to 20 carbon atoms, more preferably 2 to 16 carbon atoms, particularly 2 to 10 carbon atoms, e.g., an acetoxy group, benzoyloxy group and the like), acylamino groups (acylamino groups having preferably 2 to 20 carbon atoms, more preferably 2 to 16 carbon atoms, particularly 2 to 10 carbon atoms, e.g., an acetylamino group, benzoylamino group and the like), alkoxycarbonylamino groups (alkoxycarbonylamino groups having preferably 2 to 20 carbon atoms, more preferably 2 to 16 carbon atoms, particularly 2 to 12 carbon atoms, e.g., a methoxycarbonylamino group and the like), aryloxycarbonylamino groups (aryloxycarbonylamino groups having preferably 7 to 20 carbon atoms, more preferably 7 to 16 carbon atoms, particularly 7 to 12 carbon atoms, e.g., a phenyloxycarbonylamino group and the like), sulfonylamino groups (sulfonylamino groups having preferably 1 to 20 carbon atom(s), more preferably 1 to 16 carbon atom(s), particularly 1 to 12 carbon atom(s), e.g., a methanesulfonylamino group, benzenesulfonylamino group and the like), sulfamoyl groups (sulfamoyl groups having preferably 0 to 20 carbon atom(s), more preferably 0 to 16 carbon atom(s), particularly 0 to 12 carbon atom(s), e.g., a sulfamoyl group, methylsulfamoyl group, dimethylsulfamoyl group, phenylsulfamoyl group and the like), carbamoyl groups (carbamoyl groups having preferably 1 to 20 carbon atom(s), more preferably 1 to 16 carbon atom(s), particularly 1 to 12 carbon atom(s), e.g., a carbamoyl group, methylcarbamoyl group, diethylcarbamoyl group, phenylcarbamoyl group and the like), alkylthio group (alkylthio group having preferably 1 to 20 carbon atom(s), more preferably 1 to 16 carbon atom(s), particularly 1 to 12 carbon atom(s), e.g., a methylthio group, ethylthio group and the like), arylthio groups (arylthio groups having preferably 6 to 20 carbon atoms, more preferably 6 to 16 carbon atoms, particularly 6 to 12 carbon atoms, e.g., a phenylthio group and the like), sulfonyl groups (sulfonyl groups having preferably 1 to 20 carbon atom(s), more preferably 1 to 16 carbon atom(s), particularly 1 to 12 carbon atom(s), e.g. a mesyl group, tosyl group and the like), sulfinyl groups (sulfinyl groups having preferably 1 to 20 carbon atom(s), more preferably 1 to 16 carbon atom(s), particularly 1 to 12 carbon atom(s), e.g., a methane sulfinyl group, benzene sulfinyl group and the like), ureide groups (ureide groups having preferably 1 to carbon atom(s), more preferably 1 to 16 carbon atom(s), particularly 1 to 12 carbon atom(s), e.g., an ureido group, methylureido group, phenylureido group and the like), phospholic amide groups (phospholic amide groups having preferably 1 to 20 carbon atom(s), more preferably 1 to 16 carbon atom(s), particularly 1 to 12 carbon atom(s), e.g., a diethylphosphoramide, phenylphosphoramide and the like), hydroxyl group, mercapto group, halogen atoms (e.g. a fluorine atom, chlorine atom, bromine atom, iodine atom and the like), cyano group, sulfo group, carboxyl group, nitro group, hydroxyamic group, sulfino group, hydrazino group, imino group, heterocylic groups (heterocylic groups having preferably 1 to 30 carbon atom(s), more preferably 1 to 12 carbon atom(s), where the hetero atom is, for example, a nitrogen atom, oxygen atom or sulfur atom, e.g., an imidazolyl group, pyridyl group, quinolyl group, furyl group, piperidyl group, morpholino group, benzoxazolyl group, benzimidazolyl group, benzthiazolyl group and the like), silyl groups (silyl groups having preferably 3 to 40 carbon atoms, more preferably 3 to 30 carbon atoms, particularly 3 to 24 carbon atoms, e.g., a trimethylsilyl group, triphenylsilyl group and the like) and the like. These substituents may be further substituted. When there are two or more substituents, the substituents may be the same or different. Further, substituents may be linked to each other to form a ring if possible.

The followings are preferable examples of the compounds represented by the general formula (7), but the present invention is not limited to these specific examples,

[Chemical formula 28]

EA-1
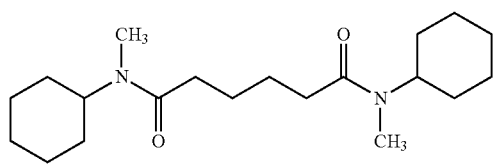

EA-2
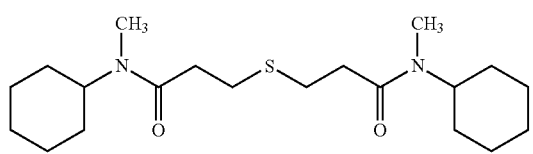

EA-3
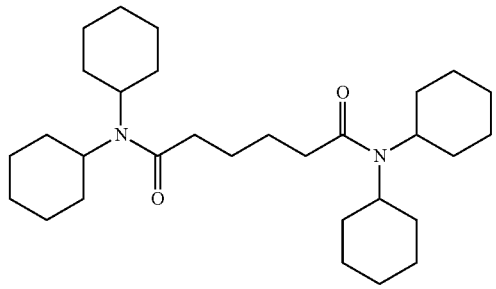

EA-4
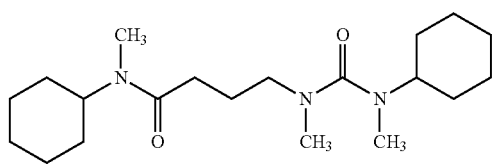

EA-5
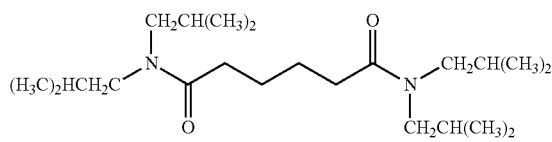

EA-6
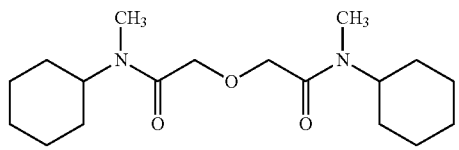

EA-7
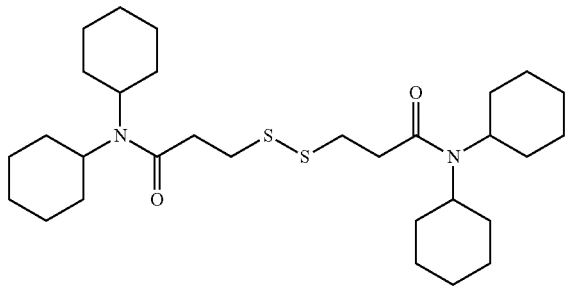

EA-8
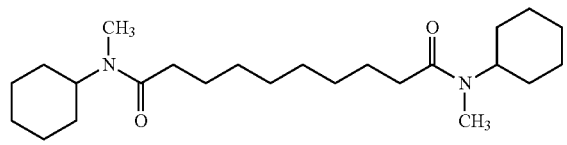

EA-9
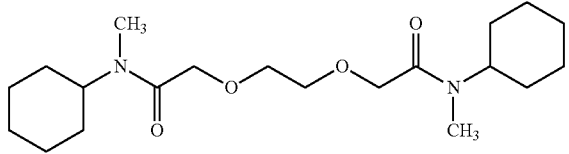

EA-10
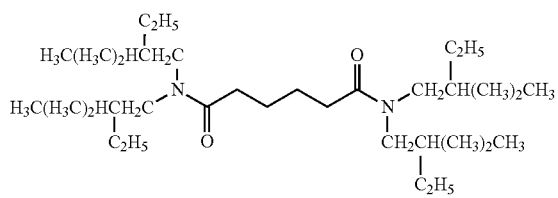

[Chemical formula 29]

EB-1
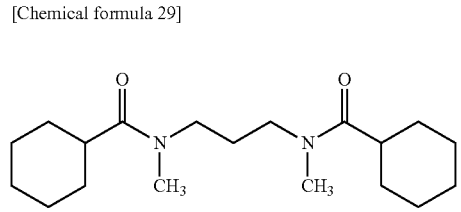

EB-2

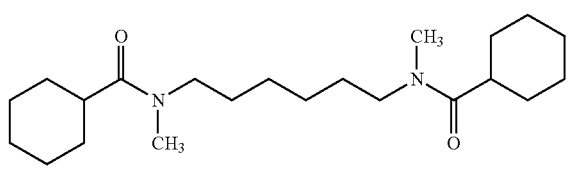

EB-3

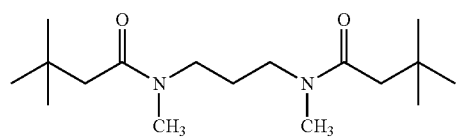

EB-4

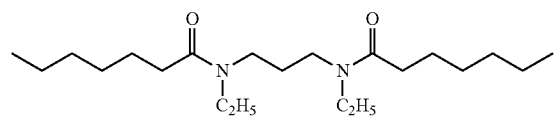

EB-5

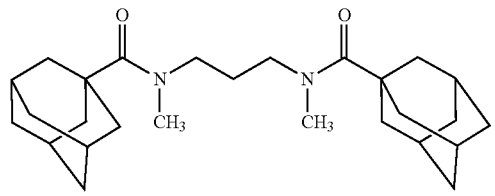

[Chemical formula 30]

EC-1
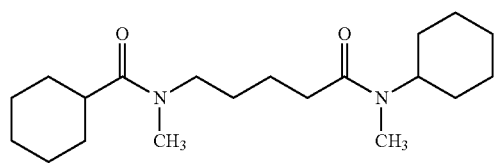

EC-2
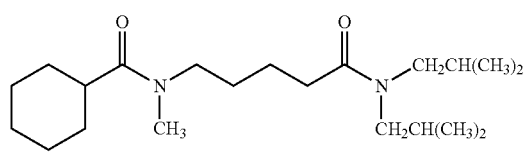

EC-3
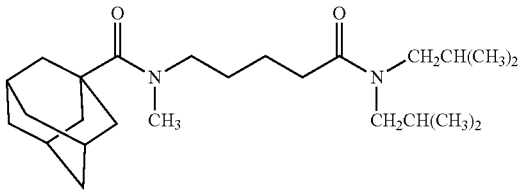

EC-4
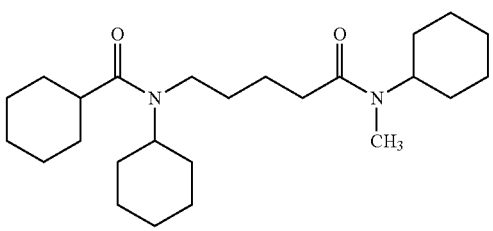

The compounds of the general formulae (5), 6) and (7) may be obtained by dehydration-condensation reaction of a carboxylic acid and amine using a condensation agent (e.g., dicyclohexylcarbodiimide (DCC) and the like) or by substitution reaction of a carboxylic acid chloride derivative with an amine derivative.

Many compounds known as plasticizers of cellulose acylate may be usefully used as the retardation reducer of the present invention. Such plasticizers may be phosphates or carboxylates. Examples of the phosphates include triphenyl phosphate (TPP) and tricresylphosphate (TCP). Representatives of the carboxylates are phthalates and citrates. Examples of the phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the cirticates include O-acetyltriethnyl citrate (OACTE) and O-acetyltributyl citrate (OACTB). Examples of other carboxylates include butyl oleate, methylacetyl ricinolate, dibutyl sebacate and various trimellitates. Phthalate-based plasticizers (DMP, DEP, DEP, DOP, DPP and DEHP) are preferably used. Particularly, DEP and DPP are preferred.

To achieve a suitable Nz factor, it is preferable that the retardation reducer which is used in the present invention is a retardation reducer for thickness retardation (Rth). Among the above retardation reducer, examples of Rth reducers include aliphatic polyesters, acrylic polymers, styrene polymers and lower-molecular-weight compounds of the general formulae (3) to (7), of which aliphatic polyesters, acrylic polymers and styrene polymers are preferable, and aliphatic polyesters and acrylic polymers are more preferable.

It is preferable that the retardation reducer is added in a proportion of 0.01 to 30 mass % with respect to the base film, more preferably in a proportion of 0.1 to 20 mass %, and particularly in a proportion of 0.1 to 10 mass %.

(Anti-Deterioration Agent)

In the present invention, the base film solution may be added with a known anti-deterioration (anti-oxidation) agent, for example, a phenolic or hydroquinone-based antioxidation agent such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone or pentaerythrityl-tetrakis[3-(3,5-di-tert-butyl-4-hydroxyphenyl) propionate]. Further, it is preferable to use a phosphorus antioxidant such as tris(4-methoxy-3,5-diphenyl)phosphite, tris(nonylphenyl)phosphite, tris(2,4-di-tert-butylphenyl) phosphite, bis(2,6-di-tert-butyl-4-methylphenyl)pentaerythritol diphosphite or bis(2,4-di-tert-butylphenyl)pentaerythritol diphosphite. The anti-deterioration agent is added in an amount of 0.05 to 5.0 parts by mass with respect to 100 parts by mass of the base resin.

(Stripping Promoting Agent)

It is preferable that the base film of the present invention contains a stripping agent in order to further improve the stripping characteristics. The stripping agent may be contained, for example, in a proportion of 0.001 to 1 mass %. When the stripping promoting agent is added in an amount of 0.5 mass % or less, it is advantageous that the stripping promoting agent is less separated from the film. When it is added in an amount of 0.005 mass % or more, it is advantageous that desired stripping reducing effect is obtained. The stripping promoting agent is thus contained preferably in a proportion of 0.005 to 0.5 mass %, and more preferably in a proportion of 0.01 to 0.3 mass %. Known stripping promoting agents are employable, such as organic or inorganic acid compounds, surfactants and chelating agents. Above all, polycarboxylic acids and esters thereof are effective. In particular, ethylesters of citric acid may be used effectively.

(Matte Agent)

In order to prevent the base film from being damaged in handling and resultant poor conveyability, fine particles are generally added to the base film especially in the present invention. Such fine particles are referred to as matte agents, blocking agents or anti-creak agents, and have been conventionally used. The fine particles are not particularly limited as long as having the above-described functions, and may be an inorganic or organic matte agent.

Preferable specific examples of the inorganic matte agent include silicon-containing inorganic compounds (e.g., silicon dioxide, calcined calcium silicate, hydrated calcium silicate, aluminum silicate, magnesium silicate and the like), titanium oxide, zinc oxide, aluminum oxide, barium oxide, zirconium oxide, strontium oxide, antimony oxide, tin oxide, tin-antimony oxide, calcium carbonate, talc, clay, calcined kaolin, calcium phosphate and the like, of which silicon-containing inorganic compounds and zirconium oxide are more preferable, and silicon dioxide is particularly preferable because it can reduce the turbidity of the cellulose acylate film. The silicon dioxide fine particles may be a commercially available product, examples of which include, by the trade names, AEROSIL R972, R974, R812, 200, 300, R202, OX50 and TT600 (all by Nippon. Aerosil Co., Ltd.) and the like. The zirconium oxide fine particles may be a commercially available product, examples of which include, by the trade names, AEROSIL R976 and R811 (both by Nippon Aerosil Co., Ltd.) and the like.

Preferable specific examples of the organic compound matte agent include, for example, polymers such as silicone resins, fluororesins and acrylic resins, of which silicone resin is preferably used. Among silicon resins, resins having three dimensional network are preferable.

Commercially available products of silicone resins include, by the trade names, TOSPEARL 103, TOSPEARL 105, TOSPEARL 108, TOSPEARL 120, TOSPEARL 145, TOSPEARL 3120 and TOSPEARL 240 (all by Toshiba Silicone Co.), for example.

A method for adding matte agents to a base resin solution is not specifically limited, but may be any method as long as a desired base resin solution is obtained. For example, the additive may be added in mixing the base resin with a solvent, or may be added after preparing the mixture solution of the base resin and the solvent. Further, the additive may be added and mixed just before casting the dope, which is so-called just-in-time addition, where a screw extruder is installed online for mixing. Specifically, a static mixer such as an inline mixer is preferable. Preferable inline mixers include, for example, a static mixer SWJ (Toray static Inline mixer Hi-Mixer) (Toray Engineering Co., Ltd) and the like. As for inline addition, in order to eliminate uneven concentration, particle aggregation and the like, Japanese Patent Application Laid-Open Publication No. 2003-053752 discloses a method for manufacturing a base film, wherein distance L between the tip of an addition nozzle and the front end of an inline mixer is not more than five times inner diameter d of a main material pipe, the addition nozzle mixing an additive of a different composition with main material dope, so that uneven concentration, aggregation of matte particles and the like are eliminated. In addition, as a preferred embodiment, the above publication also discloses that the distance (L) between the tip of the supply nozzle and the front end of the inline mixer is not more than 10 times inner diameter (d) of the tip opening of the supply nozzle, the supply nozzle supplying the additive of a different composition with the main material dope, and the inline mixer is a static non-agitating inline mixer or dynamic agitating inline mixer. More specifically, the above publication discloses that the flow volume ratio of the main material dope of the base resin film/the inline additive solution is 10/1 to 500/1, and preferably 50/1 to 200/1. Further, Japanese Patent Application Laid-Open Publication No. 2003-014933, which discloses an invention aiming to provide a phase difference film which has less bleed out of additives, no delamination between layers, and good slip characteristics and transparency, discloses such methods of adding an additive that an additive may be added in a melting furnace, or an additive or an additive solution or dispersion may be added to dope flowing between a melting furnace and a co-film casting die, and in the latter case, it is preferable to provide a mixing means such as a static mixer in order to improve mixing.

In the base film of the present invention, the matte agent does not increase haze of the film unless it is added in a large amount, and thus cause less defects such as low contrast or bright points when it is actually used for an LCD. Further, unless the matte agent is added in a too little amount, creak and abrasion resistance can be achieved. In view of the above, the matte agent is contained in a proportion of preferably 0.01 to 5.0 mass %, more preferably 0.03 to 3.0 mass %, and particularly 0.05 to 1.0 mass %.

<Manufacture of Base Film>

The method for manufacturing the base film of the present invention will be described taking the cellulose acylate film as an example.

The cellulose acylate film which is used in the present invention may be manufactured by either solution film casting or melt film casting, of which solution film casting is preferable.

The manufacture of the cellulose acylate film which is used in the present invention is conducted according to the steps of dissolving the cellulose acylate and additives to solvent to prepare dope, casting the dope onto a metal support of a belt or drum shape, drying the casted dope to obtain a web, exfoliating the web from the metal support, stretching, further drying, as necessary further heat-treating the obtained film, and winding after cooling. It is preferable that the cellulose acylate film which is used in the present invention contains 60 to 95 mass % of the cellulose acylate on the solid content basis.

(Dope Preparation)

Steps for preparing the dope will be described. It is preferable that cellulose acylate concentration in the dope is higher, because higher concentration can make the drying step after casting the dope onto the metal support easier. However, if the cellulose acylate concentration is too high, filtration is difficult, which decreases the accuracy of the filtration. To balance both of the above, the concentration is preferably 10 to 35 mass %, and more preferably 15 to 25 mass %.

The solvent which is used for the dope may be used alone or in a combination of two or more solvents. It is preferable to mix a good solvent and poor solvent of the cellulose acylate in terms of production efficiency, where the ratio of the good solvent is preferably higher in terms of solubility of the cellulose acylate. The mixing ratio of the good solvent to the poor solvent is preferably within a range of 70 to 98 mass % of the good solvent and 2 to 30 mass % of the poor solvent. The good solvent is defined as solvent which can dissolve the cellulose acylate by itself, and the poor solvent is defined as solvent which only swells the cellulose acylate or cannot dissolve the cellulose acylate. Whether a solvent is the good or poor solvent depends on the acetyl substitution degree of the cellulose acylate. For example, when acetone is used as the solvent, it is the good solvent of cellulose acetate (acetyl substitution degree of 2.4), while acetone is the poor solvent of cellulose acetate (acetyl substitution degree of 2.8).

Although not particularly limited, examples of the good solvent which is used in the present invention include organic halogen compounds such as methylene chloride, dioxolanes, acetone, methyl acetate, methylacetoacetate and the like. Particularly, methylene chloride and methyl acetate are preferred.

Although not particularly limited, preferable examples of the poor solvent which is used in the present invention include, for example, methanol, ethanol, n-butanol, cyclohexane and cyclohexanone and the like. It is preferable that the dope contains 0.01 to 2 mass % of water.

In preparing the above-described dope, the cellulose acylate may be dissolved by a general method. Combination of heating and pressurizing enables heating over a melting point under ordinary pressure. When the cellulose acylate is stirred and dissolved into solvent within such a temperature range that it is higher than the melting point of the solvent under ordinary pressure but the solvent does not boil under the pressure, it is advantageous that gel or undissolved clusters called "mamako" clumping) are prevented. Also preferably used is such a method that after the cellulose acylate is mixed with the poor solvent to be moist or swelled, the good solvent is then added to dissolve the cellulose acylate.

The pressurizing may be performed by injecting inert gas such as nitrogen gas or by heating to increase vapor pressure of the solvent. The heating is preferably performed from outside. For example, a jacket type heater is preferable because temperature control is easily performed.

The heating temperature after adding the solvent is preferably higher, however excessively high heating temperature requires high pressure condition, which deteriorates the productivity. The heating temperature is preferably 45° C. to 120° C., more preferably 60° C. to 110° C., further preferably 70° C. to 105° C. Further the pressure is controlled so that the solvent does not boil at the set temperature.

Cool dissolution is also preferably used, which enables dissolving the cellulose acylate into a solvent like methyl acetate.

Next, this cellulose acylate solution is filtrated with a suitable filter medium such as filter paper. It is preferable that the filter medium has smaller absolute filter rating in terms of removing insoluble matter. However, if the absolute filter rating is too small, there is a problem that the filter medium is easily clogged. Thus, the filter medium has an absolute filter rating preferably of 0.008 mm or less, more preferably 0.001 to 0,008 mm, and further preferably 0.003 to 0.006 mm. The material of the filter medium is not particularly limited, and an ordinary filter medium may be used.

Plastic filter media made of polypropylene, TEFLON® or the like and metal filter media made of stainless steel or the like are preferred in terms of avoiding discharge of fiber or the like. The filtration is preferable for removing or reducing impurities, in particular bright-spot contaminants, included in the cellulose acylate as the raw material.

The bright-spot contaminants are spots (contaminants) which gleam by light, when a cellulose acylate film is placed between two polarizing plates in crossed Nicol configuration, observed from the side of one polarizing plate under illumination from the side of the other polarizing plate. It is preferable that the number of bright spots having a size of 0.01 mm or more is 200 spots/cm$^2$ or less. Bright spots are more preferably 100 spots/cm$^2$ or less, further more preferably 50 spots/cm$^2$ or less, and further more preferably 0 to 10 spots/cm$^2$ or less. It is also preferable that there are less bright spots having a size of 0.01 mm or less.

The dope may be filtered by an ordinary method, but it is preferable to perform the filtration with heat within such a temperature range that it is higher than a boiling point of the solvent under ordinary pressure but the solvent does not boil under the pressure, because difference in filter pressure before and after the filtration (called differential pressure) is small. The temperature is preferably 45° C. to 120° C., more preferably 45° C. to 70° C., and further more preferably is 45° C. to 55° C.

It is preferable that filter pressure is lower. The filter pressure is preferably 1.6 MPa or less, more preferably 1.2 MPa or less, and further more preferably 1.0 MPa or less.

Here, dope casting will be described.

It is preferable that the metal support used in the casting step has a mirror-finished surface. Preferably, a stainless steel belt or a drum having a surface plated with cast metal is used.

The cast width may be 1 to 4 m. In the casting step, surface temperature of the metal support is from −50° C. to less than a melting point of the solvent. Higher temperature is preferable because the web can be dried faster, but excessively high temperature may cause blisters in the web or deterioration in flatness.

Temperature of the support is preferably 0° C. to 55° C., and more preferably 25° C. to 50° C. Alternatively, it is also preferable that the support is cooled so that the web gels and then is stripped from the drum while the web contains a lot of residual solvent.

The method of controlling the metal support temperature is not particularly limited, and may be a method of blowing hot or cold air or a method of contacting the back side of the metal support with hot water. The method using hot water is more preferable because heat transfer is efficient and the temperature thus becomes constant in a short time. In the case of using hot air, the temperature of the hot air may be higher than a target temperature.

In order that the cellulose acylate film has good flatness, a residual solvent amount is preferably 10 to 150 mass % at the time of stripping the web from the metal support, more preferably 20 to 40 mass % or 60 to 130 mass %, and particularly 20 to 30 mass % or 70 to 120 mass %.

In the present invention, the residual solvent amount is defined by the following equation, $$\text{Residual solvent amount (mass \%)} = \{(M-N)/N\} \times 100$$

Where M represents the mass of a sample which is collected at a certain time like in the middle of production or after production, and N represents the mass of the sample M after dried at 115° C. for 1 hour.

Further, in the drying step of the cellulose acylate film, the web is further dried after stripped from the metal support so that the residual solvent amount is preferably 1 mass % or less, more preferably 0.1 mass % or less, particularly 0 to 0.01 mass % or less.

The film drying step uses such a method that the web is dried while being conveyed by generally a roll drying method (the web is dried by alternately passing through a plurality of upper and lower rolls) or a tentering method.

To manufacture the cellulose acylate film which is used in the present invention, it is particularly preferable that the web is stretched in the width (lateral) direction by a tentering method in which both ends of the web are pinched with clips or the like.

The stretching method is not particularly limited. For examples, such methods include a method in which a plurality of rolls are controlled to have different circumferential velocities, and the web is stretched toward the longitudinal direction because of the difference in circumferential velocity between the rolls; a method in which both ends of the web is fixed with clips or pins and the gap between the ends is widen toward the traveling direction so that the web is stretched toward the longitudinal direction; a method in which the gap between both ends is widen in the same way toward the lateral direction so that the web is stretched toward the lateral direction; or a method in which the gap between the ends is widen toward both lateral and longitudinal directions simultaneously in the same way so that the web is stretched toward both lateral and longitudinal directions. Needless to say, these methods may be combined. That is, the stretching may be performed toward the lateral direction, longitudinal direction or both directions with respect to the film forming direction. In the case of stretching in both directions, the stretching may be performed simultaneously or successively. In the case of a so-called tentering method, it is preferable that the clips are driven by a linear drive system because it enables smooth stretching to reduce risk of fracture or the like.

A stretching ratio in the stretching step is preferably 1.3 to 3.0, and more preferably 1.5 to 2.8. When the stretching ratio is within this range, it is advantageous that uneven thickness in the width direction is reduced. If stretching temperature is differentiated along the width direction in a stretching zone of a tenter stretching machine, uneven thickness in the width direction can be further improved.

Means for drying the web is not particularly limited, which may generally be hot air, infrared, heating roll, microwave and the like, of which hot air is preferable in terms of ease.

In the drying step, it is effective when the web is heat-treated at drying temperature not more than 5° C. below a glass transition temperature of the film and not less than 100° C. for from 10 or more to 60 or less minutes. The drying temperature is 100° C. to 200° C., and more preferably 110° C. to 160° C.

After a predetermined heat treatment, it is preferable to cut off the ends with an installed slitter before winding in order to achieve good aesthetics of the wound roll. Furthermore, it is preferable that both width ends are knurled.

The knurling may be formed by pressing a heated embossing roll against the film. The embossing roll has fine asperities, and asperities are formed on the film by pressing the embossing roll against the film, which can make the ends bulky.

It is preferable that the knurling on both width ends of the base film of the present invention has a height of 4 to 20 μm and a width of 5 to 20 mm.

Further, in the present invention, it is preferable that the above-described knurling is provided after the drying and before the winding in the film manufacturing steps.

(Haze)

The base film of the present invention has a haze of preferably less than 1%, and more preferably less than 0.5%. With the haze of less than 1%, it is advantageous that the film has improved transparency to be more useful as optical films.

(Average Moisture Content)

The base film of the present invention has an equilibrium moisture content under 25° C. and 60% relative humidity of preferably 4% or less, and more preferably 3% or less. With the average moisture content of 4% or less, it is advantageous that tolerance to temperature change is improved and optical characteristics and dimensions are less changeable.

(Film Thickness)

it is preferable that the base film of the present invention has a thickness of 30 to 100 μm. When the thickness is 30 μm or more, it is advantageous that the web-shaped film is easily handled in manufacturing the film.

(Film Length and Width)

It is preferable that the base film of the present invention has long length. Specifically, the base film is preferably 100 to 10,000 m long, and is winded into a roll shape. Further, the base film of the present invention has a width of preferably 1 m or more, more preferably 1.4 m or more, and particularly 1.4 to 4 m.

<Hard Coat Layer>

On the base film of the present invention, the hard coat layer is provided in contact with the adhesion improver containing resin layer. The hard coat layer is preferably a clear hard coat layer or anti-glare hard coat layer.

In the present invention, it is more preferable that an anti-reflection layer which includes at least a low refractive index layer is provided on the hard coat layer in order to improve visibility.

When the hard coat layer of the present invention is a clear hard coat layer, the hard coat layer has a center line average roughness (Ra) defined in JIS B 0601 of 0.001 to 0.1 μm. The Ra is preferably 0.002 to 0.05 μm. It is preferable that center line average roughness (Ra) is measured with an optical interferotype surface roughness tester. For example, Ra may be measured with a non-contact surface microprofiler WYKO NT-2000 by WYKO Corp.

When the hard coat layer of the present invention is of anti-glare type, the hard coat layer has fine asperities on the surface. These fine asperities are formed by adding fine particles to the hard coat layer. For example, they may be formed by adding below-mentioned fine particles having an average particle size of 0.01 to 4 μm to the hard coat layer. Further, as described below, it is preferable that the topmost surface of the anti-reflection layer, which is provided on the anti-glare hard coat layer, has a center line average surface roughness (Ra) defined in JIS B 0601 within a range of 0.08 to 0.5 μm.

The particles which are contained in the hard coat layer of the present invention may be, for example, inorganic or organic fine particles.

Examples of the inorganic fine particles include silicon oxide, titanium oxide, aluminum oxide, tin oxide, zinc oxide, calcium carbonate, barium sulfate, talc, kaolin, calcium sulfate and the like.

Further, examples of the organic particles include polymethacrylic acid methylacrylate resin fine particles, acrylic styrene-based resin fine particles, polymethylmethacrylate resin fine particles, silicone-based resin fine particles, polystyrene-based resin fine particles, polycarbonate resin fine particles, benzoguanamine-based resin fine particles, melamine-based resin fine particles, polyolefin-based resin fine particles, polyester-based resin fine particles, polyamide-based resin fine particles, polyimide-based resin fine particles, polyfluoroethylene-based resin fine particles and the like.

In the present invention, silicon oxide fine particles and polystyrene-based resin fine particles are particularly preferable.

It is preferable that the above-described inorganic and organic fine particles are added to the application composition which includes resins for manufacturing the anti-glare hard coat layer.

To provide anti-glare characteristics to the hard coat layer of the present invention, the organic or inorganic fine particles are blended in an amount of preferably 0.1 to 30 parts by mass, more preferably 0.1 to parts by mass with respect to 100 parts by mass of the resin for the anti-glare hard coat layer. To provide more preferable anti-glare effect, it is preferable to use fine particles having an average particle size of 0.1 to 1 μm in an amount of 1 to 15 parts by mass with respect to 100 parts by mass of the resin for the anti-glare hard coat layer, it is also preferable to use two or more types of fine particles having different average particle sizes.

Further, it is also preferable that an antistat is contained in the hard coat layer of the present invention. The antistat preferably contains at, least one element selected from the group consisting of Sn, Ti, In, Al, Zn, Si, Mg, Ba, Mo, W and V as the main component, as well as is a conductive material having a volume resistivity of $10^7$ Ω·cm or less.

Examples of the antistat include metal oxides and complex oxides which contain any of the above elements.

Preferable examples of the metal oxides include ZnO, $TiO_2$, $SnO_2$, $Al_2O_3$, $In_2O_3$, $SiO_2$, MgO, BaO, $MoO_2$, $V_2O_5$ and the like and complex oxides thereof, of which ZnO, $In_2O_3$, $TiO_2$ and $SnO_2$ are particularly preferable. As for examples which have a heterogeneous atom, for example, it is effective to add ZnO with Al, In or the like, $TiO_2$ with Nb, Ta or the like, and $SnO_2$ with Sb, Nb, halogen element or the like. Such heterogeneous atoms are added in an amount of preferably 0.01 to 25 mol %, and particularly 0.1 to 15 mol.

These conductive metal oxide powders have a volume resistivity of $10^7$ Ω·cm or less, and particularly $10^7$ Ω·cm or less.

To provide sufficient durability and impact resistance, the clear hard coat layer or anti-glare hard coat layer has a thickness in a range of preferably 0.5 to 15 μm, and more preferably 1.0 to 7 μm.

(Active Energy Ray Curing Resin)

It is preferable that the hard coat layer of the present invention contains an active ray curing resin which is cured by active ray irradiation such as ultraviolet ray.

Active energy ray curing resins are curable by cross-linking reaction or the like in response to active energy ray irradiation such as ultraviolet ray or electron beam. Representative examples of the active energy ray curing resin include ultraviolet curing resins, electron beam curing resins and the like, and may also include other resins which are cured by active energy ray irradiation besides ultraviolet ray and electron beam.

Examples of the ultraviolet curing resins include, for example, ultraviolet curing acrylic urethane-based resins, ultraviolet curing polyester acrylate-based resins, ultraviolet curing epoxy acrylate-based resins, ultraviolet curing polyol acrylate-based resins, ultraviolet curing epoxy resins and the like.

In general, ultraviolet curing acrylic urethane resins can be obtained easily by such a way that a polyester polyol is reacted with isocyanate monomer or prepolymer, and the obtained product is further reacted with acrylate-based monomer having a hydroxy (hydroxyl) group such as 2-hydroxyethyl acrylate, 2-hydroxyethyl methacrylate (hereinafter, "acrylate" is defined to include methacrylate, and only acrylates will be described) or 2-hydroxypropyl acrylate. For example, preferably used is a mixture of 100 parts by mass of UNIDIC 17-806 (DIC Corp.) and 1 part by mass of CORONATE L (Nippon Polyurethane Co., Ltd.) and the like, which is described in Japanese Patent Application Laid-Open Publication No. Sho59-151110.

In general, ultraviolet curing polyester acrylate-based resins can be obtained easily by such a way that a terminal hydroxy (hydroxyl) or carboxyl group of a polyester is reacted with monomer such as 2-hydroxyethyl acrylate, glycidyl acrylate or acrylic acid (see, Japanese Patent Application Laid-Open Publication No. Sho59-151112).

Ultraviolet curing epoxy acrylate-based resins are obtained by such a way that a terminal hydroxy (hydroxyl) group of an epoxy resin is reacted with monomer such as acrylic acid, acrylic acid chloride or glycidyl acrylate.

Examples of the ultraviolet curing polyol acrylate-based resins include ethyleneglycol (meth)acrylate, polyethyleneglycol di(meth)acrylate, glycerin tri(meth)acrylate, trimethylolpropane triacrylate, pentaerythritol triacrylate, pentaerythritol tetraacrylate, dipentaerythritol pentacrylate, dipentaerythritol hexaacrylate, alkyl-modified dipentaerythritol pentacrylate and the like.

Useful active energy ray-reactive epoxy compounds are shown as examples of the ultraviolet curing epoxy acrylate-based resins and ultraviolet curing epoxy resins.

(a) Glycidyl ethers of bisphenol A (obtained as a mixture of compounds having different degrees of polymerization by the reaction of epichlorohydrin and bisphenol A);

(b) compounds having a terminal glycidyl ether group which is obtained by the reaction of a compound having two phenolic OHs such as bisphenol A with epichlorohydrin, ethylene oxide and/or propylene oxide;

(c) glycidyl ethers of 4,4'-methylene bisphenol;

(d) epoxy compounds of phenol-formaldehyde resin such as novolac resin and resol resin;

(e) compounds having an alicyclic epoxide, for example, bis(3,4-epoxycyclohexylmethyl)oxalate, bis(3,4-epoxycyclohexylmethyl)adipate, bis(3,4-epoxy-6-cyclohexylmethyl)adipate, bis(3,4-epoxycyclohexylmethyl pimelate) 3,4-epoxycyclohexylmethyl-3,4-epoxycyclohexane carboxylate, 3,4-epoxy-1-methylcyclohexylmethyl-3',4'-epoxycyclohexane carboxylate, 3,4-epoxy-1-methyl-cyclohexylmethyl-3',4'-epoxy-1-methylcyclohexane carboxylate, 3,4-epoxy-6-methyl-cyclohexylmethyl-3',4'-epoxy-6'-methyl-1'-cyclohexane carboxylate and 2-(3,4-epoxycyclohexyl-5,5'-spiro-3",4"-epoxy)cyclohexane-meta-dioxane;

(f) giglycidyl ethers of diacids, for example, diglycidyl oxalate, diglycidyl adipate, diglycidyltetra hydrophthalate, diglycidylhexahydrophthalate and diglycidyl phthalate;

(g) diglycidyl ethers of glycols, for example, ethyleneglycol diglycidylether, diethyleneglycol diglycidylether, propyleneglycol diglycidylether, polyethyleneglycol diglycidylether, polypropyleneglycol diglycidylether, copoly(ethyleneglycol-propyleneglycol)diglycidylether, 1,4-butanediol diglycidylether and 1,6-hexanediol diglycidylether;

(h) glycidyl esters of polymer acids, for example, polyacrylic acid polyglycidylester and polyester diglycidylester;

(i) glycidyl ethers of polyols, for example, glycerin triglycidylether, trimethylolpropane triglycidylether, pentaerythritol diglycidylether, pentaerythritol triglycidylether, pentaerythritol tetraglycidylether and glucose triglycidylether;

(j) diglycidyl ethers of 2-fluoroalkyl-1,2-diols such as the examples of the fluorine-containing epoxy compounds of the fluororesins as for the above-described low refraction index substances; and (k) glycidyl ethers of fluorine-containing alkane-terminated diols such as the examples of the fluorine-containing epoxy compounds of the fluororesins as for the above-described low refraction index substances can be given as examples.

The molecular weight of the above epoxy compounds is 2,000 or less, preferably 1,000 or less by the average molecular weight.

To further increase the hardness, it is effective to mix a compound of (h) or (i) having a multifunctional epoxy group, when the above epoxy compounds are cured with active energy ray.

Photopolymerization initiators or photosensitizers which allow active energy ray reactive epoxy compounds to polymerize by cationic polymerization are compounds which can release a cationic polymerization intiator in response to active energy ray irradiation. Particularly preferred are a series of double salts in the form of onium salt which releases a luis acid capable of initiating cationic polymerization in response to irradiation.

The active energy ray reactive epoxy resins form cross-linked structure or network not by radical polymerization but by cationic polymerization. Such active energy ray reactive resins are preferable because they are not affected by oxygen in the reaction system unlike radical polymerization.

The active energy ray reactive epoxy resins which are useful for the present invention are polymerized by a photopolymerization initiator or photosenstizer which releases a substance initiating cationic polymerization in response to active energy ray irradiation. Particularly preferred photopolymerization initiators are a series of double salts in the form of onium salt which releases a luis acid capable of initiating cationic polymerization in response to irradiation.

Representatives are compounds represented by the following general formula (c).

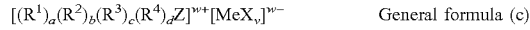   General formula (c)

In the formula, the cation is an onium, Z is S, Se, Te, P, As, Sb, Bi, O, halogen (e.g., I, Br and Cl) or N=N (diazo), and $R^1$, $R^3$, $R^3$ and $R^4$ are organic groups which may be the same or different. The notes a, b, c and d are each an integer of 0 to 3, and a+b+c+d is equal to the valence number of Z. Me is a metal or metalloid which is a central atom of a halide complex, such as B, P, As, Sb, Fe, Sn, Bi, Al, Ca, In, Ti, Zn, Sc, V, Cr, Mn and Co. X is a halogen atom, w is a net electron charge of the halide complex ion, and v is the number of halogen atoms in the halide complex ion.

Specific examples of the anion $[MeX_v]^{w-}$ of the above general formula (c) include tetrafluoroborate ($BF_4^-$), tetrafluorophoate ($PF_1^-$), tetrafluoroantimonate ($SbF_4^-$), tetrafluoroarsenate ($AsF_4^-$), tetrachloroantimonate ($SbCl_4^-$) and the like.

Other examples of the anionic ion include perchlorate ion ($ClO_4^-$), trifluoromethylsulfite ion ($CF_3SO_3^-$), fluorosulfonate ion ($FSO_3^-$), toluene sulfonate ion, trinitrobenzoate anion and the like.

Among these onium salts, it is particularly effective to use aromatic onium salts as the cationic polymerization initiator. Among aromatic onium salts, preferred are aromatic halonium salts described in Japanese Patent Application Laid-Open Publication Nos. Sho50-151996, Sho50-158680 and the like, group VIA salts of aromatic onium salts described in Japanese Patent Application Laid-Open Publication Nos. Sho50-151997, Sho52-30899, Sho59-55420, Sho55-125105 and the like, oxosulfoxonium salts described in Japanese Patent Application Laid-Open Publication Nos. Sho56-8428, Sho56-149402, Sho57-192429 and the like, aromatic diazonium salts described in Japanese Examined Patent Publication No. Sho49-17040 and the like, and thiopyrylium salts described in U.S. Pat. No. 4,139,655 and the like. Further, aluminium complexes or photodegradable silicon, compound-based polymerization initiators may be given as examples. The above cation polymerization initiators may be used in combination with a photosensitizer such as benzophenone, benzoin isopropylether or thioxanthone.

Further, when the active energy ray reactive compound has an epoxy group, a photosenstizer may be n-butyl amine, tryethylamine, tri-n-butylphosphine and the like. Regarding the amount of these photosensitizer and photoinitiator which are used for the active energy ray reactive compound, a sufficient amount for initiating photoreaction is 0.1 to 15 parts by mass, and preferably 1 to 10 parts by mass with respect to 100 parts by mass of the ultraviolet reactive compound. It is preferable that this sensitizer has an absorption maximum within the range of near-ultraviolet to visible light.

In an active energy ray curing resin composition which is useful for the present invention, the polymerization initiator is generally used in an amount of preferably 0.1 to 15 parts by mass, and more preferably 1 to 10 parts by mass with respect to 100 parts by mass of the active energy ray curing epoxy resin (prepolymer).

Further, the epoxy resin may be used in combination with the above-described urethane acrylate-type resin, polyether acrylate-type resin or the like. In this case, it is preferable to use an active energy ray radical polymerization initiator in combination with an active energy ray cationic polymerization initiator.

In the hard coat layer of the present invention, an oxetane compound may be used. Employable oxetane compounds have a three-membered oxetane ring including oxygen or sulfur. Among such oxetane compounds, compounds having an oxygen-including oxetane ring are preferable. The oxetane ring may be substituted with a halogen atom, haloalkyl group, arylalkyl group, alkoxyl group, allyloxy group or acetoxy group. Specific examples include 3,3-bis(chloromethyl)oxetane, 3,3-bis(iodomethyl)oxetane, 3,3-bis(methoxymethyl)oxetane, 3,3-bis(phenoxymethyl)oxetane, 3-methyl-3-chloromethyloxetane, 3,3-bis(acetoxymethyl) oxetane, 3,3-bis(fluoromethyl)oxetane, 3,3-bis(bromomethyl)oxetane, 3,3-dimethyloxetane and the like. In the present invention, the above may be any of monomer, oligomer and polymer.

In the hard coat layer of the present invention, the above-described active energy ray curing resin may be mixed with a binder such as known thermoplastic resins, thermosetting resins and hydrophilic resins like gelatin. These resins preferably have a polar group in the molecule. Examples of the polar group include —COOM, —OH, —NR$_2$, —NR$_3$X, —SO$_3$M, —OSO$_3$M, —PO$_3$M$_2$, —OPO$_3$M (where M represents a hydrogen atom, alkali metal or ammonium group, X represents an acid constituting an amine salt, R represents a hydrogen atom or alkyl group) and the like.

When the hard coat layer of the present invention includes the active energy ray curing resin, active energy ray irradiation may be performed after the hard coat layer, antireflection layer (middle to high refractive index layer and low refractive index layer) and the like are applied onto the support. However, the irradiation is preferably performed in applying the hard coat layer.

The active energy ray used in the present invention is ultraviolet ray, electron beam, γ ray or the like, and is not limited as long as it is an energy source capable of activating the compound. Among the above rays, ultraviolet ray and electron beam are preferable. Ultraviolet ray is particularly preferable because it is easy to handle and high energy can easily be obtained. A light source of the ultraviolet ray which photo-polymerizes the ultraviolet reactive compound may be any light source as long as it generates ultraviolet ray. For example, a low-pressure mercury lamp, middle-pressure mercury lamp, high-pressure mercury lamp, ultrahigh-pressure mercury lamp, carbon arc lamp, metalhalide lamp or xenon lamp may be used. Further, an Ar—F excimer laser, Kr—F excimer laser, excimer lamp, synchrotron radiation or the like may also be used. It is preferable to use a light source which has an emission spectrum in an ultraviolet region of 250 to 420 nm wavelength. Although irradiation conditions vary depending on types of lamps, irradiation dose is preferably 20 mJ/cm$^2$ or more, more preferably 50 to 2,000 mJ/cm$^2$, and particularly 50 to 1,000 mJ/cm$^2$.

The ultraviolet irradiation may be performed on the hard coat layer and a plurality of layers (middle refractive index layer, high refractive index layer and low refractive index layer) constituting the anti-reflection layer every time a single layer is formed, or may be performed after the layers are overlayed. Alternatively, the irradiation may be performed by the above ways in combination. In terms of productivity, it is preferable that the ultraviolet irradiation is performed after the plurality of layers are overlayed.

Further, electron beam may be used in the same manner. The electron beam may be emitted from various types of electron beam accelerators such as Cockcroft-Walton type, Van de Graaff type, resonance transformer type, insulated core transformer type, linear type, dynamitron type and high-frequency type accelerators, with an energy of 50 to 1,000 keV, and preferably 100 to 300 keV.

The above-described active energy ray reactive compound which is used in the present invention can initiate the photopolymerization or photocross-linking reaction by itself. However, because the introduction period is long or the polymerization starts late, it is preferable to use a photosensitizer or photoinitiator, which can accelerate the polymerization.

If the hard coat layer of the present invention contains the active energy ray curing resin, the active energy ray may be irradiated in the presence of the photoreactive initiator and photosensitizer.

Specific examples include acetophenone, benzophenone, hydroxybenzophenone, Michler's ketone, α-amyloxime ester, thioxanthone and derivatives thereof. When a photoreactive agent is used in synthesizing an epoxyacrlylate-based resin, a sensitizer such as n-butylamine, triethylamine and tri-n-buthylphosphine may be used. The photoreactive initiator and/or photosensitizer is used in an amount of preferably 1 to 10 mass %, and particularly 2.5 to 6 mass % of the ultraviolet curing resin composition excluding the solvent component which volatilizes after applied and dried.

When an ultraviolet curing resin is used as the active energy ray curing resin, an ultraviolet absorber described below may be contained in the ultraviolet curing resin composition to the extent not inhibiting the ultraviolet curing resin from photocuring.

To increase heat resistance of the hard coat layer, an antioxidant which does not inhibit photocuring reaction may be selected and used. Examples include, for example, hindered phenol derivatives, thiopropionic acid derivatives, phosphite derivatives and the like. Specific examples include, for example, 4,4'-thiobis(6-tert-3-methylphenol), 4,4'-butylidene-bis(6-tert-butyl-3-methylphenol), 1,3,5-tris (3,5-di-tert-butyl-4-hydroxybenzyl)isocyanurate, 2,4,6-tris (3,5-di-tert-butyl-4-hydroxybenzyl)mesitylene, di-octade-cyl-4-hydroxy-3,5-di-tert-butylbenzylphosphate and the like.

The ultraviolet curing resin may be selected from, for example, ADEKAOPTOMER KR and BY series, i.e., KR-400, KR-410, KR-550, KR-566, KR-567 and BY-320B (ADEKA Corp.), KOEIHARD A-101-KK, A-101-WS, C-302, C-401-N, C-50, M-10, M-102, T-102, D-102, NS-101, FT-102Q8, MAG-1-P20, AG-106 and M-101-C (Koei Chemical formulaical Co. Ltd.), SEIKABEAM PHC2210(S), PHCX-9 (K-3), PHC2213, DP-10, DP-20, DP-30, P1000, P1100, P1200, P1300, P1400, P1500, P1600 and SCR900 (Dainichiseika Color & Chemical formulaicals Mfg. Co. Ltd.), KRM7033, KRM7039, KRM7130, KRM7131, UVECRYL 29201 and UVECRYL 29202 (Daicel UCB Corp.), RC-5015, RC-5016, RC-5020, RC-5031, RC-5100, RC-5102, RC-5120, RC-5122, RC-5152, RC-5171, RC-5180 and RC-5181 (DIC Corp.), OLEX No. 340 clear (Chugoku Marine. Paints, Ltd.), SANRAD H-601 (Sanyo Chemical formulaical Industries, Ltd.), SP-1509 and SP 1507 (Showa Polymer Corp.), RCC-15C (Grace Japan Corp.), ARONIX M-6100, M-8030 and M-8060 (TOAGOSEI Co., Ltd.) and the other commercially available products.

It is preferable that the application composition containing the active energy ray curing resin has a solid component concentration of 10 to 95 mass %, and a suitable concentration is selected according to an application method.

It is also preferable that the hard coat layer of the present invention contains a surfactant, and preferable surfactants are silicone-based surfactants or fluorosurfactants.

Preferable silicone-based surfactants are nonionic surfactants which have methylpolysiloxane as a hydrophobic group and polyoxyalkylene as a hydrophilic group.

Nonionic surfactants are a general term for surfactants having no group which dissociates to produce ion in aqueous solution, and have hydroxy (hydroxyl) groups of polyol or a polyoxyalkylene chain (polyoxyehylene) as a hydrophilic group as well as a hydrophobic group. The more the number of alcoholic hydroxy (hydroxyl) groups is, or the longer the polyoxyalkylene chain (polyoxyethylene chain) is, the stronger hydrophilicity is. The nonionic surfactants of the present invention are characterized by having dimethylpolysiloxane as the hydrophobic group.

By use of the nonionic surfactant which have methylpolysiloxane the hydrophobic group and polyoxyalkylene the hydrophilic group, unevenness of the anti-glare hard coat layer and low refractive index layer and antifouling characteristics of the film surfaces are improved. It is supposed that the polymethylsiloxane hydrophobic groups are oriented on the surface to form an anti-fouling film surface. This advantage cannot be obtained by use of the other surfactants.

Specific examples of these nonionic surfactants include, for example, silicone surfactants SILWET L-77, L-720, L-7001, L-7002, L-7604, Y-7006, FZ-2101, FZ-2104, FZ-2105, FZ-2110, FZ-2118, FZ-2120, FZ-2122, FZ-2123, FZ-2130, FZ-2154, FZ-2161, FZ-2162, FZ-2163, FZ-2164, FZ-2166 and FZ-2191 produced by Nippon Unicar Co., Ltd. and the like.

Further, SUPERSILWET SS-2801, SS-2802, SS-2803, SS-2804, SS-2805 can also be given as examples.

Further, regarding the structure of the nonionic surfactants which have methylpolysiloxane and polyoxyalkylene as the hydrophobic and hydrophilic groups respectively, it is preferable that the surfactant is such a linear block copolymer that dimethylpolysiloxane structural moieties and polyoxyalkylene chains are alternately linked to each other. Such structure is excellent because a main chain backbone is long and linear. It is supposed that because hydrophilic and hydrophobic groups are alternately repeated in the block copolymer, one active agent molecule traps a silica fine particle at a plurality of sites on the surface so as to cover the particle.

Specific examples of the above include, for example, silicone surfactants ABN SILWET FZ-2203, FZ-2207 and FZ-2208 produced by Nippon Unicar Co., Ltd. and the like.

The fluorosurfactants may be surfactants in which the hydrophobic group has a perfluorocarbon chain. Such surfactants include fluoroalkyl carboxylic acid, disodium N-perfluorooctane sulfonyl glutaminate, sodium 3-(fluoroalkyloxy)-1-alkylsulfate, sodium 3-(o-fluoroalkanoyl-N-ethylamino)-1-propanesulfonate, N-(3-perfluorooctane sulfoneamide) propyl-N,N-dimethyl-N-carboxymethylene ammoniumbetaine, perfluoroalkyl carboxylic acid, perfluorooctane sulfonic acid diethanolamide, perfluoroalkylsulfonate, N-propyl-N-(2-hydroxyethyl)perfluorooctane sulfoneamide, perfluoroalkylsulfoneamide propyltrimethyl ammonium salt, perfluoroalkyl-N-ethylsulfonyl glycin salt, bis(N-perfluorooctylsulfonyl-N-ethylaminoethyl)phosphate and the like. In the present invention, nonionic surfactants are preferable.

These fluorosurfactants are commercially available in the product names of MEGAFAC, EFTOP, SURFLON, FTERGENT, UNIDYNE, FLUORAD, ZONYL and the like.

The amount to be added is preferably 0.01% to 3.0%, and more preferably 0.02% to 1.0% with respect to the solid component of the hard coat layer application liquid.

Other surfactants may be suitably used together. For example, sulfonate-based, sulfate-based and phosphate-based anionic surfactants, ether and etherester nonionic surfactants which have a polyoxyethylene chain as the hydrophilic group and the like may be suitably used together.

The solvent which is used for applying the hard coat layer of the present invention may be suitably selected from, for example, hydrocarbon atoms, alcohols, ketones, esters, glycolethers and other solvents, or combinations thereof. Preferably used are solvents which contain 5 mass % or more of propyleneglycol mono(C1-C4)alkylether or propyleneglycol mono (C1-C4) alkyletherester, and more preferably 5 to 80 mass % or more.

The hard coat layer composition application liquid may be applied using any known method such as gravure coating, spinner coating, wire bar coating, roll coating, reverse coating, extrusion coating, air doctor coating, spray coating or inkjet. Suitable application amount is 5 to 30 µm in wet film thickness, and preferably 10 to 20 µm. The application rate is preferably 10 to 200 r/min.

After applied and dried, the hard coat layer composition is preferably cured by active energy ray irradiation such as ultraviolet ray or electron beam. Irradiation time of the active energy ray is preferably 0.5 sec to 5 min, and more preferably 3 sec to 2 min considering the curing efficiency of the ultraviolet curing resin, work efficiency and the like.

(Anti-Reflection Layer)

It is also preferable that an anti-reflection layer on the hard coat layer is provided on the hard coat layer of the base film.

The anti-reflection layer to be used may be composed of only a single low refractive index layer. Preferably, the anti-reflection layer is composed of a plurality of refractive index layers. The anti-reflection layer may be further overlayed on the surface where the adhesion improver containing resin layer and hard coat layer are provided on the base film, so as to reduce the reflectance by optical interference considering refractive index, film thickness, the number of layers, order of layers and the like. The anti-reflection layer may be composed of a high refractive index layer having a refractive index higher than a refractive index of the support and a low refractive index layer having a refractive index lower than a refractive index of the support. It is particularly preferable that the anti-reflection layer is composed of three or more refractive index layers. It is preferable that three layers having different refractive indexes are overlayed in the order, from the support side, of middle refractive index layer (having a refractive index higher than reflective indexes of the support and anti-glare hard coat layer but lower than a reflective index of the high refractive index layer)/high refractive index layer/low refractive index layer.

It is also preferable that the anti-reflection layer is composed of four or more layers in which two or more high refractive index layers and two or more low refractive index layers are alternately overlayed.

The followings are examples of preferable layer configurations of the anti-reflection layer according to the present invention. In the followings, "/" represents placement by overlaying.

Examples are:

base film/adhesion improver containing resin layer/clear hard coat layer/low refractive index layer;

base film/adhesion improver containing resin layer/clear hard coat layer/high refractive index layer/low refractive index layer;

base film/adhesion improver containing resin layer/clear hard coat layer/middle refractive index layer/high refractive index layer/low refractive index layer;

base film/adhesion improver containing resin layer/anti-glare hard coat layer/low refractive index layer;

base film/adhesion improver containing resin layer/anti-glare hard coat layer/high refractive index layer/low refractive index layer; and base film/adhesion improver containing resin layer/anti-glare hard coat layer/middle refractive index layer/high refractive index layer/low refractive index layer.

An antifouling layer may be further provided on the topmost low refractive index layer so as to make it easy to wipe out smudges and fingerprints. A fluoroorganic compound is preferably used for the antifouling layer.

The layer configuration is not limited to the above examples as long as the reflectance can be reduced by optical interference. In the above layer configurations, a suitable intermediate layer may be further provided, a preferable example of which is, for example, an antistat layer which contains conductive polymer fine particles (e.g., cross-linked cation fine particles) or metal oxide fine particles (e.g., $SnO_2$, ITO and the like), and the like.

The low refractive index layer, middle refractive index layer and high refractive index layer may be formed in any known configurations. In particular, hollow spherical silica-based fine particles are suitably used in the low refractive index layer, which particles may be (I) complex particles composed of porous particles and coating layers provided on the surfaces of the porous particles, or (II) hollow particles having hollows filled with solvent, gas or porous substance.

The above low refractive index layer, middle refractive index layer and high refractive index layer are described in detail in Japanese Patent Application Laid-Open Publication No. 2005-266051.

The film thickness of each refractive index layer of the anti-reflection layer is preferably in a range of 1 to 200 nm, and more preferably 5 to 150 nm. It is preferable to choose a suitable thickness according to the refractive index of each layer.

It is preferable that the anti-reflection layer which is used in the present invention has an average reflectance in 450 to 650 nm of 1% or less, and particularly 0.5% or less. Further, it is particularly preferable that the minimum reflectance in this range is 0.00 to 0.3%.

The refractive index and film thickness of the anti-reflection layer can be calculated from a measuring result of the spectral reflectance. Further, optical reflection characteristics of a produced low reflection film can be determined by measuring specular reflectance at 5° by use of a spectorophotometer.

EXAMPLES

Hereinafter, the present invention will be described with reference to examples, but the present invention is not limited thereto.

First Example

Synthesis of Cellulose Acylate

Cellulose acylates having acetyl substitution degrees shown in Table 1 were synthesized by the methods described in Japanese Patent Application Laid-Open Publication Nos. Hei10-45804 and Hei08-231761, and the substitution degrees were measured. Specifically, sulfuric acid (7.8 parts by mass with respect to 100 parts by mass of cellulose) was added as a catalyst, and carboxylic acid was added as the raw material of acethyl substitutents. Then, acylation reaction was initiated at 40° C. At this time, types and amount of the carboxylic acid were adjusted so as to control the substitution degree. Further, aging was performed at 40° C. after the acylation. Furthermore, the low molecular weight components of the cellulose acylates were removed by washing with acetone.

The substitution degrees were determined by the measurement defined in ASTM-D817-96.

In Table 1, a cellulose acylate referred to as CAP is cellulose acetatepropionate (acetyl substitution degree of 1.90, propionyl substitution degree of 0.54).

(Adhesion Improver)

In the Examples, the following benzotriazol-based compounds (M-1 to M-3) and benzophenone-based compound (M-4) were used.

M-1: TINUVIN 928 ($\lambda$max of 348 nm, BASF Japan Ltd.)
M-2: TINUVIN 326 ($\lambda$max of 353 nm, BASF Japan. Ltd.)
M-3: TINUVIN 571 ($\lambda$max of 344 nm, BASF Japan Ltd.
M-4: CHIMASSORB 81 ($\lambda$max of 327 nm, BASF Japan Ltd.)

Absorption maximum peak ($\lambda$max) was measured with solutions where the above compounds dissolved in solvent (dichloromethane or toluene) by use of a spectrophotometer UVIDFC-610 produced by Shimadzu Corp. As a result, it was confirmed that every compound had the absorption maximum peak ($\lambda$max) within the range of 260 to 400 nm.

<Preparation of Cellulose Acylate Film 101>
<Fine Particle Dispersion 1>
Fine particles (AEROSIL R812, Nippon Aerosil Co., Ltd.): 11 parts by mass
Ethanol: 89 parts by mass The above materials were mixed for 50 min with a dissolver, and then dispersed with a Manton-Gaulin <Fine Particle Added Solution 1>

The fine particle dispersion 1 was gradually added to methylene chloride in a melting furnace under thorough stirring. The mixture was further dispersed by use of an attritor so as to adjust the secondary particles size to a predetermined value. The product was filtrated with a FINEMET NF produced by NipponSeisen Co., Ltd. Fine particle added solution 1 was thus prepared.

Methylene chloride: 99 parts by mass
Fine particle dispersion 1: 5 parts by mass A main dope solution having the following composition was prepared. First, methylene chloride and ethanol was placed in a pressure dissolution tank. Into the pressure dissolution tank with the solvents, cellulose acetate having an acetyl substitution degree of 2.88 was added under stirring. This mixture was heated under stirring for thorough dissolution. This solution was filtrated with an AZUMI filter paper No. 244 produced by Azumi Filter Paper Co., Ltd. The main dope solution was thus prepared.

<Composition of Main Dope Solution>
Methylene chloride: 340 parts by mass
Ethanol: 64 parts by mass
Cellulose acetate (acetyl substitution degree of 2.88, weight average molecular weight of 140,000): 100 parts by mass
Triphenylene phosphate: 12 parts by mass
Biphenyldiphenyl phosphate: 6 parts by mass
Tribenzylamine: 2 parts by mass
Fine particle added solution 1:1 part by mass The above materials were placed into a sealed main dissolution furnace and dissolved under stirring. The dope solution was thus prepared.

On a stainless steel belt support, the solvent in a casted film was allowed to volatilize until the residual solvent amount decreased down to 75%, and then the film was stripped from the stainless steel belt support by a stripping tensile force of 130 N/m. The stripped cellulose acylate film was stretched by 20% in the width direction using a tenter with heat at 170° C. The residual solvent was 15% at the start of the stretching.

Subsequently, the film was conveyed through a dry zone with a plurality of rolls so as to complete the drying. The drying temperature was 130° C. and the conveying tension was 100N/m. Accordingly, a cellulose acylate film 101 having a dry film thickness of 40 µm was obtained.

Next, cellulose acylate films 102 and 103 were prepared in the same manner except that the CAP and cellulose acylate having an acetyl substitution degree of 2.43 were used.

<Preparation of Three-Layered Cellulose Acylate Film 104>

The following three types of dope were prepared, and a laminated cellulose acylate film 104 having a core and skin portions was prepared by co-film casting.

Figure 2:
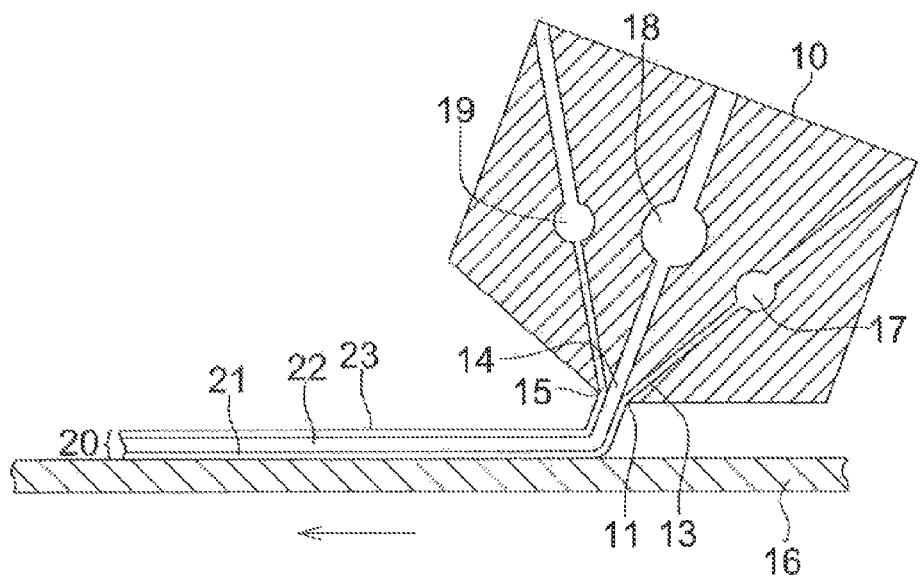
FIG. 2 This is a schematic diagram showing a co-film casting die forming a multi-layered web film casting.

(Preparation of Cellulose Acylate Dope for Core Layer)
  Methylene chloride: 340 parts by mass
  Ethanol: 64 parts by mass
  Cellulose acetate (acetyl substitution degree of 2.43, weight average molecular weight of 210,000): 100 parts by mass
  Triphenylene phosphate: 20 parts by mass (Preparation of Cellulose Acylate Dope for Skin Layer on Hard Coat Side)
  Methylene chloride: 340 parts by mass
  Ethanol: 64 parts by mass
  Cellulose acetate (acetyl substitution degree of 2.88, weight average molecular weight of 140,000): 100 parts by mass
  Triphenylene phosphate: 12 parts by mass
  Biphenyldiphenyl phosphate: 6 parts by mass
  Tribenzylamine: 2 parts by mass
  Fine particle added solution 1:1 part by mass (Preparation of Cellulose Acylate Dope for Skin Layer)
  Methylene chloride: 340 parts by mass
  Ethanol: 64 parts by mass
  Cellulose acetate (acetyl substitution degree of 2.88, weight average molecular weight of 140,000): 100 parts by mass
  Triphenylene phosphate: 20 parts by mass
  Fine particle added solution 1:1 part by mass Each of the above compositions was placed in a mixing tank. After stirred to dissolve the components, each of the solution was filtrated with a filter paper having an average pore size of 34 µm and with a sintered metal filter having an average pore size of 10 µm. The cellulose acylate dopes were thus prepared. By use of the dice shown in FIG. 2, the dopes were co-casted with a band film casting machine so as to obtain three-layered structure of hard coat skin layer on hard coat layer side/core layer/skin layer. Here, the simultaneous multilayer film casting was performed adjusting the casting amount of each dope in order that the core layer was the thickest layer and the film thicknesses after stretching were 2 µm/45 µm/2 µm. The film, which was stripped from a band when the residual solvent amount was about 30 mass %, was stretched widthwise by a stretching ratio of 32% using a tenter while being blown with hot air of 140° C., and then relaxed at 140° C. for 60 sec so as to adjust the stretching ratio to 30%. The film was then transferred from the tenter conveyor to a roll conveyor, and further dried at 120° C. to 150° C. and winded.

<Preparation of Cycloolefin Resin Film 105>

Under nitrogen atmosphere, 500 parts by mass of dehydrated cyclohexane, 1.2 parts by mass of 1-hexene, 0.15 part by mass of dibuthylether and 0.30 part by mass of triisobutyl aluminum at room temperature were placed and mixed in a reactor. Then, 40 parts by mass of tungsten hexachloride (0.7% toluene solution) and a norbornene-based monomer mixture which was composed of 20 parts by mass of tricyclo[4.3.0.12,5]deca-3,7-diene (dicyclopentadiene, hereinafter abbreviated as DCP), 140 parts by mass of 1,4-methano-1,4,4a,9a-tetrahydrofluorene (hereinafter abbreviated as MTF) and 40 parts by mass of 8-methyl-tetracyclo [4.4.0.12, 5.17,10]-dodeca-3-ene (hereinafter abbreviated as MTD) were added to the mixture continuously for 2 hours while keeping at 45° C. for polymerization. Then, 1.06 parts by mass of butyl glycidyl ether and 0.52 part by mass of isopropylalcohol was added to the polymer solution so as to inactivate the polymerization catalyst and stop the polymerization reaction.

Next, 270 parts by mass of cyclohexane was added to 100 parts by mass of the obtained reaction solution which contains the ring-opening polymer product. Then, 5 parts by mass of a nickel-alumina catalyst (Nikki Chemical formulaical Corp.) was added as a hydrogenizing catalyst to the reaction solution. The solution was then pressurized at 5 MPa by hydrogen, and heated to 200° C. under stirring. The reaction was continued for 4 hours so as to obtain a reaction solution containing 20% of a hydrogenated DCP/MTF/MTD ring-opening polymer product. After the hydrogenating catalyst was removed by filtration, a soft polymer (SEPTON 2002, Kuraray Co., Ltd.) and an antioxidant (IRGANOX 1010, BASF Japan, Ltd.) were added and dissolved to the obtained solution (each 0.1 part by mass with respect to 100 parts by mass of the polymer product). Subsequently, cyclohexane solvent and other volatile components were removed from the solution by use of a cylinder thickener/dryer (Hitachi, Ltd.), and the hydrogenated polymer in a melt state was extruded into a form of strands from an extruder. After cooled, the polymer was pelletized and collected. The copolymerization proportion of the norbornene-based monomers in the polymer was calculated from residual norbornene components in the solution after polymerization (by gas chromatography). The proportion was DCP/MTF/MTD=10/70/20, which was almost the same as the nominal composition. This hydrogenated ring-opening polymerization product had a weight average molecular weight (Mw) of 31,000, molecular weight distribution (Mw/Mn) of 2.5, hydrogenation degree of 99.9% and Tg of 134° C.

The obtained pellets of the hydrogenated ring-opening polymerization product were dried at 70° C. for 2 hours to remove water by use of an air-circulating hot air dryer. Next, the pellets were melt-extruded into a cycloolefin film 105 of 80 µm thick by use of a short axis extruder equipped with a coat-hanger T-die of 1.6 m lip width (Mitsubishi Heavy Industries, Ltd., screw size of 90 mm, T-die lip of tungsten carbide, peel strength of melted resin of 44 N). The extrusion molding was performed in a cleanroom of class 20,000 or less in the molding condition of a melted resin temperature of 240° C. and T-die temperature of 240° C. The obtained cycloolefin resin film 105 was slitted to remove both edges, and thus shaped into 1.5 m width. Further, a polyester film was winded together as a protective film.

<Preparation of Hard Coat Film 201>

<Application of Adhesion Improver Containing Resin Layer>

By use of the following adhesion improver containing resin layer application liquid 1, an adhesion improver containing resin layer was applied onto the surface of the cellulose acylate film 101 so that the dry film thickness was about 0.2 µm, and dried in a dry section at 80° C.

(Adhesion Improver Containing Resin Layer Application Liquid 1)
  Polymethyl methacrylate (weight average molecular weight of 30,000): 100 parts by mass
  Propyleneglycol monomethylether: 14000 parts by mass
  Methylethylketone: 6000 parts by mass
  Adhesion improver M-1: 0.1 part by mass Next, after the following hard coat layer application liquid 1 was die-coated and dried at 80° C., the solution was irradiated with 120 mJ/cm² ultraviolet ray by a high-pressure mercury lamp so that a clear hard coat layer having a cured film thickness of 6 μm was formed. A hard coat film 101 was thus prepared.

(Hard Coat Layer Application Liquid 1)

Acetone: 45 parts by mass
Ethyl acetate: 45 parts by mass
Propyleneglycol monomethylether: 10 parts by mass
Pentaerythritol triacrylate: 30 parts by mass
Pentaerythritol tetraacrylate: 45 parts by mass
Urethane acrylate (product name of U-4HA, Shin-Nakamura Chemical formulaical Co., Ltd.): 25 parts by mass
1-hydroxy-cyclohexyl-phenyl-ketone (IRGACURE 184, BASF Japan, Ltd.): 5 parts by mass 2-methyl-1-[4-(methylthio)phenyl]-2-morpholino-1-one: (IRGACURE 907, BASF Japan, Ltd.): 3 parts by mass
BYK-331 (silicone surfactant, BYK Japan Corp.): 0.5 part by mass <Preparation of Hard Coat Films 202 to 225>

Application liquids were prepared in the same manner as the adhesion improver containing resin layer application liquid 1 except that the type of adhesion improver and the content thereof were changed. These application liquids were applied onto the base films shown in Table 1 so that the dry film was about 0.2 μm, and dried in a drying section at 80° C.

Next, hard coat layers were formed by use of the above hard coat layer application liquid 1. Hard coat films 202 to 225 were thus prepared.

The hard coat films 223 to 225 were directly formed onto the base films without providing the adhesion improver containing resin layer.

<Manufacturing of Liquid Crystal Display Devices with Front Plates>

From a 60-inch display BRAVIA LX900 produced by Sony, the originally pasted front plate was taken away, and the filler between the front plate and the polarizing plate on the panel front was removed. As a sealing layer, SVR 1100 produced by Sony Chemical formulaical & Information Device Corp., which contains an ultraviolet curing resin, was newly applied thereon by 100 μm thick. A glass plate on which the hard coat layer 101 as prepared above is pasted was overlaid thereon via an acrylic resin sticking agent. Thereafter, irradiation with ultraviolet ray was performed in the light amount of 5,000 mJ/cm² from the side of the hard coat layer, i.e., the topmost surface, so as to cure the sealing layer. A liquid crystal display device with front plate 201, which has the configuration as shown in FIG. 1, was thus prepared.

Using the hard coat films 202 to 225, liquid crystal display devices with front plates 202 to 225 were prepared in the same manner.

<<Evaluation>>

<Light Transmittance>

The base films where the adhesion improver containing resin layers as prepared above were provided were subjected to the measurement of light transmittance at 380 nm by use of a spectrophotometer UVIDFC-610 produced by Shimadzu Corp.

⊚: Light transmittance at 380 nm was 70% or more;
○: light transmittance at 380 nm was 51% or more to less than 70%;
Δ: light transmittance at 380 nm was 30% or more to less than 51%; and
×: light transmittance at 380 nm was less than 30%

<Adhesiveness Between Hard Coat Layer and Base Film>

After the prepared liquid crystal display devices with front plates were conditioned in humidity for 24 hours in the condition of a temperature of 23° C. and relative humidity of 55%, the devices were subjected to a cross-cut adhesion test so as to evaluate the adhesiveness of the hard coat layers of the hard coat films. Specifically, a test area was set to 1 cm square. One-mm grid incision was made on the surface of the hard coat layer with such a depth that the incision barely reached the surface of transparent plastic film by use of a single-edged razor blade. Commercially-available 25-mm width cellophane tape was stuck on the hard coat layer in such a manner that one end of the tape was left unattached. The tape was rubbed so as to be adhered well, and then peeled by pulling the unattached end of the tape strongly by a hand in a perpendicular direction. The proportion of the area where the hard coat layer was peeled with respect to the taped area was determined based on the incision, and was evaluated as follows. If the peeled area is 1.5% or more of the tested area, the practicality is low.

⊚: No peeled area was created;
○: the peeled area was less than 15% of the tested area;
Δ: the peeled area was 15% or more to less than 30% of the tested area; and
×: the peeled area was 30% or more of the tested area.

<Uneven Contrast>

After illuminating the backlight of each liquid crystal display device for 1 hour under the environment of 23° C. and 55% RH, the devices were subjected to the measurement. By use of an EZ-Contrast 160D produced by ELDIM Corp., the brightnesses of white and black images of each liquid crystal display device were measured in the normal direction of the screen, and the ratio the brightness was determined as the on-axis contrast.

On-axis contrast=(brightness of white image measured in normal direction of display device)/(brightness of black image measured in normal direction of display device)

The on-axis contrast was measured at arbitrary 10 points on each liquid display device, and evaluated according to the following criteria.

Uneven contrast may be caused by wrinkles or distortion of a hard coat film as well as by a defectively cured sealing layer.

⊚: No on-axis contrast variation, no unevenness was observed;
○: on-axis contrast variation was 1% to less than 5%, i.e., small unevenness;
Δ: on-axis contrast variation was 5% to less than 10%, i.e., moderate unevenness; and
×: On-axis contrast variation was 10% or more, i.r., large unevenness.

The configurations of the hard coat films and results of the above evaluations are shown in Table 1.

TABLE 1

| Hard coat film No. | Base film No. | Acetyl substitution degree | Type of adhesion improver | Content of adhesion improver (part by mass) | Light transmittance | Adhesiveness of adhesion improver | Contrast unevenness | Note |
|---|---|---|---|---|---|---|---|---|
| 201 | 101 | 2.88 | M-1 | 0.1 | ◎ | ◎ | ◎ | Present invention |
| 202 | 101 | 2.88 | M-1 | 0.005 | ◎ | ○ | ○ | Present invention |
| 203 | 101 | 2.88 | M-1 | 0.3 | ◎ | ◎ | ◎ | Present invention |
| 204 | 101 | 2.88 | M-1 | 0.5 | ◎ | ◎ | ◎ | Present invention |
| 205 | 101 | 2.88 | M-1 | 0.004 | Δ | X | X | Comparative Example |
| 206 | 101 | 2.88 | M-1 | 0.6 | Δ | X | X | Comparative Example |
| 207 | 102 | 2.43 | M-1 | 0.1 | ○ | ○ | ○ | Present invention |
| 208 | 103 | CAP | M-1 | 0.1 | ○ | ○ | ○ | Present invention |
| 209 | 104 | 2.88/2.43/2.88 | M-1 | 0.1 | ◎ | ◎ | ◎ | Present invention |
| 210 | 104 | 2.88/2.43/2.88 | M-1 | 0.5 | ◎ | ◎ | ◎ | Present invention |
| 211 | 105 | Cycloolefin | M-1 | 0.005 | ○ | ○ | ○ | Present invention |
| 212 | 105 | Cycloolefin | M-1 | 0.1 | ◎ | ○ | ○ | Present invention |
| 213 | 105 | Cycloolefin | M-1 | 0.5 | ◎ | ○ | ○ | Present invention |
| 214 | 105 | Cycloolefin | M-1 | 0.6 | X | X | X | Comparative Example |
| 215 | 101 | 2.88 | M-2 | 0.1 | ◎ | ◎ | ◎ | Present invention |
| 216 | 101 | 2.88 | M-2 | 0.3 | ◎ | ◎ | ◎ | Present invention |
| 217 | 101 | 2.88 | M-2 | 0.5 | ◎ | ◎ | ◎ | Present invention |
| 218 | 101 | 2.88 | M-3 | 0.1 | ◎ | ◎ | ◎ | Present invention |
| 219 | 101 | 2.88 | M-3 | 0.3 | ◎ | ◎ | ◎ | Present invention |
| 220 | 101 | 2.88 | M-3 | 0.5 | ◎ | ◎ | ◎ | Present invention |
| 221 | 101 | 2.88 | M-4 | 0.1 | ○ | ○ | ○ | Present invention |
| 222 | 101 | 2.88 | M-4 | 0.3 | ○ | ○ | ○ | Present invention |
| 223 | 101 | 2.88 | — | — | Δ | X | X | Comparative Example |
| 224 | 104 | 2.88/2.43/2.88 | — | — | Δ | X | X | Comparative Example |
| 225 | 105 | Cycloolefin | — | — | Δ | X | X | Comparative Example |

As seen in the above table, it was found that each of the liquid crystal display devices with front plates in which the base film having the adhesion improver containing resin layer of the present invention and the hard coat layer is pasted on the front plate had low haze and were excellent in contrast uniformity and adhesiveness between the hard coat layer and the base film compared to the comparative liquid crystal display devices with front plates.

Second Embodiment

Preparation of Cellulose Acylate Films 301 to 305

The following dope was prepared, and a cellulose acylate film 301 was prepared in the same manner as the first embodiment.
<Composition of Main Dope Solution>
Methylene chloride: 340 parts by mass
Ethanol: 64 parts by mass
Cellulose acetate (acetyl substitution degree of 2.88, weight average molecular weight or 140,000): 100 parts by mass
Triphenylene phosphate: 12 parts by mass
The following polyester (P): 5 parts by mass
Fine particles additive solution 1:1 part by mass
The above materials were placed into a main dissolution furnace 1, and dissolved under stirring to prepare a dope solution.
On a stainless steel belt support, the solvent in a casted film was allowed to volatilize until the residual solvent amount decreased down to 75%, and subsequently the film was stripped from the stainless steel belt support by a stripping tensile force of 130 N/m. The stripped cellulose acylate film was stretched by 10% in the width direction using a tenter with heat at 170° C. The residual solvent was 15% at the start of the stretching.

Using rolls having different circumferential speeds, the film was stretched by 10% also in the longitudinal direction.

Subsequently, the film was conveyed through a dry zone with a plurality of rolls to complete the drying. The drying temperature was 130° C. and the conveying tension was 100 N/m. Accordingly, a cellulose acylate film 301 having a dry film thickness of 40 μm was obtained.

Next, cellulose acylate films 302 to 305 were prepared in the same manner except that the film thickness was changed as shown in Table 2.
(Synthesis of Polyester (P))
Under nitrogen atmosphere, 4.85 g of dimethyl terephthalate, 4.4 g of 1,2-propyleneglycol, 6.8 g of p-toluic acid and 10 mg of tetraisopropyl titanate were mixed. The mixture was stirred at 140° C. for 2 hours, and then further stirred at 21000 for 16 hours. Next, the temperature was lowered to 170° C. and unreacted 1,2-propyleneglycol was removed by evaporation. Polyester (P) was thus obtained.
Acid value: 0.1
Number average molecular weight: 490
Degree of dispersion: 1.4
Content of component having a molecular weight of 300 to 1,800: 90%
Hydroxy (hydroxyl) value: 0.1
Content of hydroxy (hydroxyl) value: 0.04%
<Preparation of Hard Coat Films 401 to 405>
Onto the laminated cellulose acylate films 301 to 305 as prepared above, the adhesion improver containing resin layer application liquid 1 and hard coat layer application liquid 1 were applied in the same manner as the first embodiment. Hard coat films 401 to 405 were thus prepared.

In addition, a polyethylene terephthalate film (PET film) was prepared with reference to the description of Japanese Patent Application Laid-Open Publication No. 2009-169393.

Liquid crystal display devices with front plates 401 to 407 were prepared in the same manner as the first embodiment using the hard coat films 401 to 405 and the hard coat film 201 which was prepared in the first embodiment and polyethylene terephthalate film (PET film), respectively.

<<Evaluation>>

The prepared cellulose acylate films 101, 301 to 305 and polyethylene terephthalate film (PET film) were subjected to the measurement of retardations Ro and Rth according to the following method.

<Measurement of Retardations Ro and Rth>

⊚: Completely no crosstalk was observed;
○: very weak crosstalk was observed;
Δ: weak crosstalk was observed; and
x: crosstalk was distinctly observed.

(3D glasses)

3D glasses TDG-BR100 produced by Sony was used.

The configurations of the hard coat films and results of the above evaluations are shown in table 2.

TABLE 2

| Display device No. | Hard coat film No. | Cellulose acylate film No. | Total thickness of film (μm) | Retardation Ro (nm) | Retardation Rth (nm) | Adhesiveness of hard coat layer | Cross talk in 3D display | Note |
|---|---|---|---|---|---|---|---|---|
| 401 | 401 | 301 | 40 | 0.7 | 1 | ⊚ | ⊚ | Present invention |
| 402 | 402 | 302 | 60 | 2 | 5 | ○ | ○ | Present invention |
| 403 | 403 | 303 | 80 | 5 | 10 | ○ | ○ | Present invention |
| 404 | 404 | 304 | 20 | 1 | −3 | ⊚ | ⊚ | Present invention |
| 405 | 405 | 305 | 30 | 2 | −2 | ⊚ | ⊚ | Present invention |
| 406 | 201 | 101 | 40 | 5 | 45 | ⊚ | Δ | Present invention |
| 407 | PET film | — | 40 | 3800 | — | — | — | Comparative Example |

The average refractive index of each film sample was measured by use of an Abbe refractometer and spectroscopic light source, and the film thickness was measured by use of a commercially available micrometer.

The films were placed under the environment of 23° C. and 55% RH for 24 hours, and subjected to the measurement of retardations at 590 nm wavelength under the same environment by use of an automatic birefringence meter KOBRA-21ADH (Oji Scientific Instruments Co.). The values of the above-described average refractive index and film thickness were assigned to the following equations to determine the in-plane retardation Ro and thickness retardation Rth.

$$Ro = (nx - ny) \times d \qquad \text{Equation (i)}$$

$$Rth = \{(nx + ny)/2 - nz\} \times d \qquad \text{Equation (ii)}$$

(In the equations, nx, ny and nz are refractive indexes in the condition of 23° C., 55% RH and 590 nm, where nx represents the maximum refractive index in the film plane (also called refractive index in the slow axis direction); ny represents the refractive index in the direction perpendicular to the slow axis in the film plane; nz represents the refractive index of the film in the thickness direction; and d is the film thickness (nm).)

<Adhesiveness Between Hard Coat Layer and Cellulose Acylate Film>

Regarding the hard coat films 401 to 405 and 201, the adhesiveness between the hard coat layer and cellulose acylate film was evaluated in the same manner as the first embodiment.

<Evaluation of Crosstalk 3D Video Observed with Inclined Head>

Crosstalk in 3D video of the manufactured liquid crystal display devices observed with a head being inclined was evaluated.

Under the environment of 23° C. and 55% RH, a viewer wore the following 3D glasses and inclined the head so that the glass was inclined by 250. The viewer watched a 3D video in this condition, and the crosstalk was evaluated according to the following criteria.

As seen in the above table, the hard coat films 401 to 405 and 201, which are provided with the adhesion improver containing resin layer of the present invention, were excellent in the adhesiveness between the hard coat layer and the cellulose acylate film. Furthermore, the hard coat films 401 to 405 had low retardations Ro and Rth. Therefore, it was found that the liquid display devices with front plates which were provided with such hard coat films had small crosstalk of 3D images, and excellent liquid crystal display devices for stereoscopic image can be provided.

The liquid crystal display device 407 which had a front plate of PET film had moire and was inferior in display qualities. Further, it was also found that the crosstalk of 3D images was too large for practical use.

REFERENCE NUMERALS 1, 1' polarizing plate
2 liquid crystal cell
3 sealing layer
4 front plate
5 adhesive layer
6 cellulose acylate film
7 adhesion improver containing resin layer
8 hard coat layer
10 co-casting die
11 mouthpiece
13, 15 skin layer-forming slit
14 core layer-forming slit
16 metal support
17, 19 skin layer-forming dope
18 core layer-forming dope
20 multi-layered web
21 skin layer
22 core layer
23 skin layer

The invention claimed is:

1. A method for manufacturing a liquid crystal display device with a front plate, comprising:
   first providing, on a viewing side surface of a liquid crystal panel having polarizing plates on both sides thereof, a sealing layer comprising at least an ultraviolet curing sticking agent, a front plate composed of glass or an acrylic resin, an adhesive layer, a base film, an adhesion improver containing resin layer, and a hard coat layer, in this order, where the adhesion improver containing resin layer is provided on a viewing side surface of the base film and the hard coat layer is provided on a viewing side surface of the adhesion improver containing resin layer, in a manner that the hard coat layer is on a topmost surface on the viewing side of the liquid crystal panel; and then curing the sealing layer by irradiating with ultraviolet ray from a viewing side of the hard coat layer, wherein the adhesive layer is an acrylic sticking agent, the base film is a cellulose acylate film, a polycarbonate film, a polysulfone film, or a cycloolefin resin film, and has a light transmittance of 51% or more at 380 nm wavelength, the adhesion improver containing resin layer comprises a compound having an absorption maximum peak (λ max) in a wavelength range of 260 to 400 nm as an adhesion improver in an amount of 0.005 to 0.1 parts by mass with respect to 100 parts by mass of a binder resin in the adhesion improver containing resin layer, the binder resin is a thermoplastic resin or an active ray curing resin, the adhesive improver compound is a benzotriazole-based compound represented by the following general formula (A)

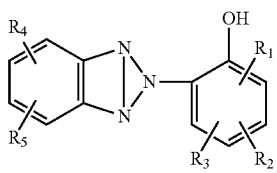

wherein $R_1$, $R_2$, $R_3$, $R_4$ and $R_5$ each independently represent a hydrogen atom, a halogen atom, a nitro group, a hydroxyl group, an alkyl group, an alkenyl group, an aryl group, an alkoxy group, an acyloxy group, an aryloxy group, an alkylthio group, an arylthio group, a mono- or di-alkylamino group, an acylamino group or a heterocyclic group of 5 or 6 members, and the hard coat layer comprises an active ray curing resin.

2. The method for manufacturing the liquid crystal display device with a front plate according to claim 1, wherein the base film has an in-plane retardation Ro and thickness retardation Rth represented by the following expressions of Ro: 0 to 5 nm and Rth: −10 to 10 nm, $$Ro=(nx-ny)\times d \qquad \text{expression (i):}$$

$$Rth=\{(nx+ny)/2-nz\}\times d \qquad \text{expression (ii):}$$

(wherein nx, ny and nz are refractive indexes in a condition of 23° C., 55% RH and 590 nm wavelength; nx represents a maximum refractive index in a film plane or called refractive index in a slow axis direction; ny represents a refractive index in a direction perpendicular to the slow axis in the film plane; nz represents a refractive index of the film in a thickness direction; and d represents a film thickness (nm)).

3. A liquid crystal display device with a front plate, comprising:

a liquid crystal panel having a viewing side with a sealing layer, a front plate, an adhesive layer, a base film, a resin layer, and a hard coat layer provided in this order, the hard coat layer being a topmost surface on the viewing side of the liquid crystal panel, wherein the liquid crystal panel comprises polarizing plates on both sides of the liquid crystal panel;

the sealing layer comprises at least an ultraviolet curing sticking agent;

the front plate is composed of glass or an acrylic resin;

the adhesive layer is an acrylic sticking agent;

the base film is a cellulose acylate film, a polycarbonate film, a polysulfone film, or a cycloolefin resin film;

the resin layer comprises a binder resin and an adhesion improver compound;

the binder resin is a thermoplastic resin or an active ray curing resin;

the adhesive improver compound is a benzotriazole-based compound having an absorption maximum peak (λ max) in a wavelength range of 260 to 400 nm in an amount of 0.005 to 0.1 parts by mass with respect to 100 parts by mass of the binder resin, wherein the benzotriazol-based compound is represented by the following general formula (A)

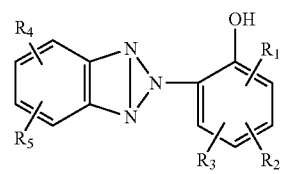

wherein $R_1$, $R_2$, $R_3$, $R_4$ and $R_5$ each independently represent a hydrogen atom, a halogen atom, a nitro group, a hydroxyl group, an alkyl group, an alkenyl group, an aryl group, an alkoxy group, an acyloxy group, an aryloxy group, an alkylthio group, an arylthio group, a mono- or di-alkylamino group, an acylamino group or a heterocyclic group of 5 or 6 members;

the hard coat layer comprises an active ray curing resin;

the adhesive improver containing resin layer is provided on a viewing side surface of the base film, and the base film has a light transmittance of 51% or more at 380 nm wavelength; and the sealing layer is cured by irradiating with ultraviolet ray from a viewing side of the hard coat layer, after providing, on the viewing side surface of the liquid crystal panel having the polarizing plates on both sides thereof, the sealing layer, the front plate, the adhesive layer, the base film, the adhesion improver containing resin layer and the hard coat layer, in this order, the hard coat layer being are provided on a viewing side surface of the adhesion improver containing resin layer.

4. The liquid crystal display device with a front plate according to claim 3, wherein the device is a liquid crystal display device for a stereoscopic image.

5. The method for manufacturing the liquid crystal display device with a front plate of claim 1, wherein the base film comprises a polyester-based polymer obtained by a reaction of an aliphatic dicarboxylic acid having 2 to 20 carbon atoms with at least one diol compound selected from aliphatic diols having 2 to 12 carbon atoms and alkylether diols having 4 to 20 carbon atoms.

6. The device of claim 3, wherein the base film is a cellulose acylate-based film.

7. The device of claim 3, wherein the base film contains an aliphatic polyester.

8. The device of claim 7, wherein the aliphatic polyester is obtained by a reaction of an aliphatic dicarboxylic acid having 2 to 20 carbon atoms with at least one diol compound selected from aliphatic diols having 2 to 12 carbon atoms and alkylether diols having 4 to 20 carbon atoms.

* * * * *